(12) United States Patent
Miyashita et al.

(10) Patent No.: US 8,063,783 B2
(45) Date of Patent: Nov. 22, 2011

(54) TAPE PROCESSING APPARATUS, TAG LABEL PRODUCING APPARATUS, TAG ASSEMBLY, AND TAPE PROCESSING METHOD

(75) Inventors: Hiroshi Miyashita, Nagoya (JP); Kazunari Taki, Nagoya (JP); Yasuo Kimura, Ichinomiya (JP); Masao Ito, Yokkaichi (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 626 days.

(21) Appl. No.: 12/083,416

(22) PCT Filed: Oct. 11, 2006

(86) PCT No.: PCT/JP2006/320334
§ 371 (c)(1),
(2), (4) Date: Oct. 17, 2008

(87) PCT Pub. No.: WO2007/043585
PCT Pub. Date: Apr. 19, 2007

(65) Prior Publication Data
US 2009/0072974 A1    Mar. 19, 2009

(30) Foreign Application Priority Data

Oct. 12, 2005  (JP) ................................ 2005-297089
Oct. 12, 2005  (JP) ................................ 2005-297093
Oct. 12, 2005  (JP) ................................ 2005-297094
Dec. 20, 2005  (JP) ................................ 2005-366089

(51) Int. Cl.
*G08B 13/14* (2006.01)
*G06K 5/00* (2006.01)
*G06K 19/00* (2006.01)
*G06F 3/12* (2006.01)

(52) U.S. Cl. .................. 340/572.1; 340/572.8; 235/380; 235/432; 235/487

(58) Field of Classification Search ............... 340/572.8; 235/432, 487
See application file for complete search history.

(56) References Cited

U.S. PATENT DOCUMENTS 6,409,401 B1    6/2002  Petteruti et al.
6,836,215 B1 *  12/2004 Laurash et al. ............ 340/572.1
2005/0025553 A1 * 2/2005 Hohberger et al. ........... 400/521

(Continued)

FOREIGN PATENT DOCUMENTS

JP    A-2002 072882    3/2002

(Continued)

*Primary Examiner* — George Bugg
*Assistant Examiner* — Jack Wang
(74) *Attorney, Agent, or Firm* — Day Pitney LLP

(57) ABSTRACT

To realize smooth manufacturing of tag tape and RFID labels. The RFID tag label producing apparatus 1 comprises a tag inserter 26 for inserting at predetermined intervals RFID tags Tg between an adhesive layer 200Aa of a first tape 200A fed out from a first tape roll 211 and an adhesive layer 200Ba of a second tape 200B fed out from a second tape roll 213, and a base tape roll 215 for taking up a base tape 210 produced by bonding of the first tape 200A and the second tape 200B and attachment of the RFID tags Tg by the tag inserter 226, and making this a tag tape roll. The REID tag comprises RFID circuit elements To provided with an IC circuit part 151 for storing information and an tag antenna 152 connected to the IC circuit part 151 for performing transmission and reception of information.

24 Claims, 34 Drawing Sheets

U.S. PATENT DOCUMENTS

| | | | |
|---|---|---|---|
| 2005/0280537 A1* | 12/2005 | Feltz et al. | 340/572.1 |
| 2006/0006987 A1* | 1/2006 | Hashimoto et al. | 340/10.51 |
| 2006/0109496 A1* | 5/2006 | Brown et al. | 358/1.15 |
| 2006/0118229 A1* | 6/2006 | Ohashi et al. | 156/60 |
| 2006/0250242 A1* | 11/2006 | Drapala et al. | 340/572.1 |
| 2007/0040684 A1* | 2/2007 | McAllister | 340/572.1 |

FOREIGN PATENT DOCUMENTS

| | | |
|---|---|---|
| JP | A-2002 072886 | 3/2002 |
| JP | A-2002 279389 | 9/2002 |
| JP | A-2003 6596 | 1/2003 |
| JP | A-2003 150914 | 5/2003 |
| JP | A-2003 187213 | 7/2003 |
| JP | A-2003 208573 | 7/2003 |
| JP | A-2003 220744 | 8/2003 |
| JP | A-2005 157661 | 6/2005 |
| WO | WO 2005/070143 A | 8/2005 |

* cited by examiner

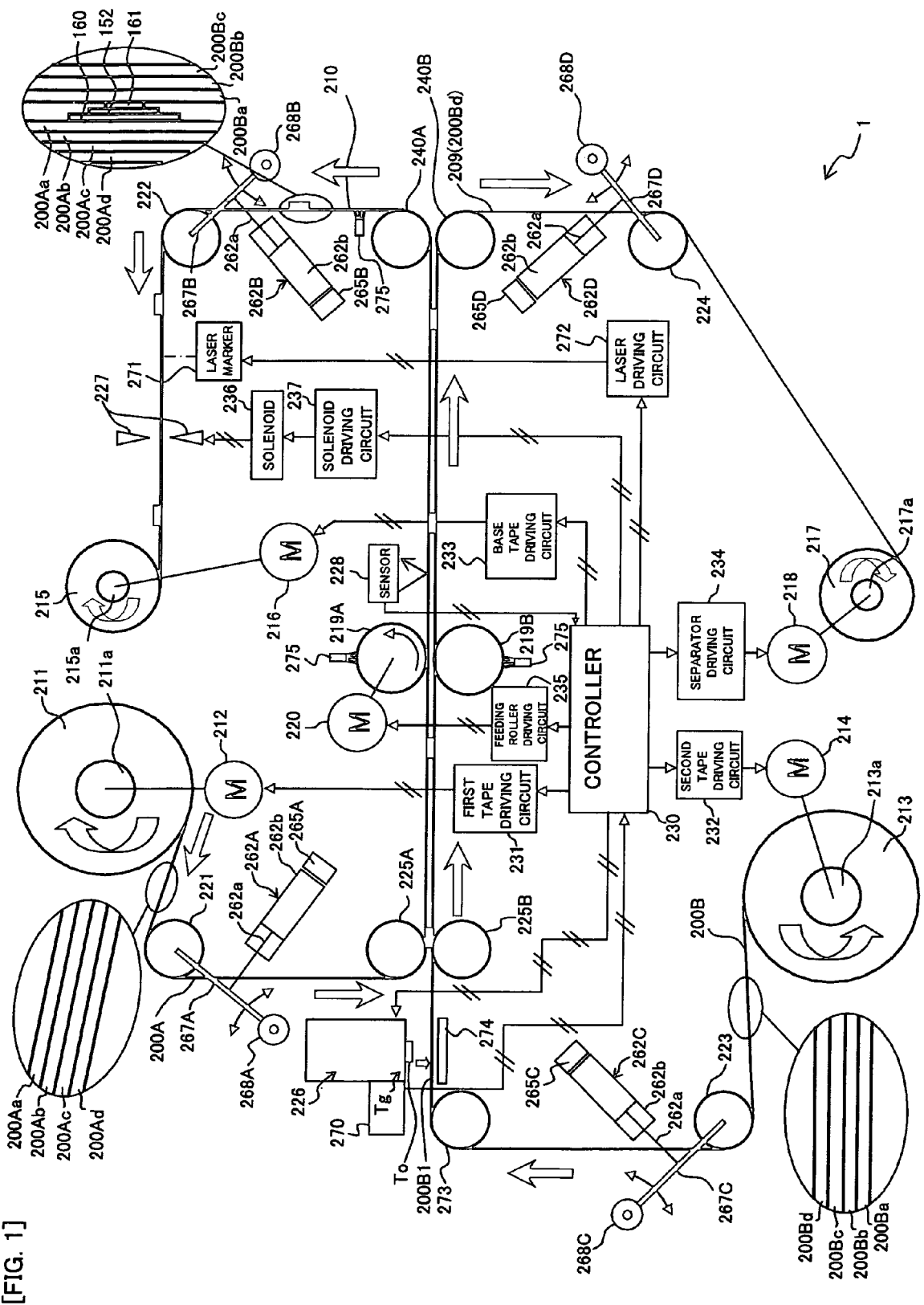
[FIG. 1]

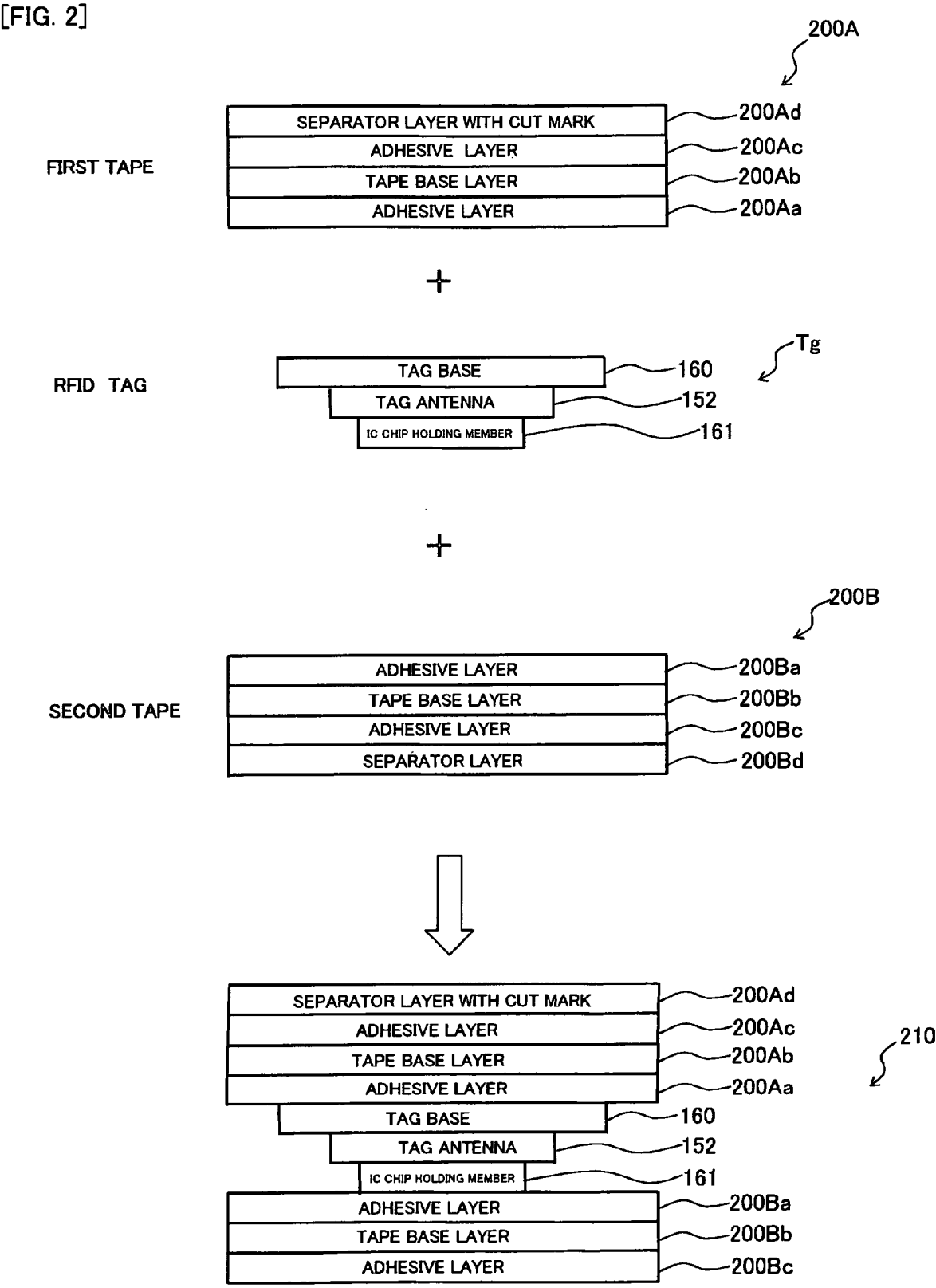

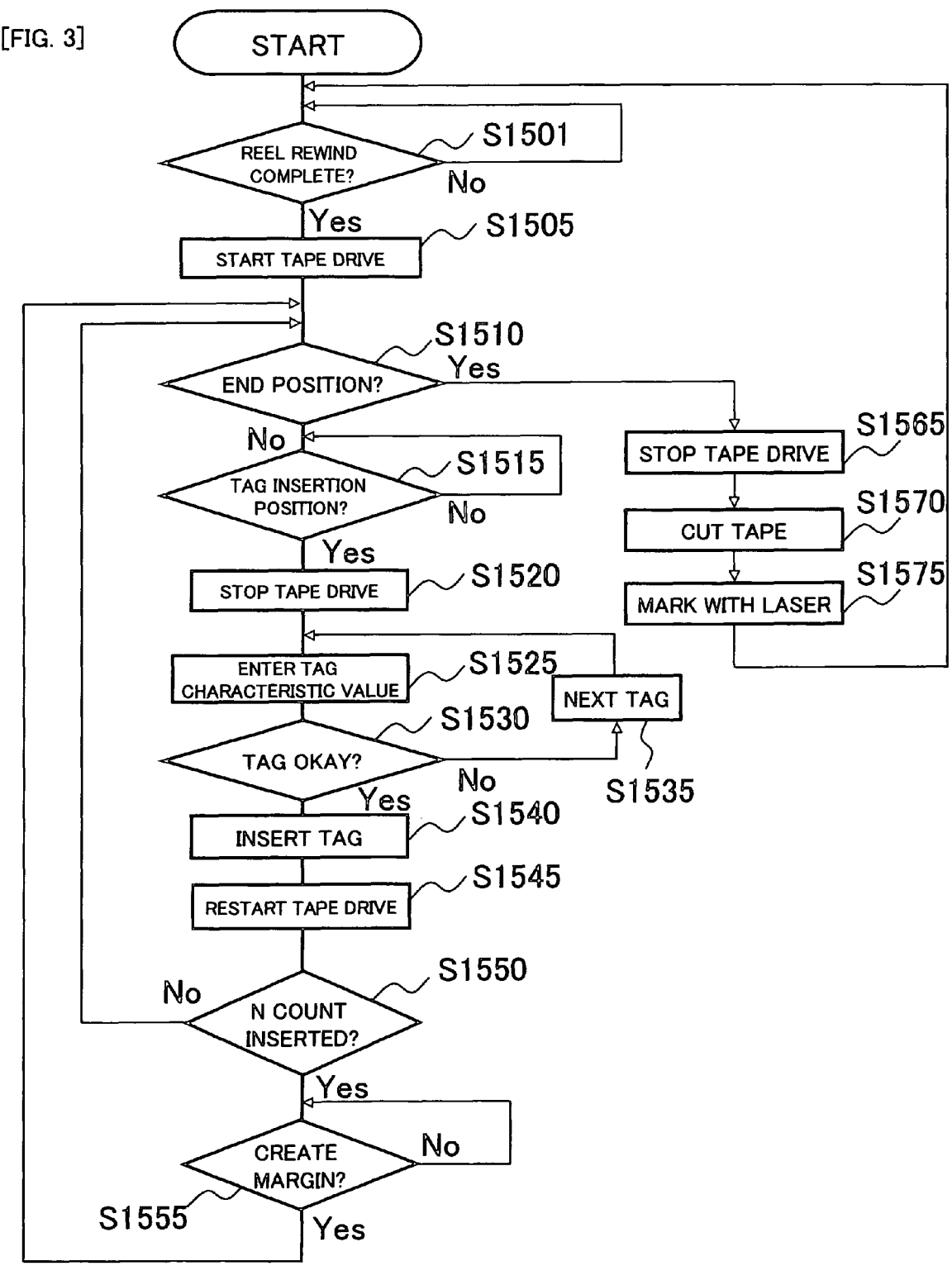
[FIG. 3]

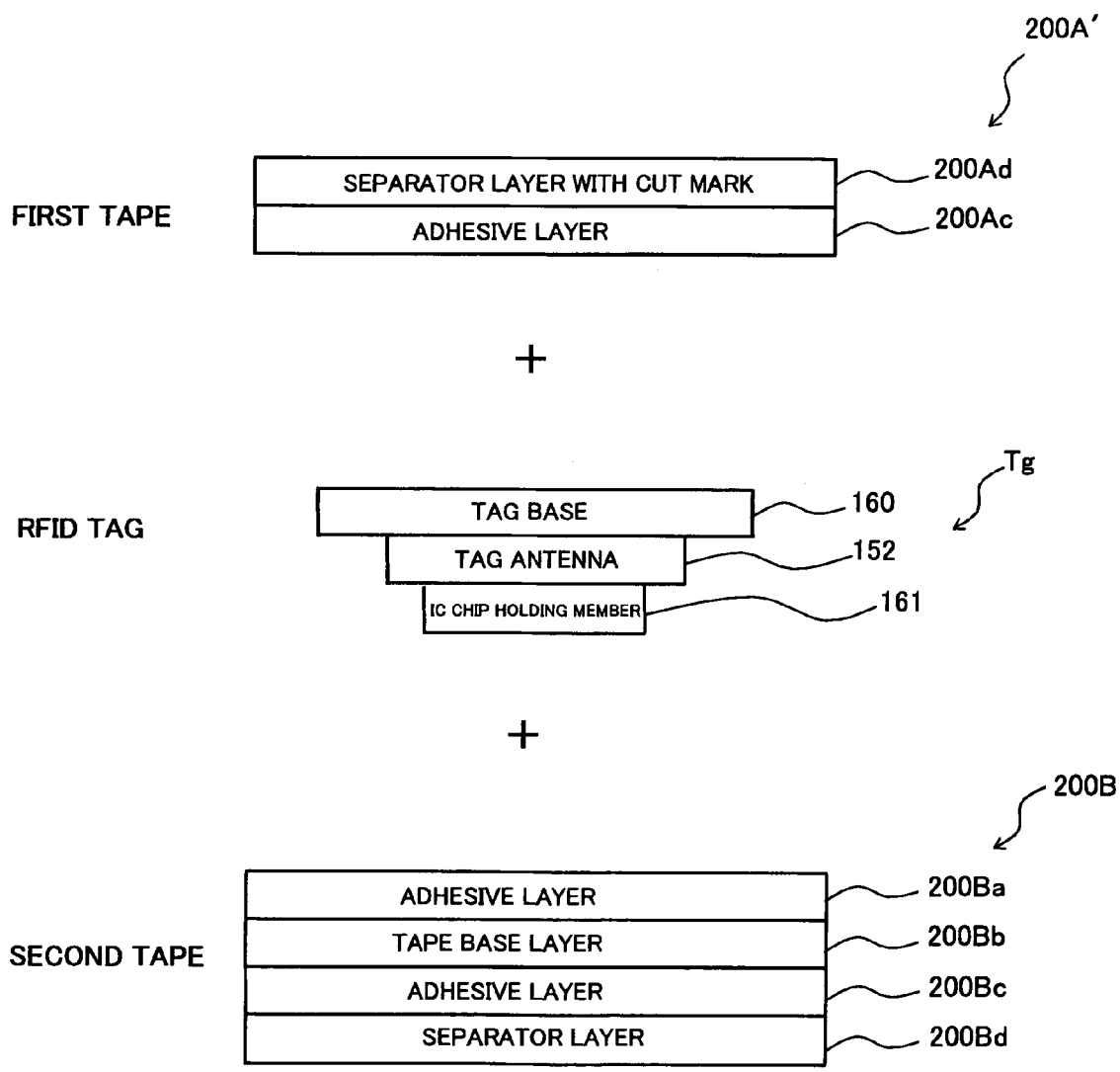
[FIG. 4]

[FIG. 5]
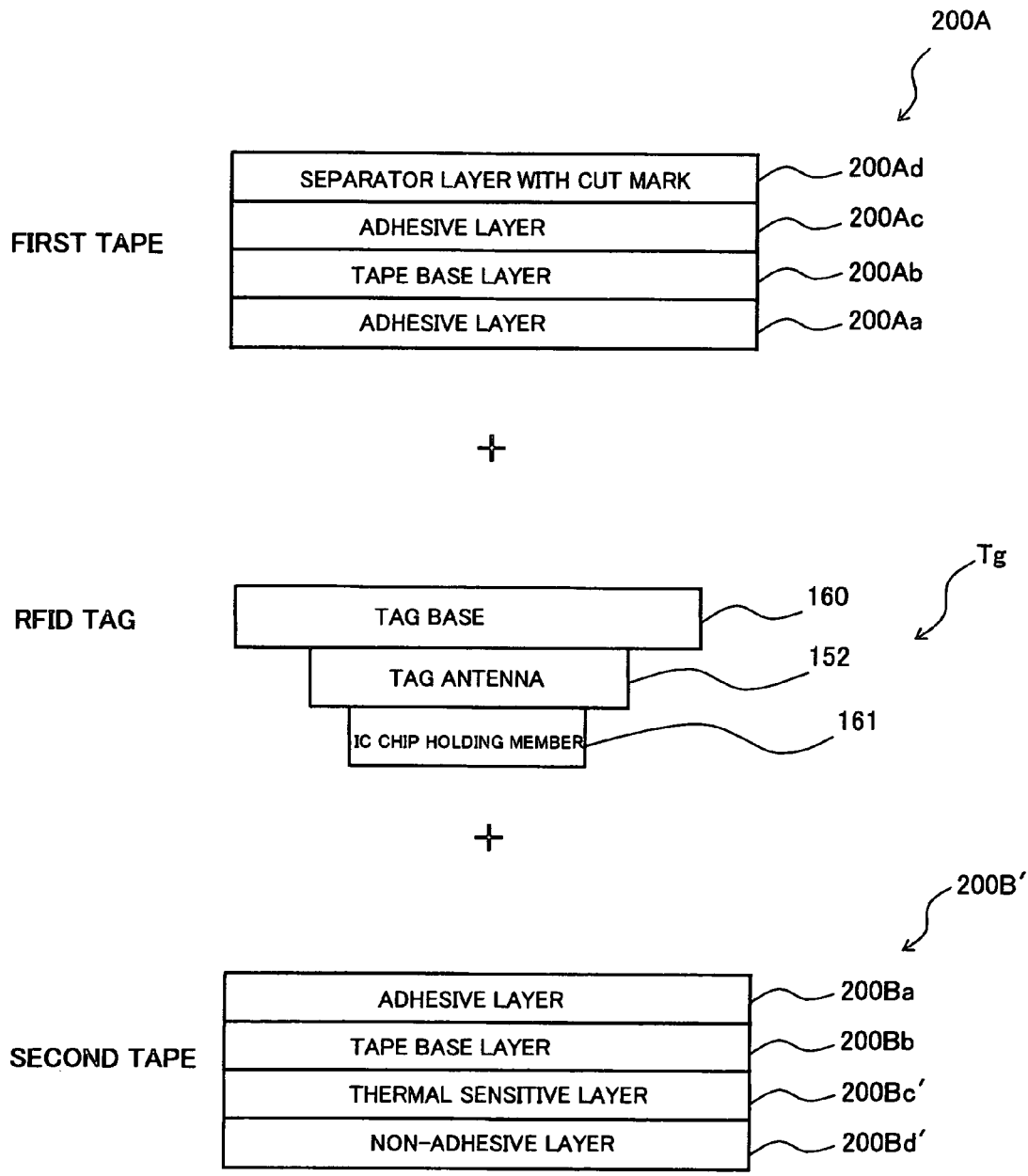

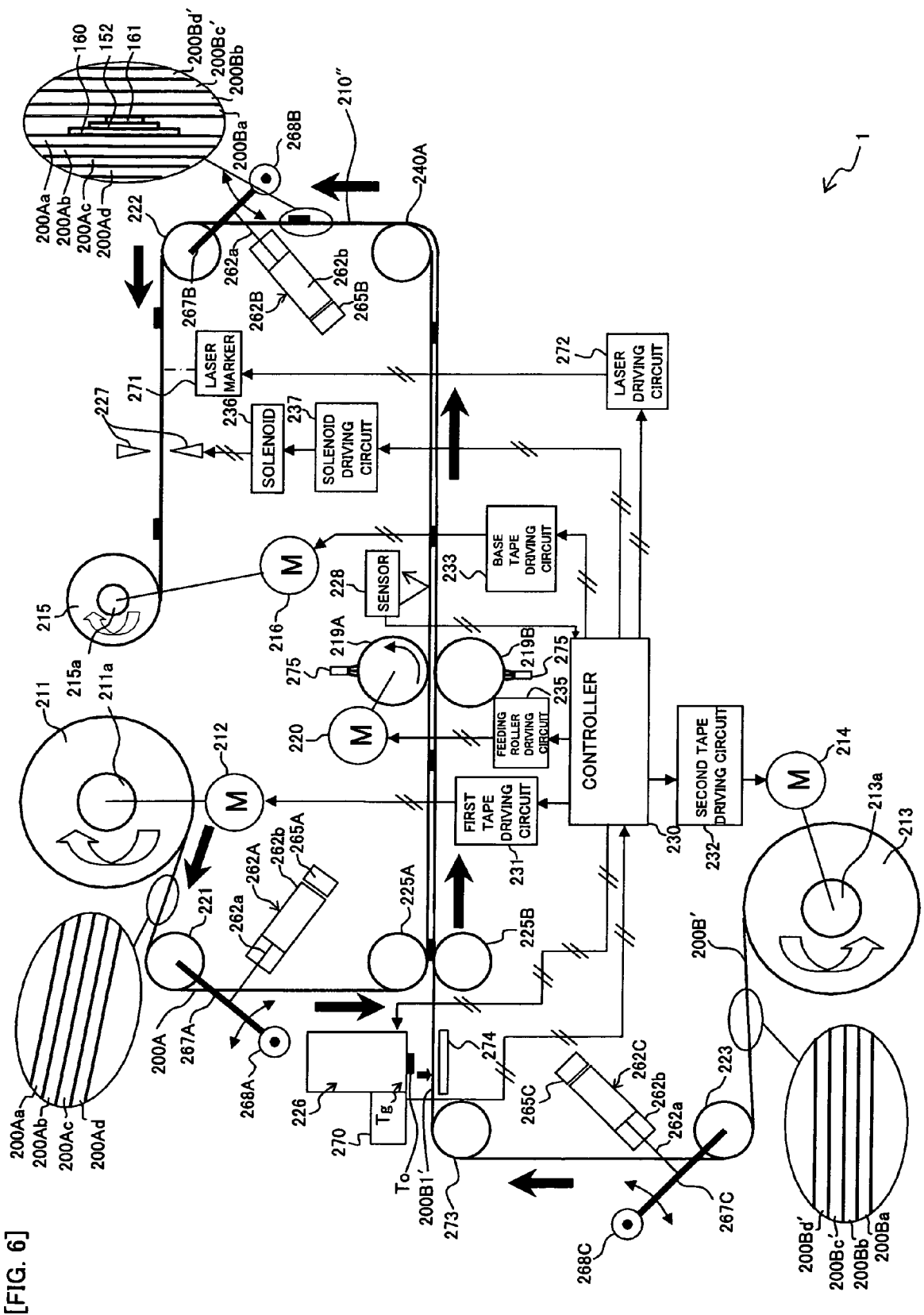
[FIG. 6]

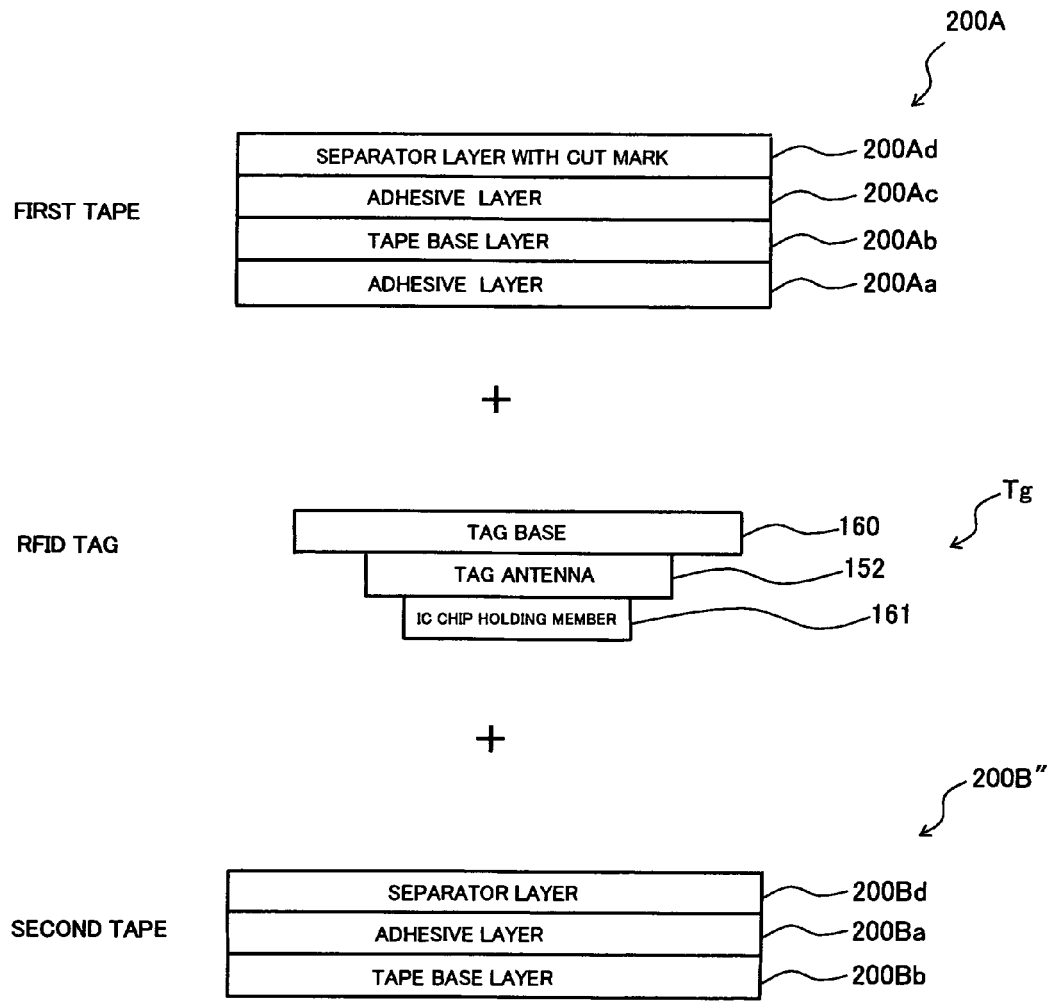

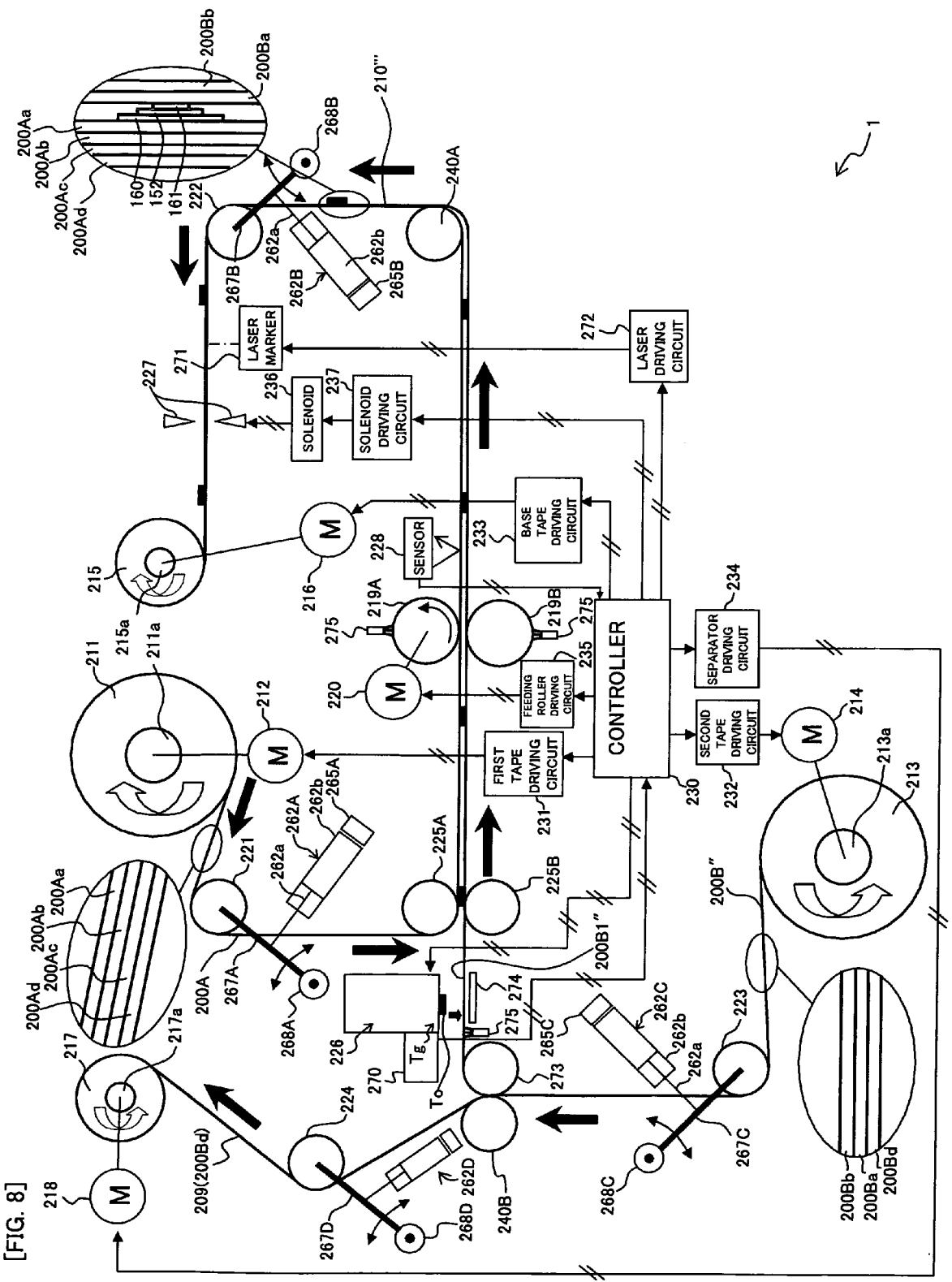
[FIG. 8]

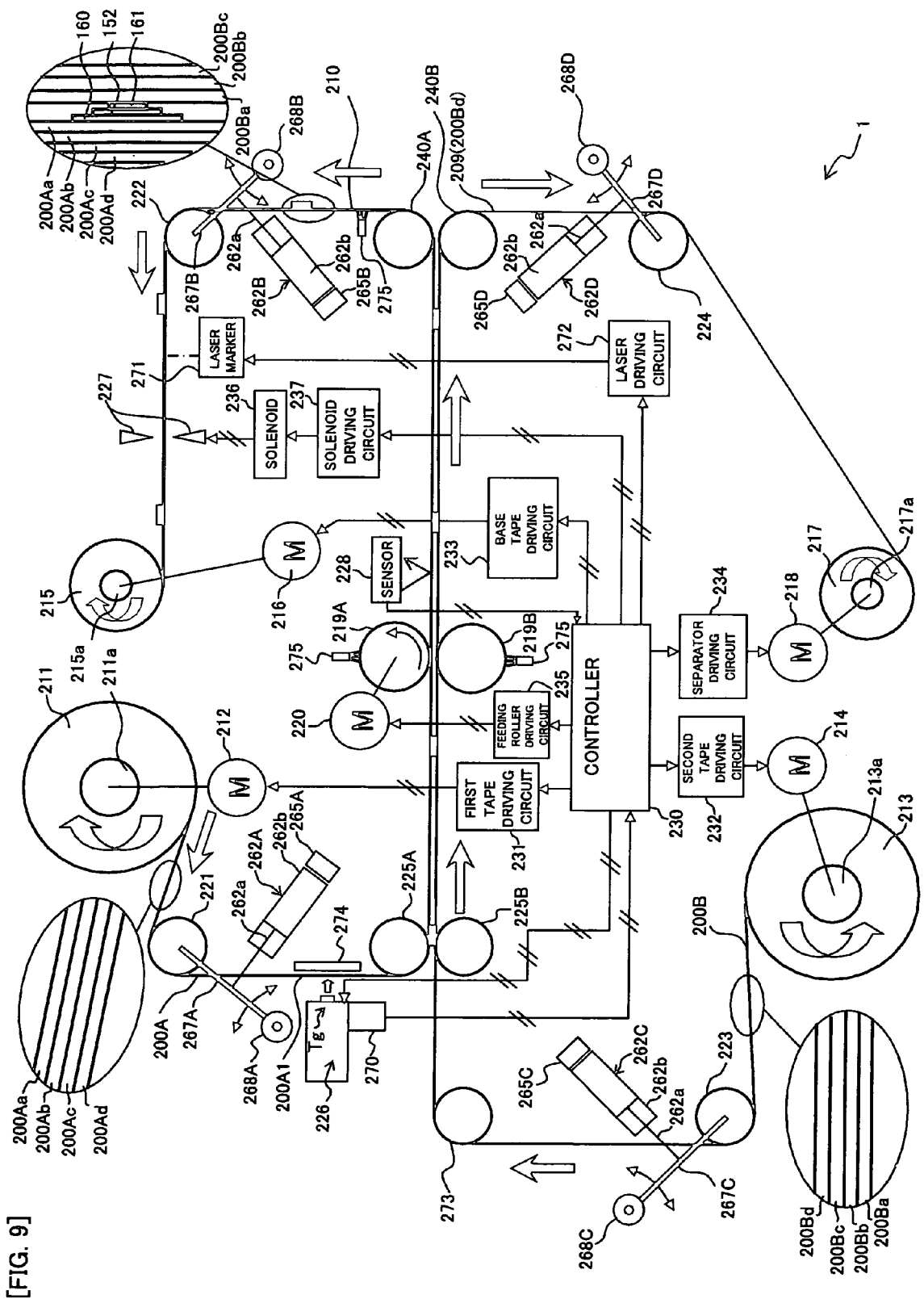
[FIG. 9]

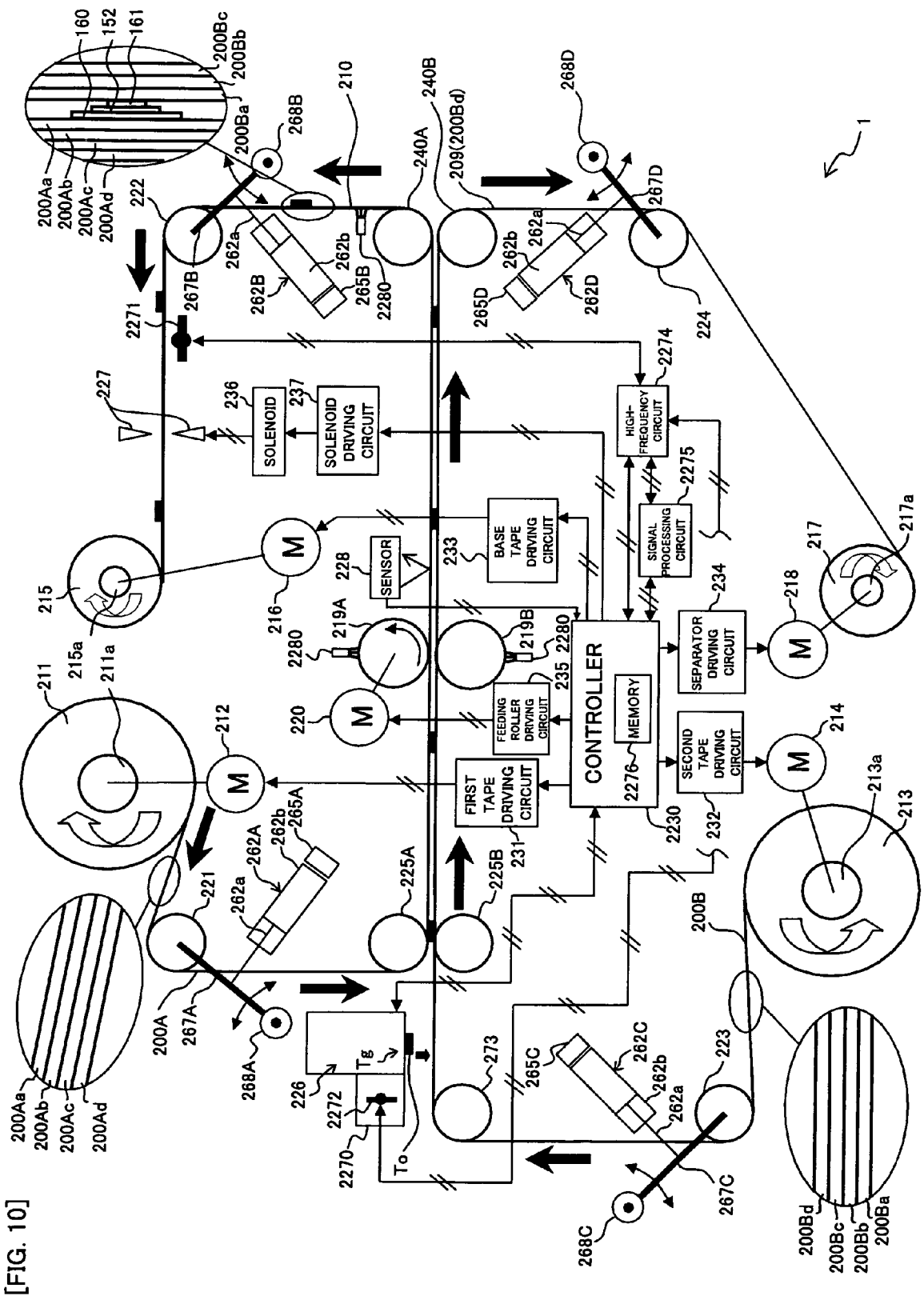
[FIG. 10]

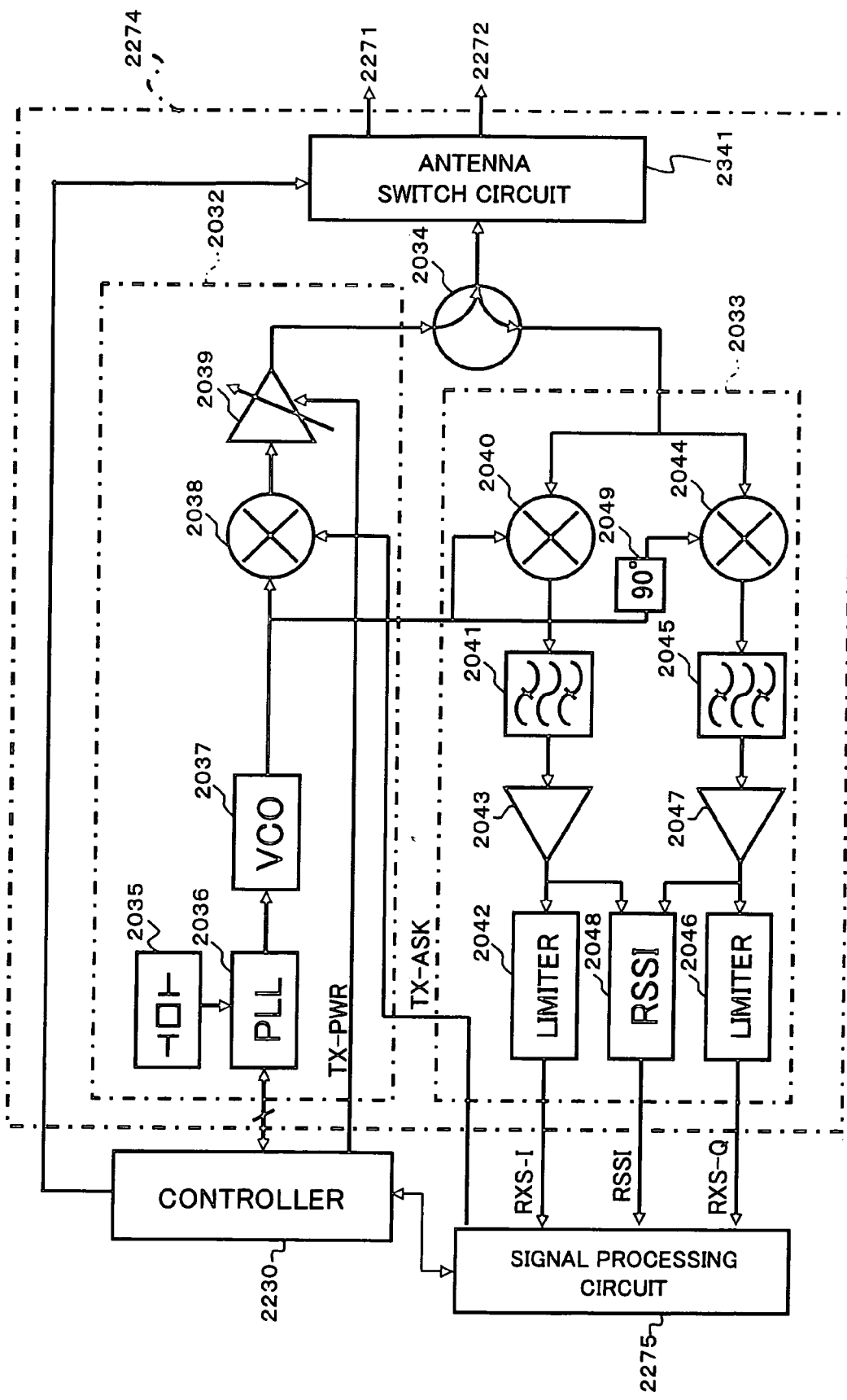
[FIG. 11]

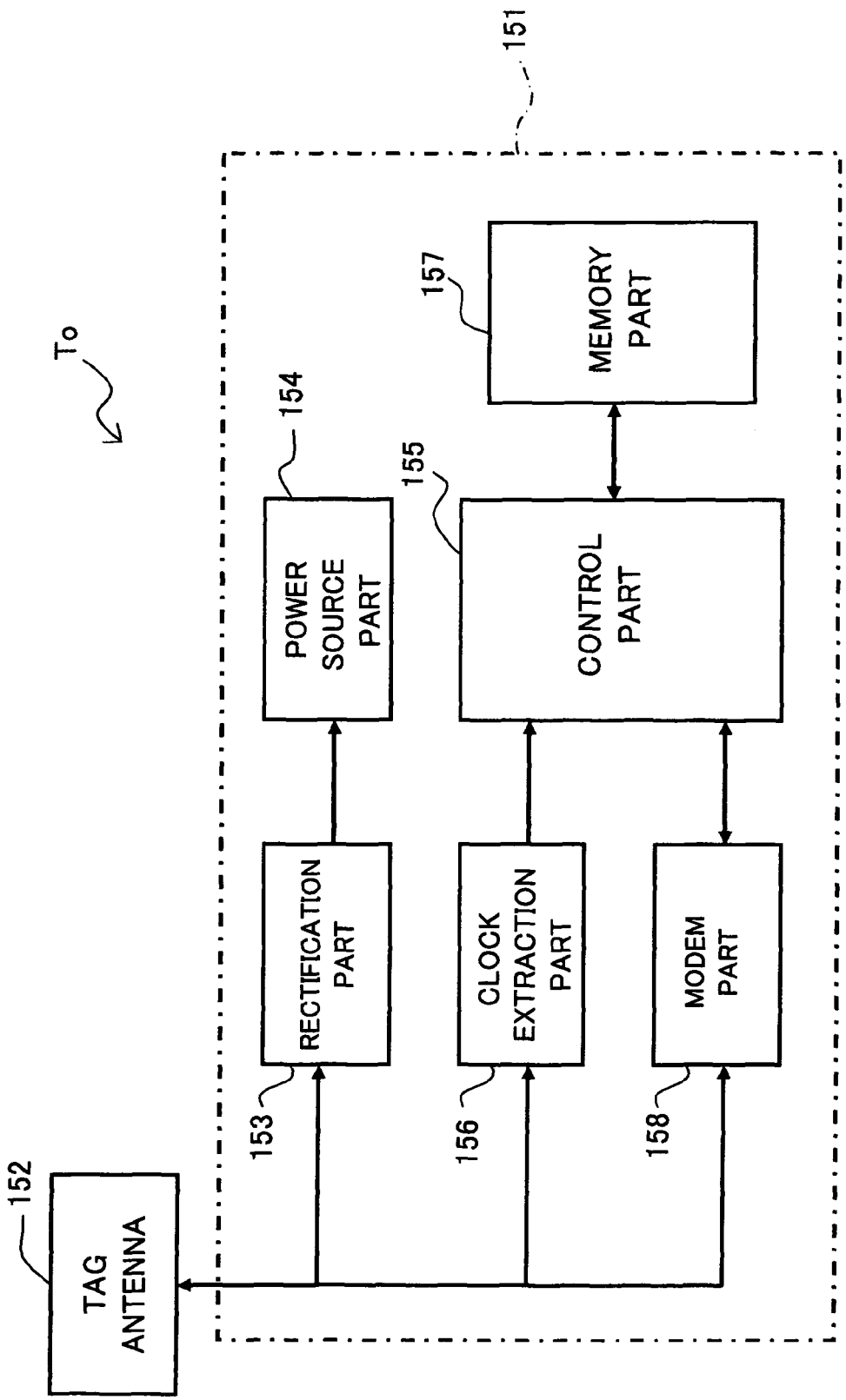
[FIG. 12]

[FIG. 13]
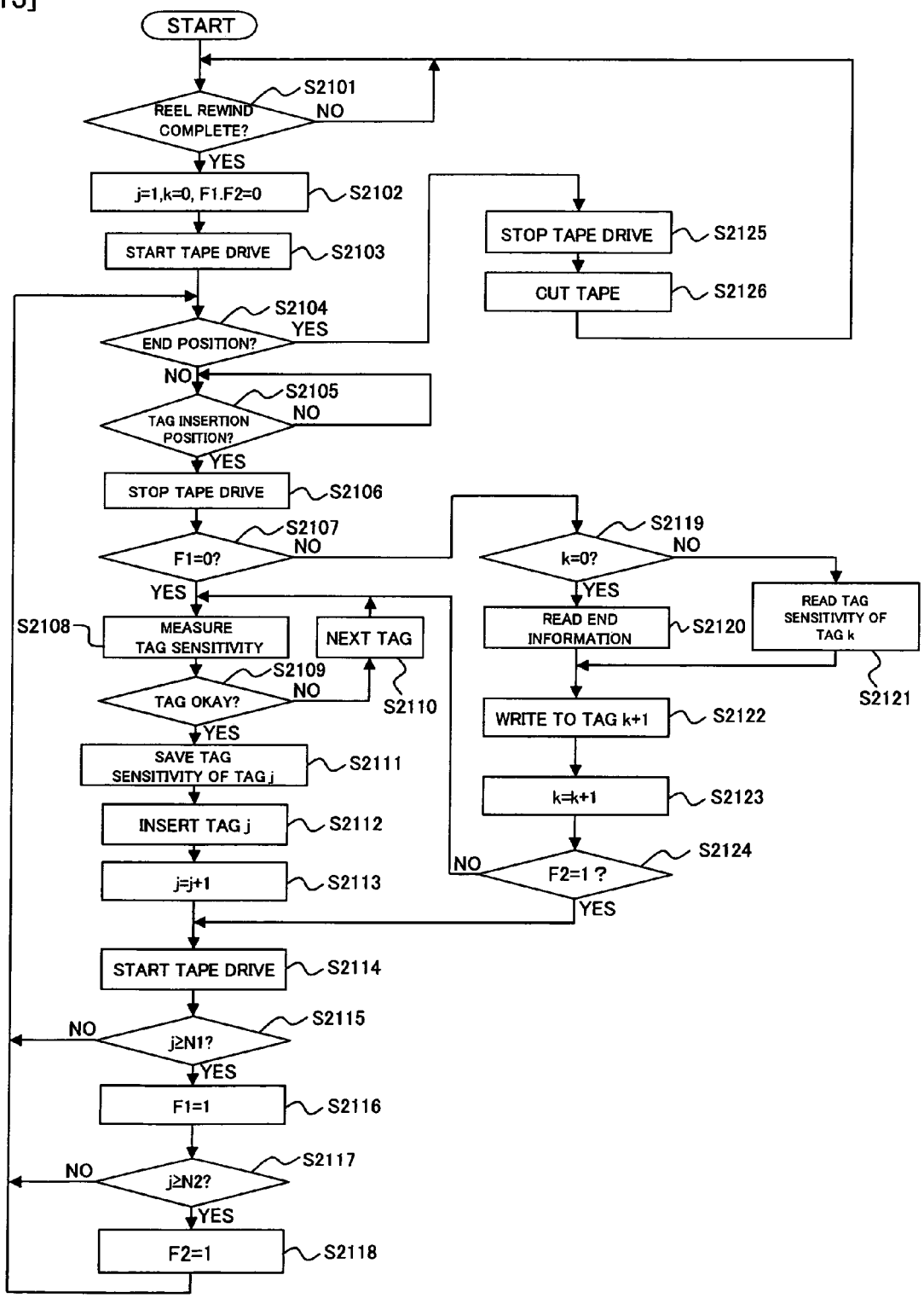

[FIG. 14]
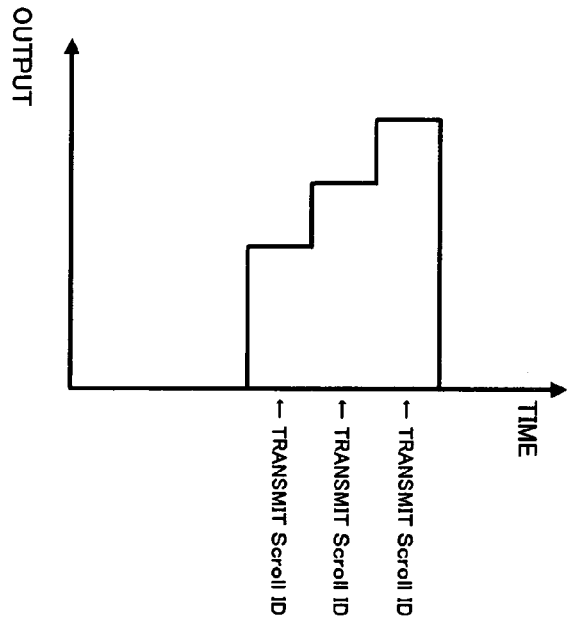
[FIG. 15]
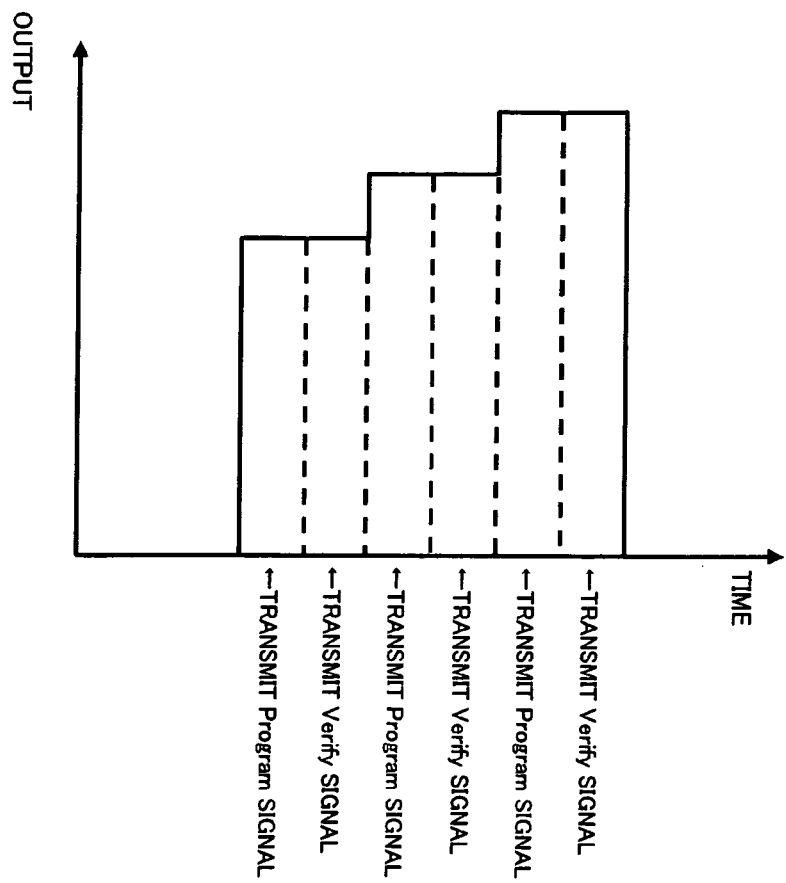

[FIG. 16]
| TAG ID | SENSITIVITY OF NEXT TAG (WRITE/READ) |
[FIG. 17]
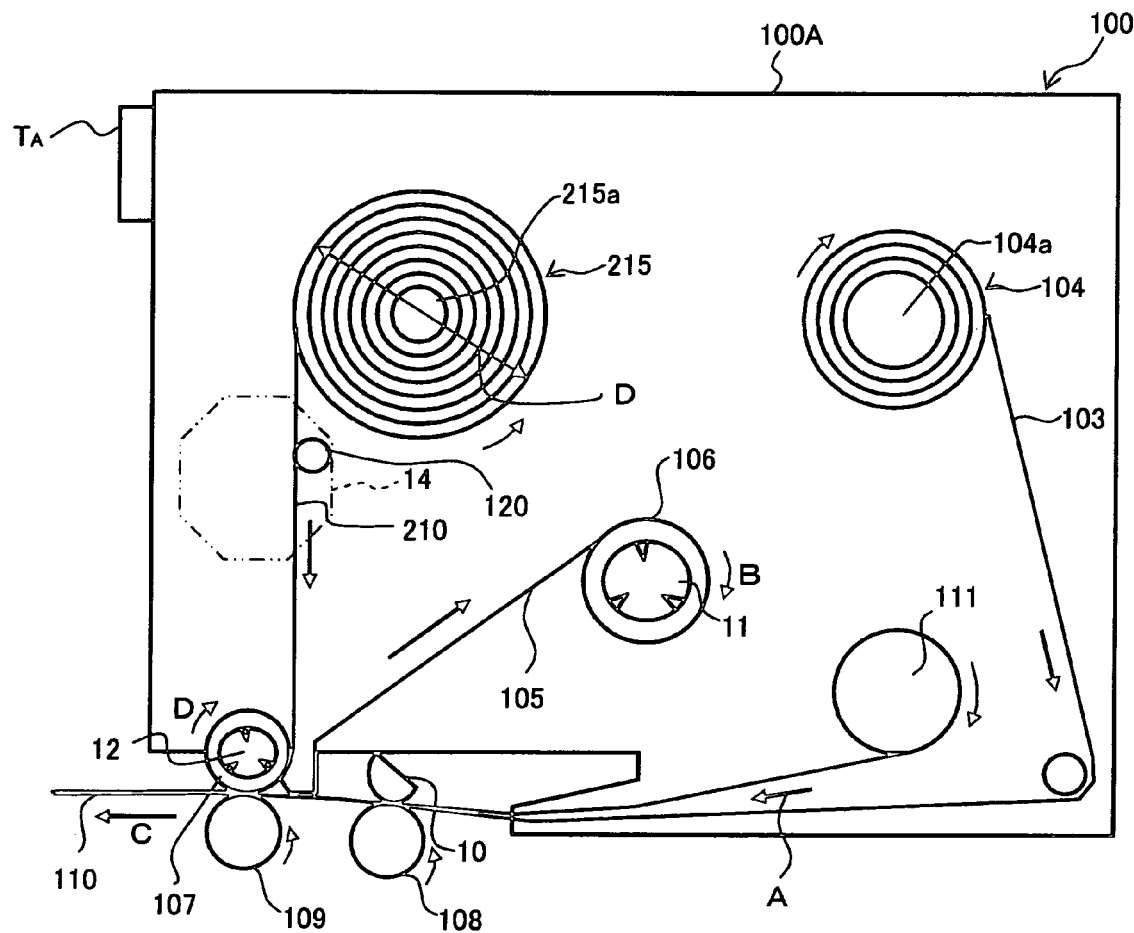
[FIG. 18]
| TAG ID | SENSITIVITY OF OWN TAG (WRITE) | SENSITIVITY OF NEXT TAG (READ) |

[FIG. 19]
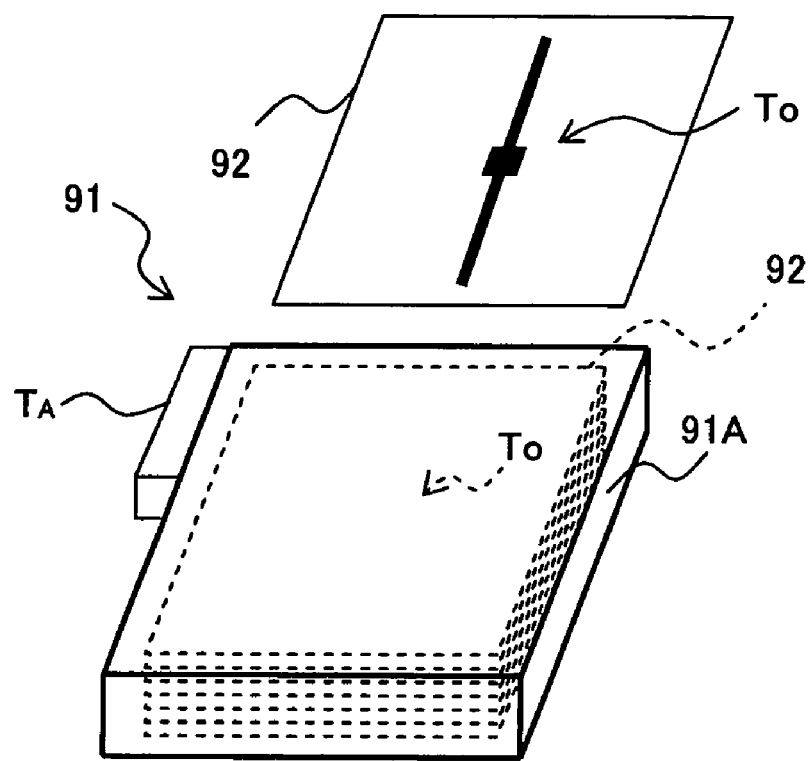

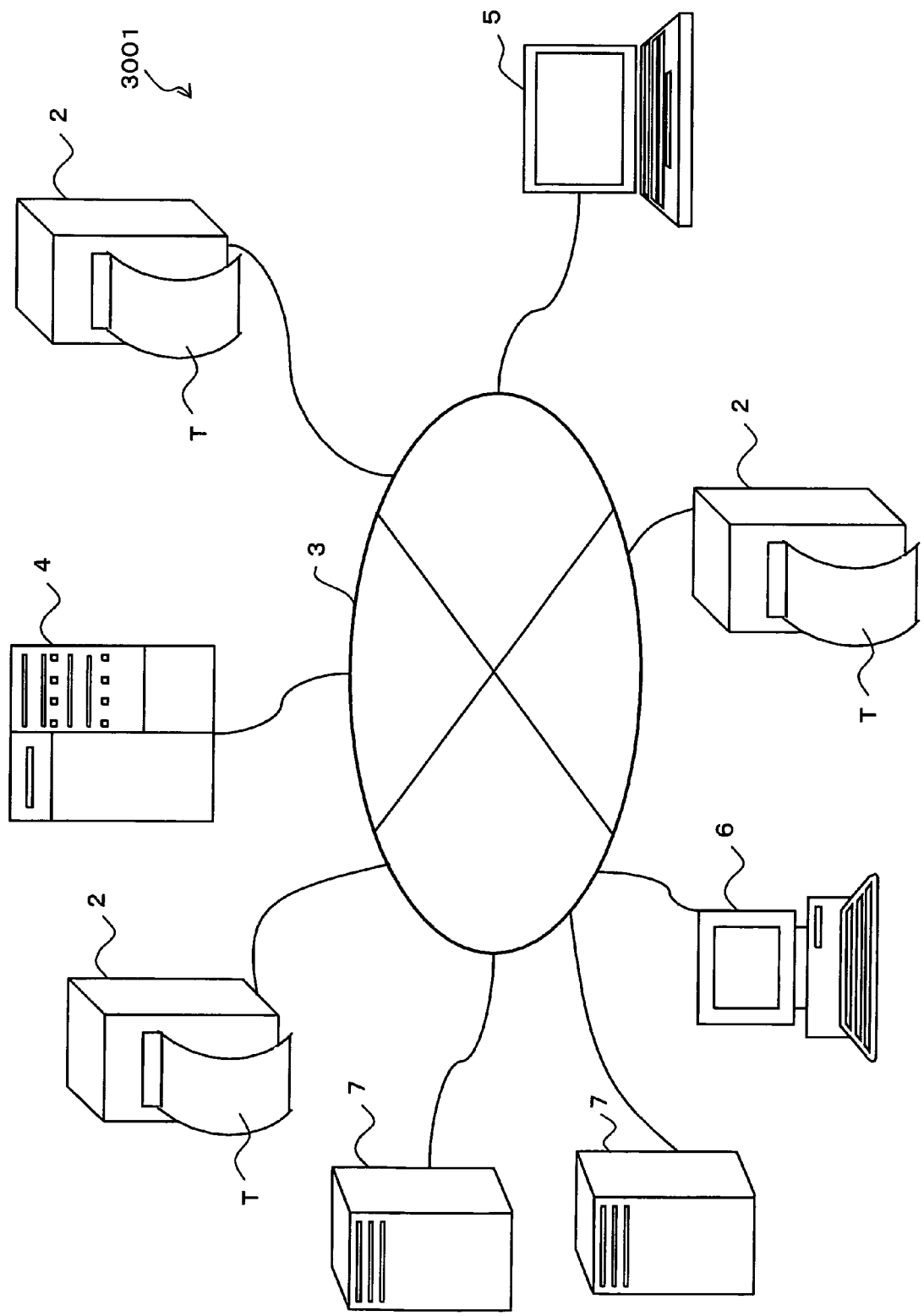
[FIG. 20]

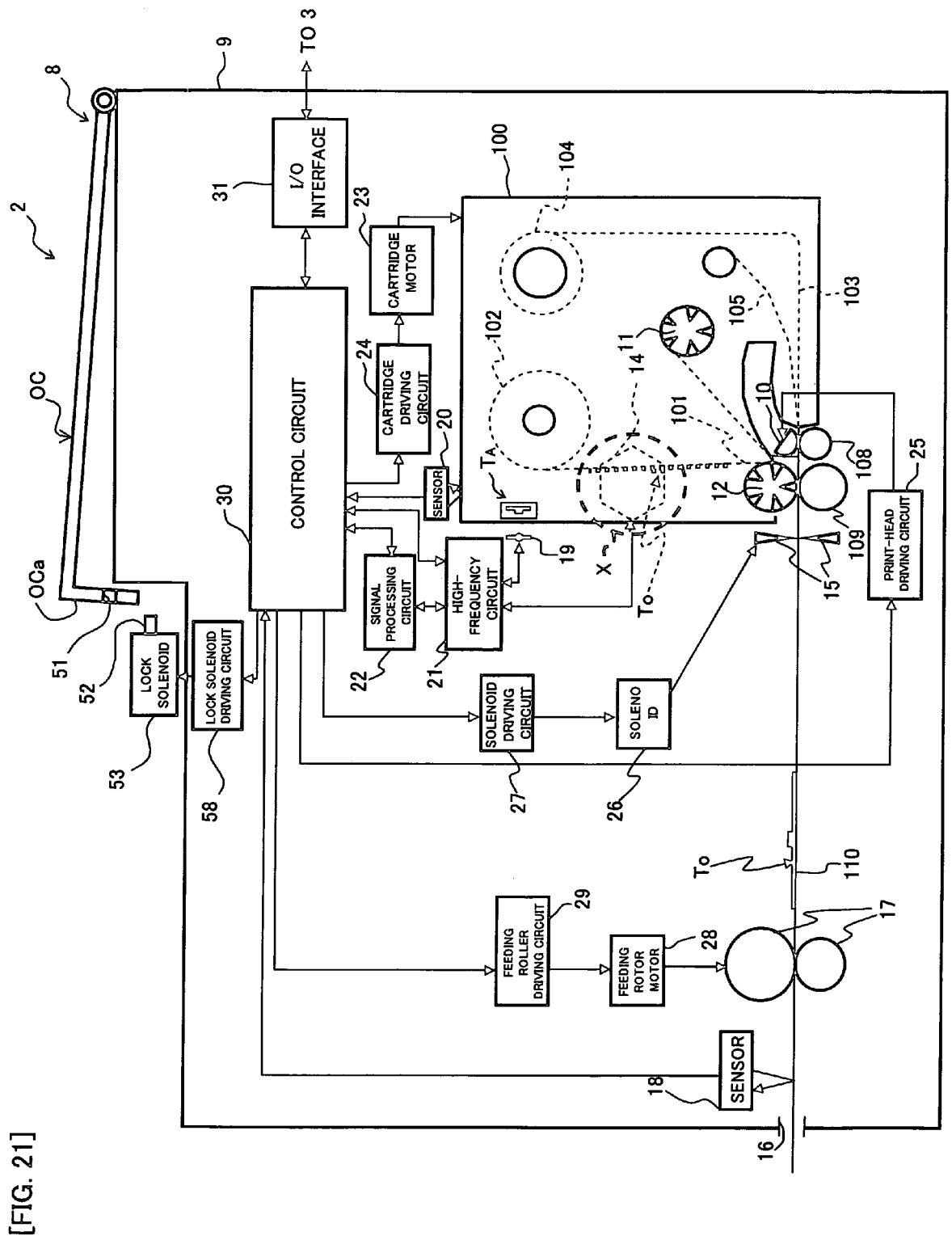
[FIG. 21]

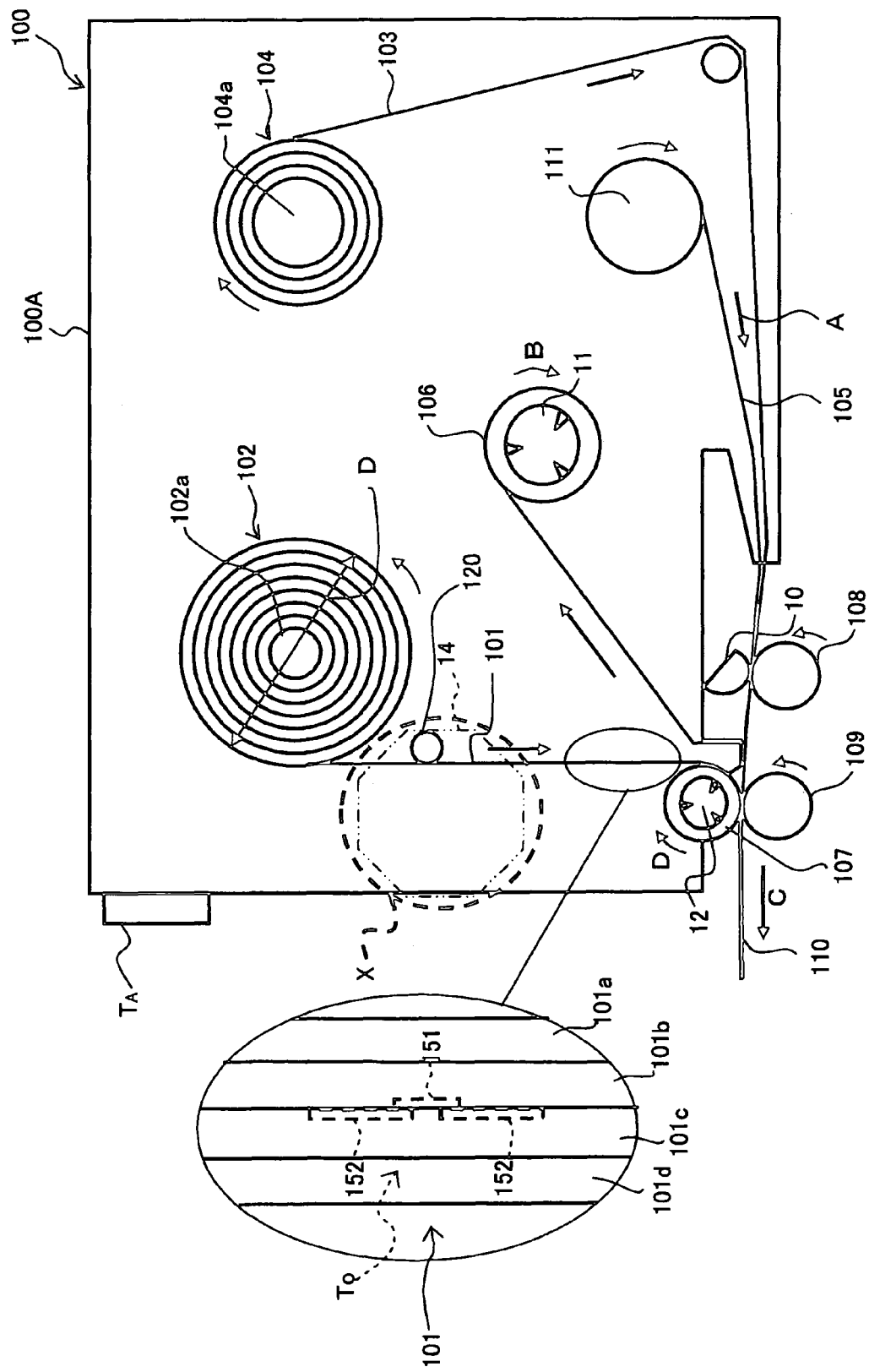
[FIG. 22]

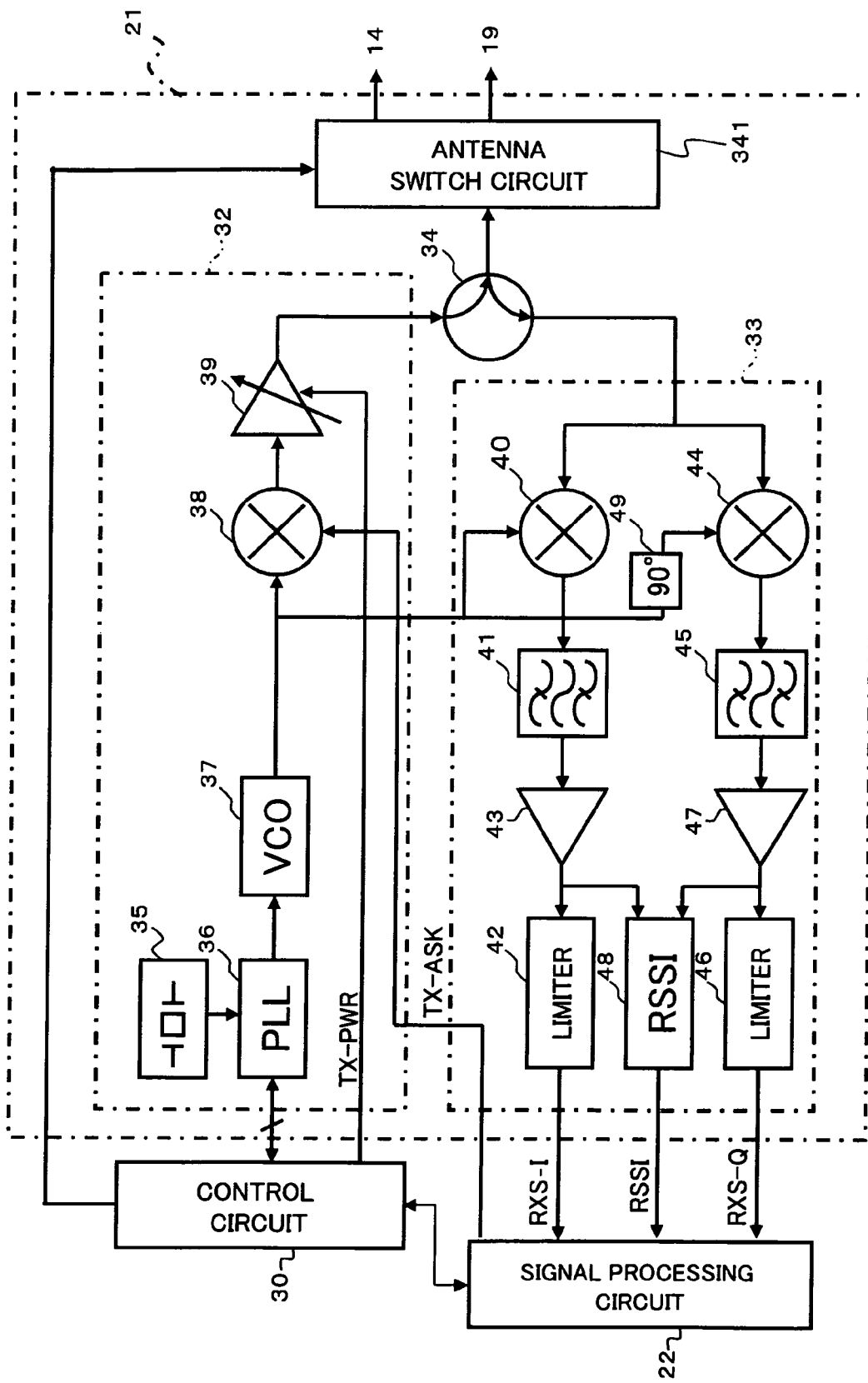
[FIG. 23]

[FIG. 24]
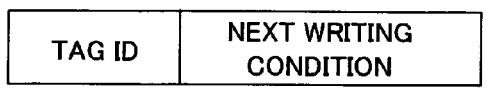
[FIG. 25A]
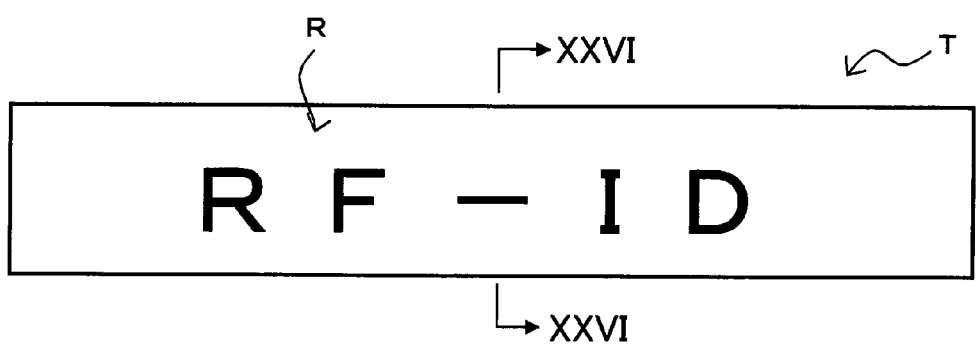
[FIG. 25B]
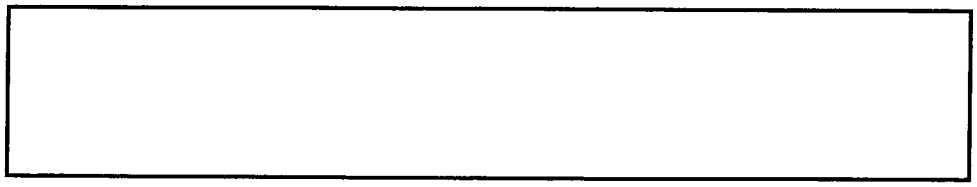
[FIG. 26]
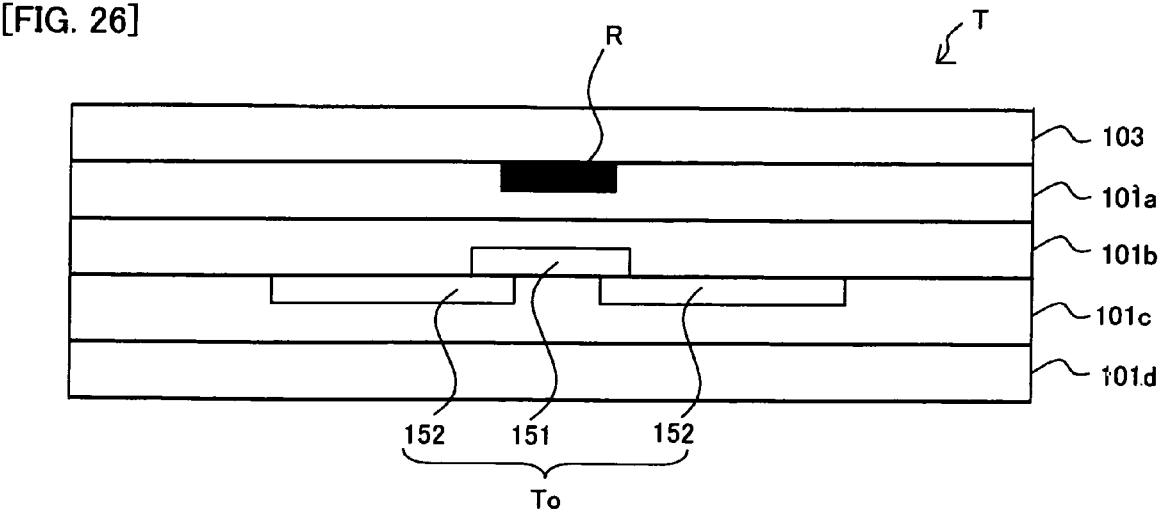

[FIG. 27]
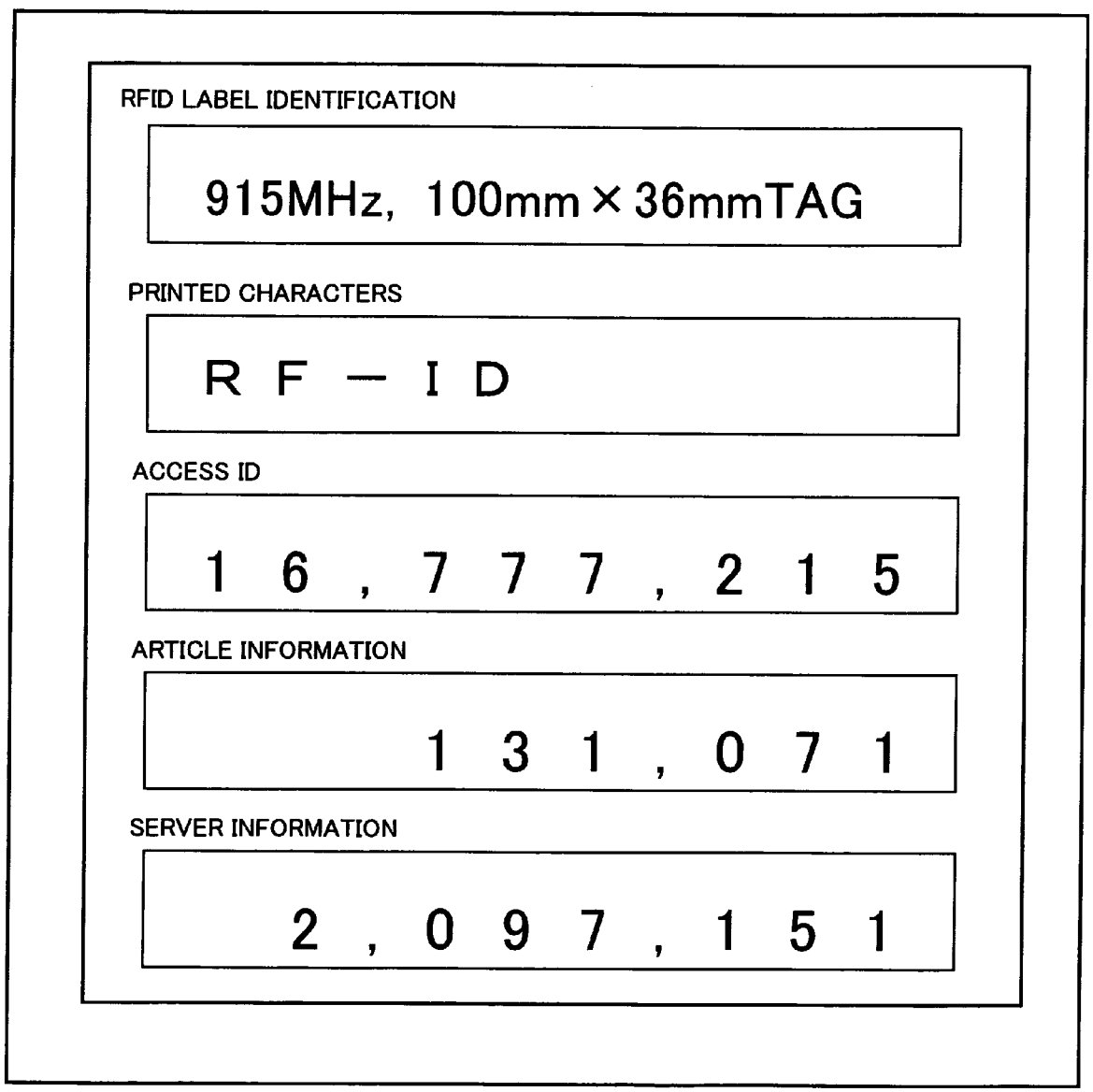

[FIG. 28]
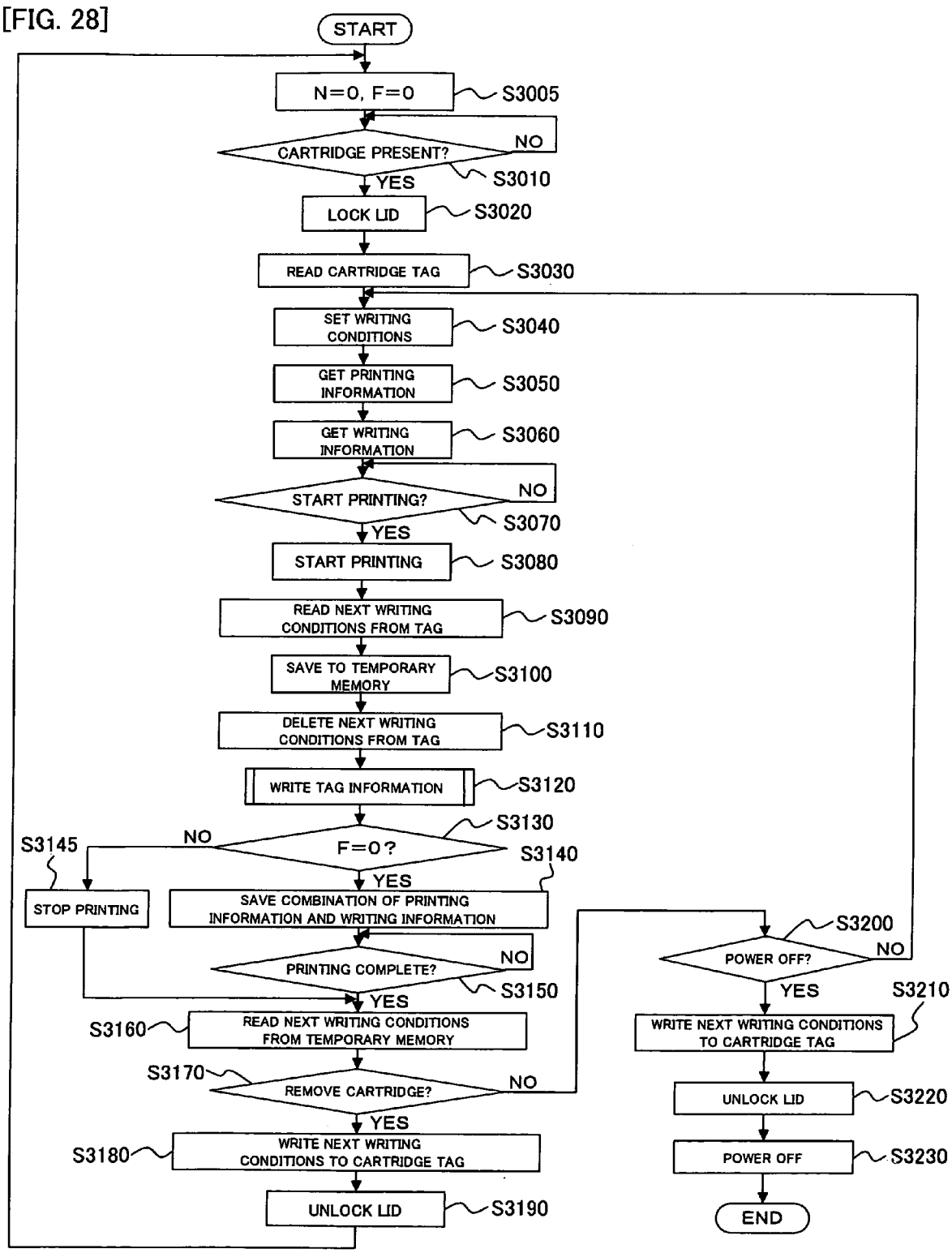

[FIG. 29]
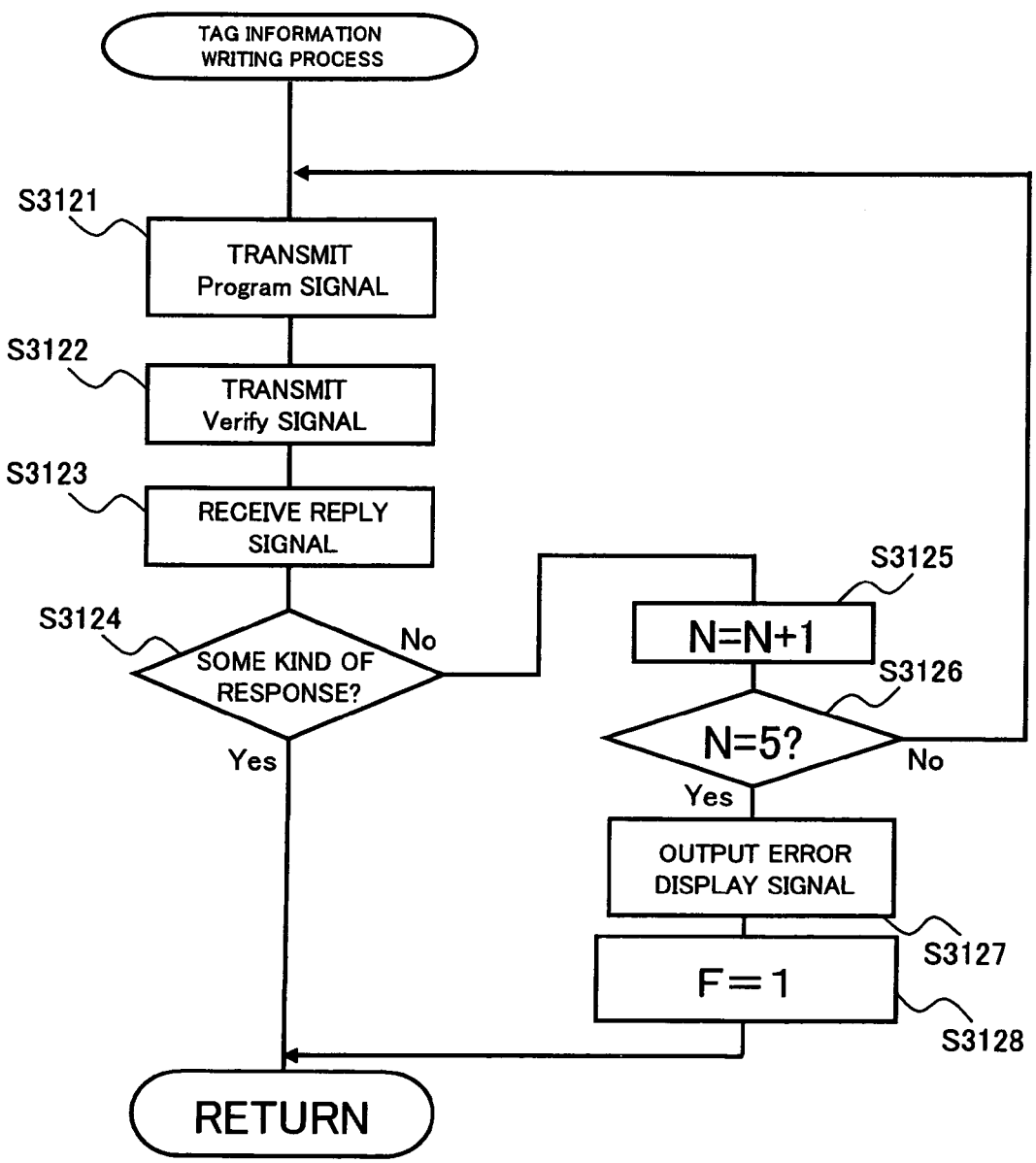

[FIG. 30]
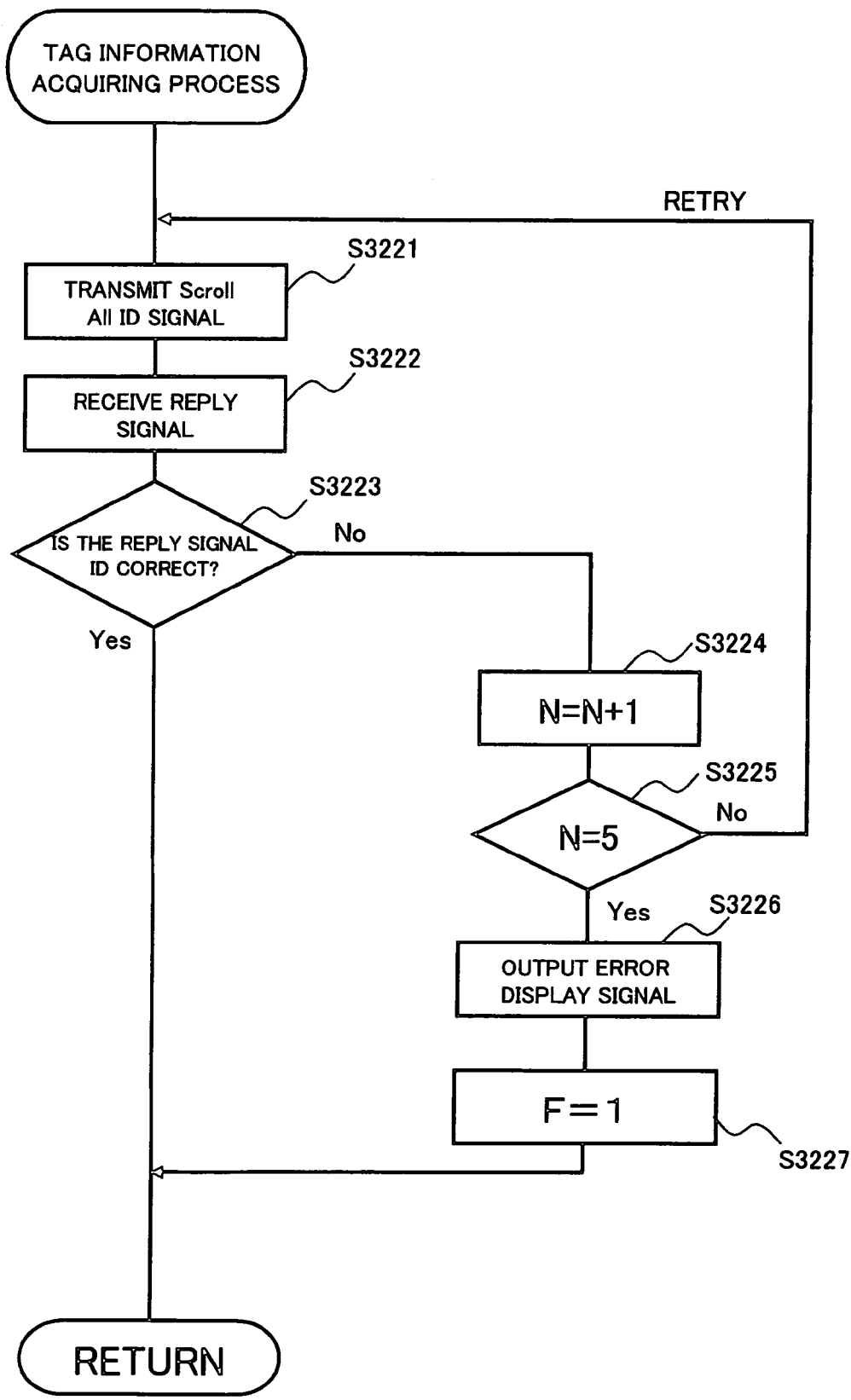

[FIG. 31]
| TAG ID | WRITING CONDITIONS | NEXT WRITING CONDITIONS |
|---|---|---|
[FIG. 32]
| TAG ID | NEXT WRITING CONDITIONS | NUMBER REMAINING |
|---|---|---|
[FIG. 33]
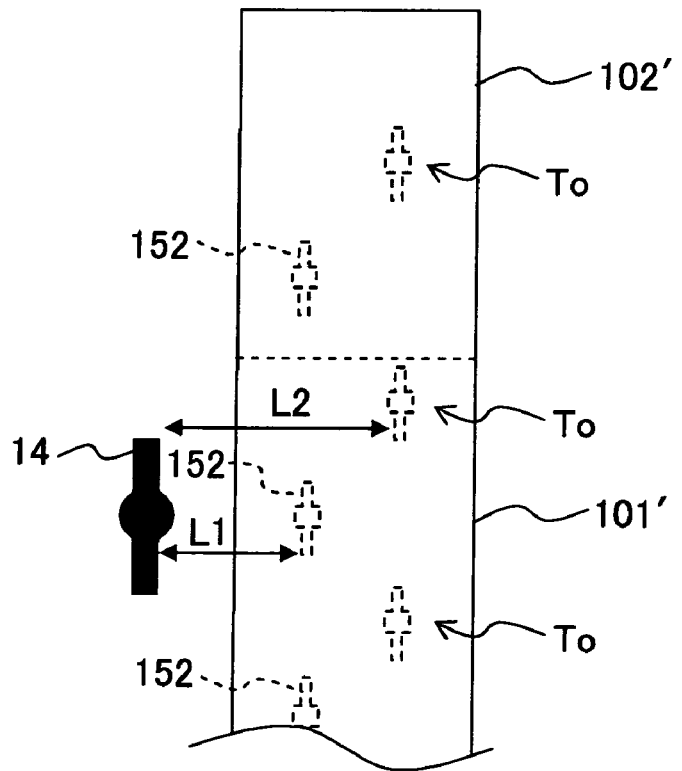

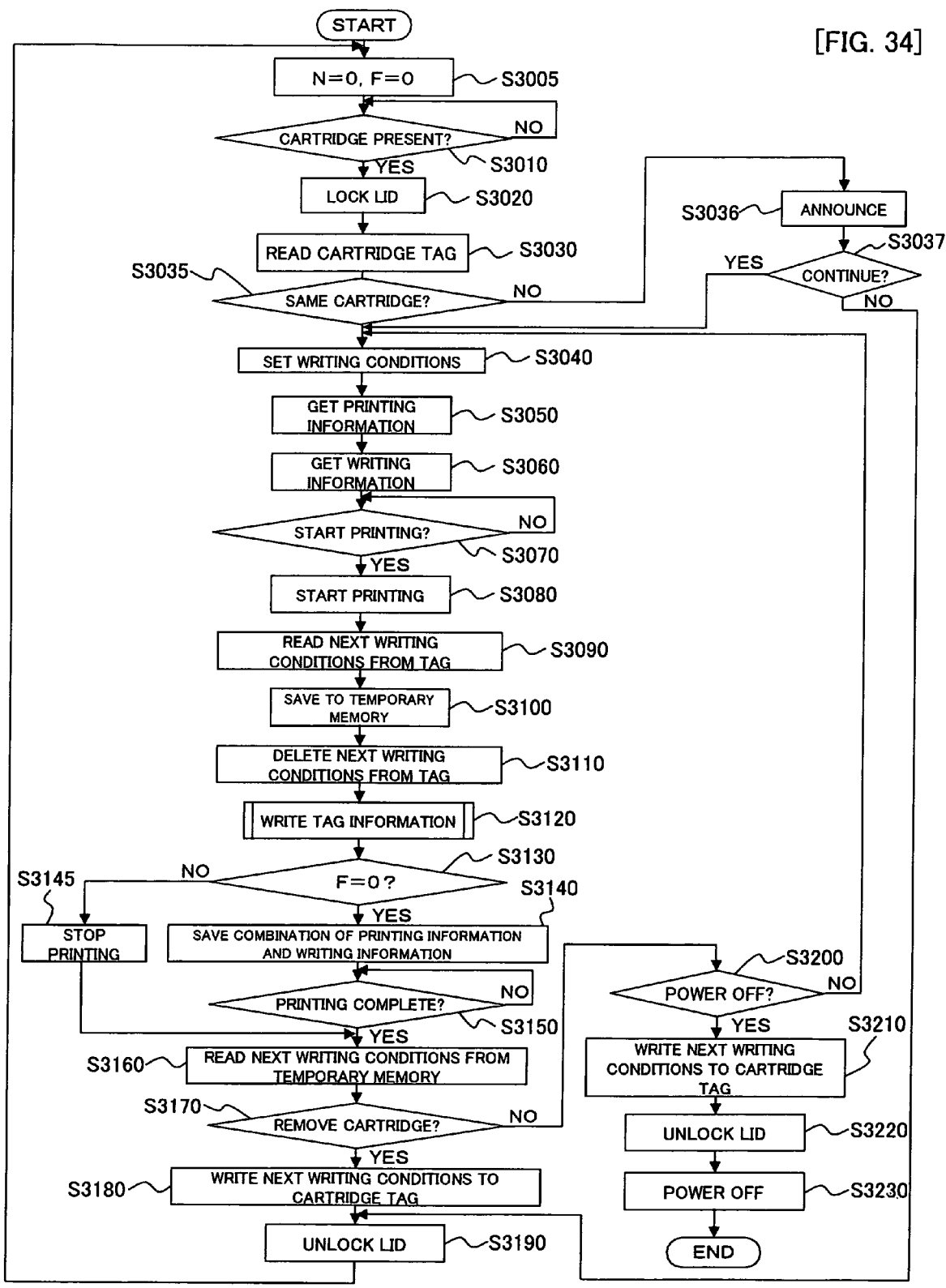
[FIG. 34]

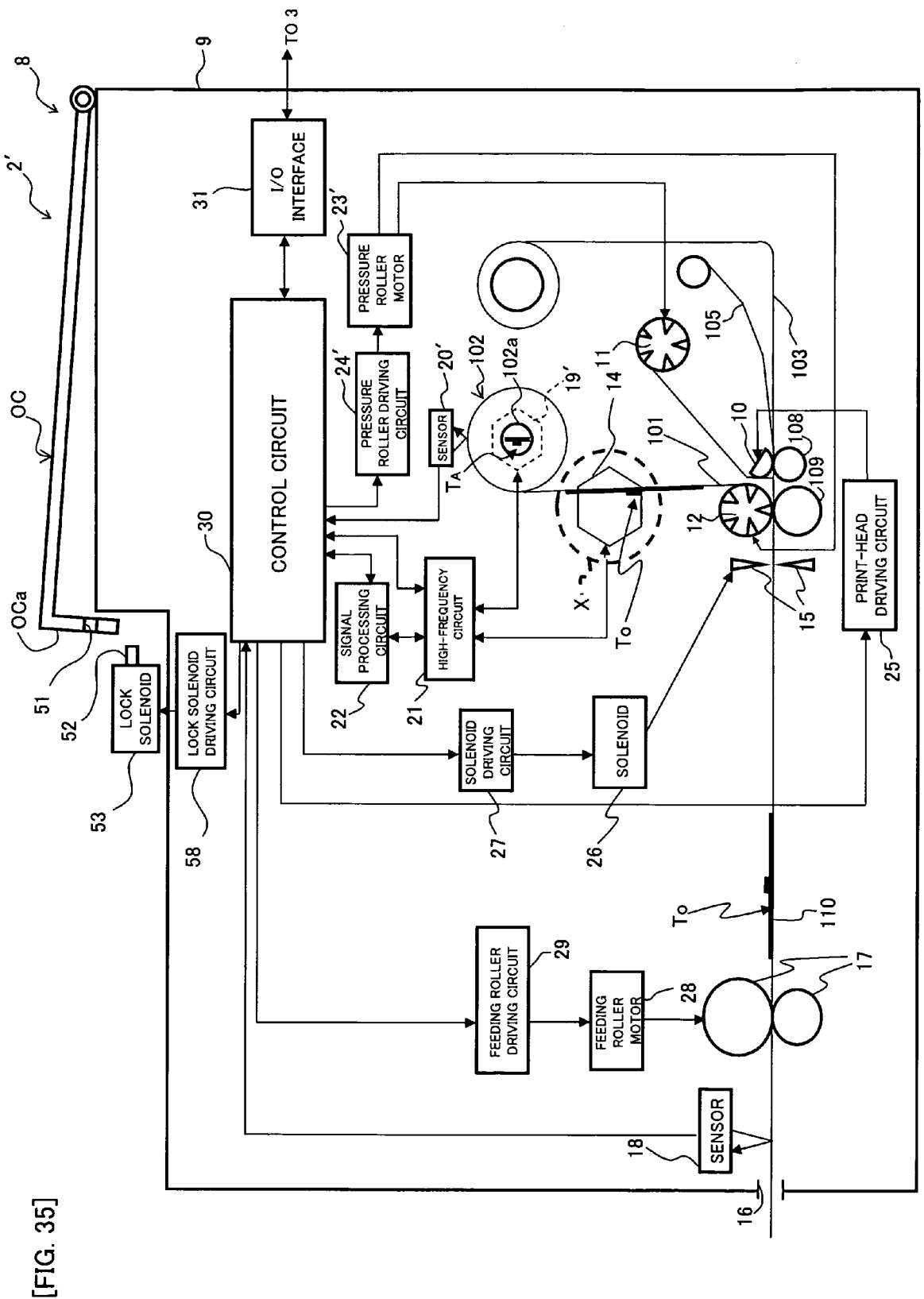
[FIG. 35]

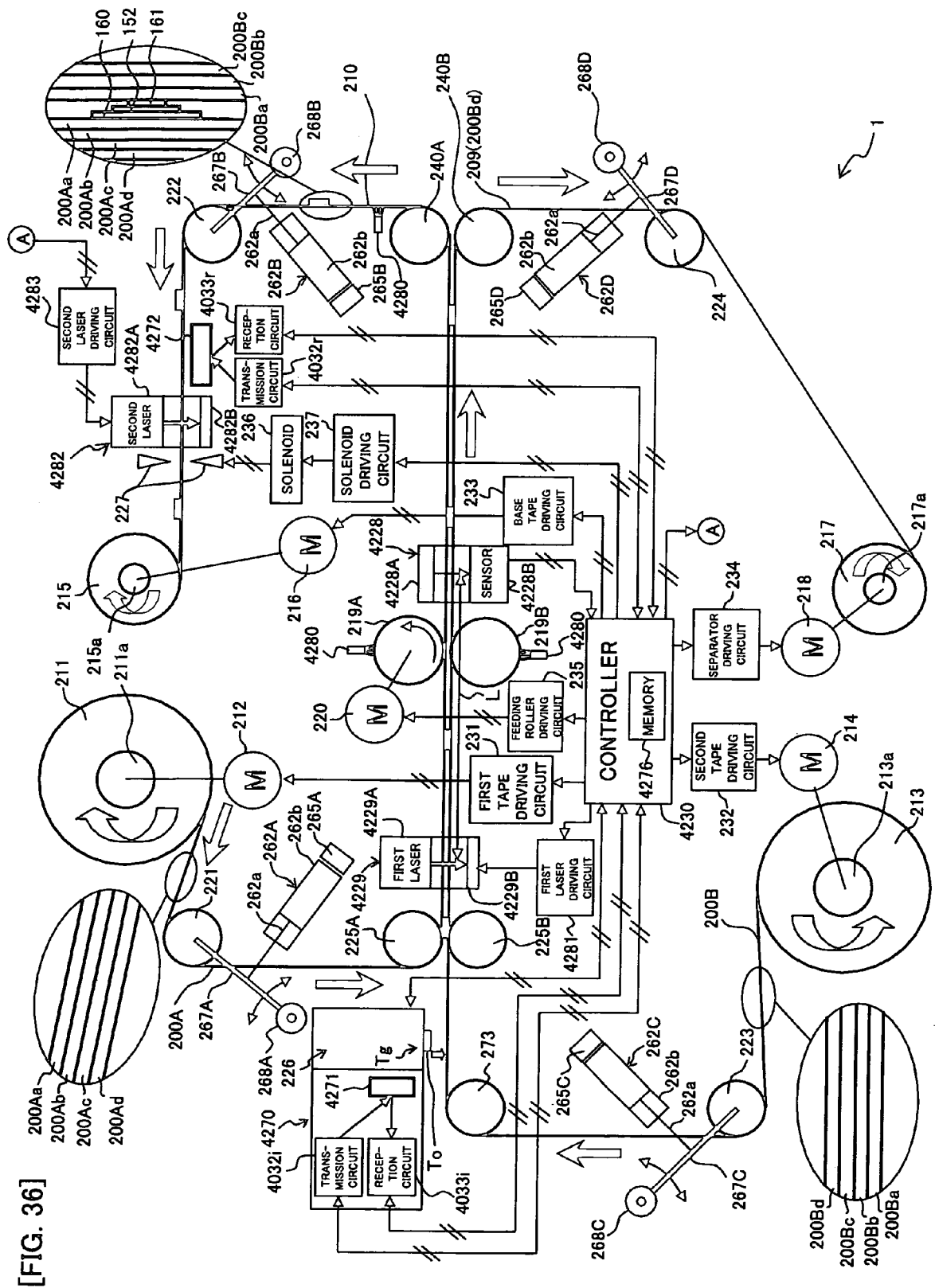
[FIG. 36]

[FIG. 37]
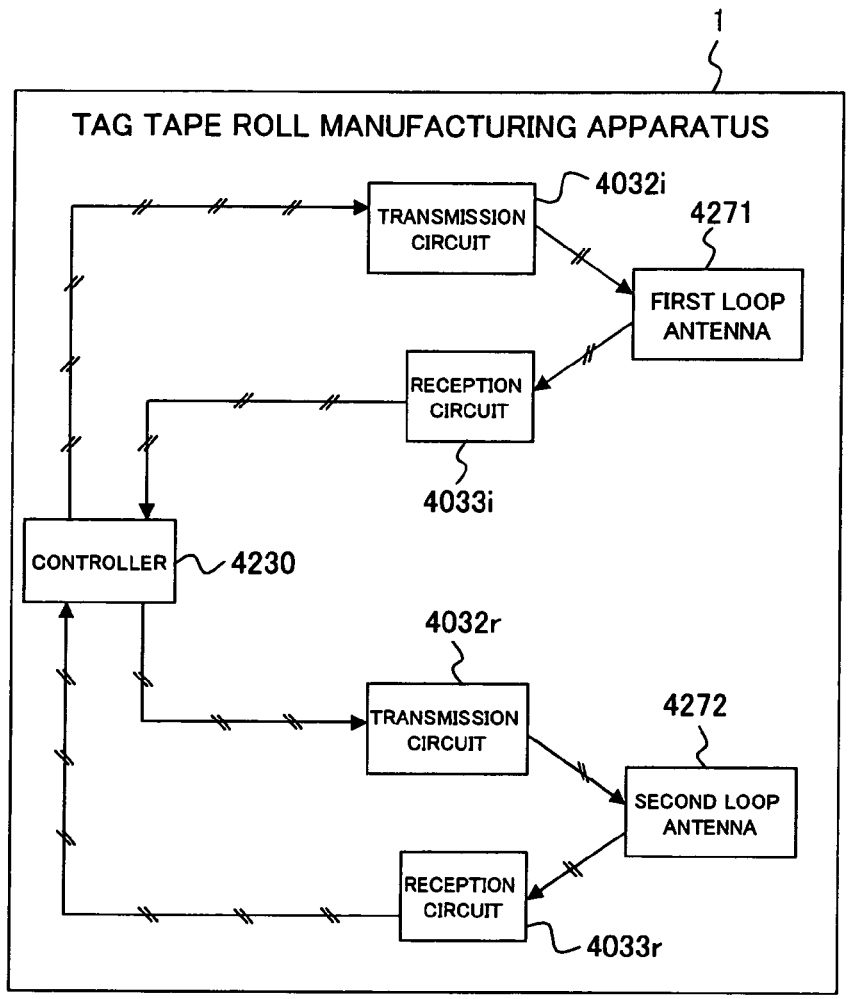
[FIG. 38]
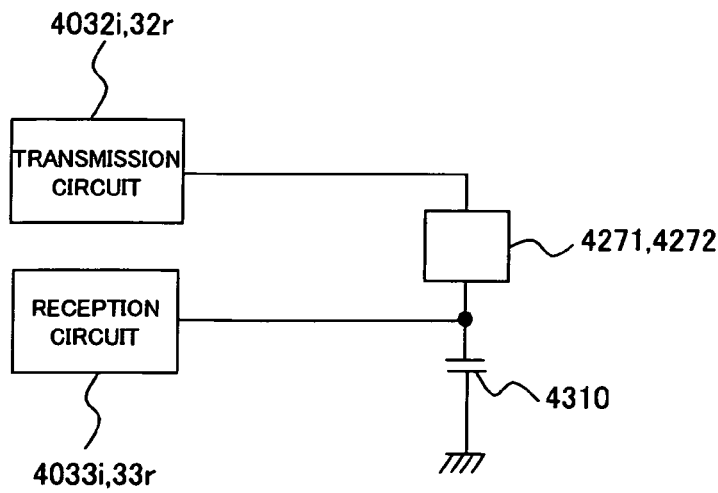

[FIG. 39]
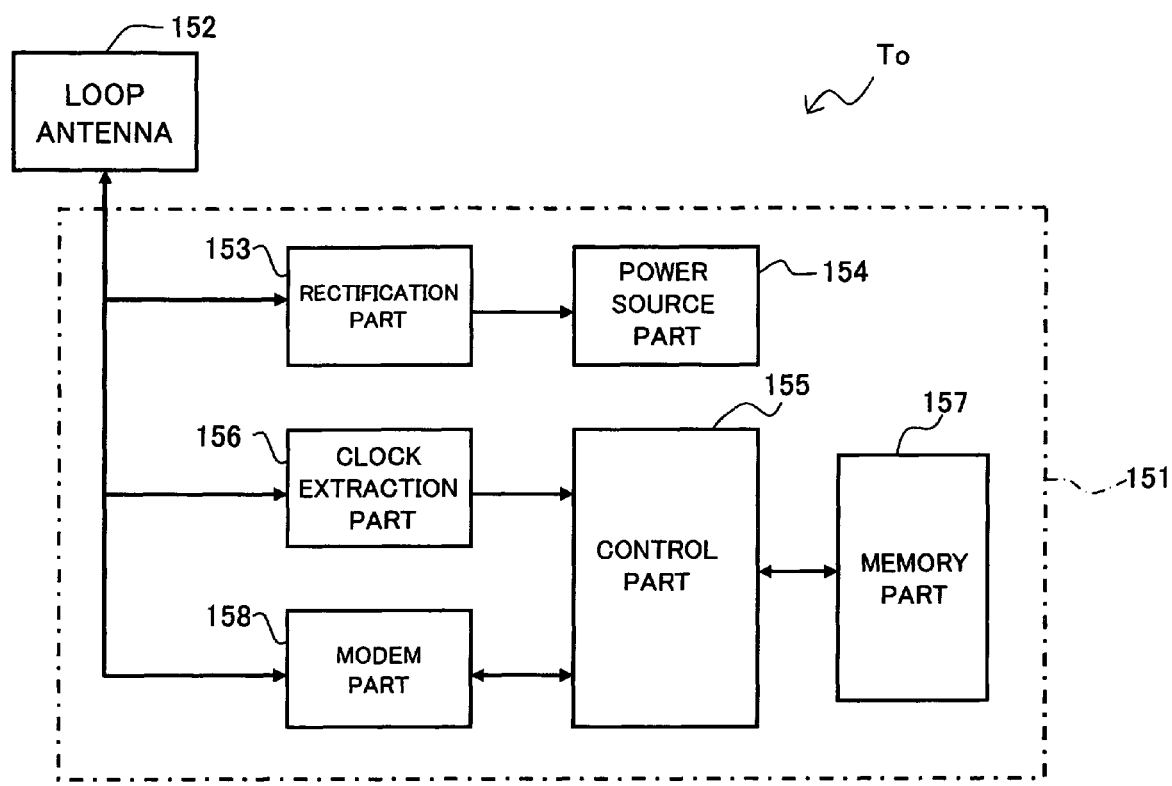

[FIG. 40]
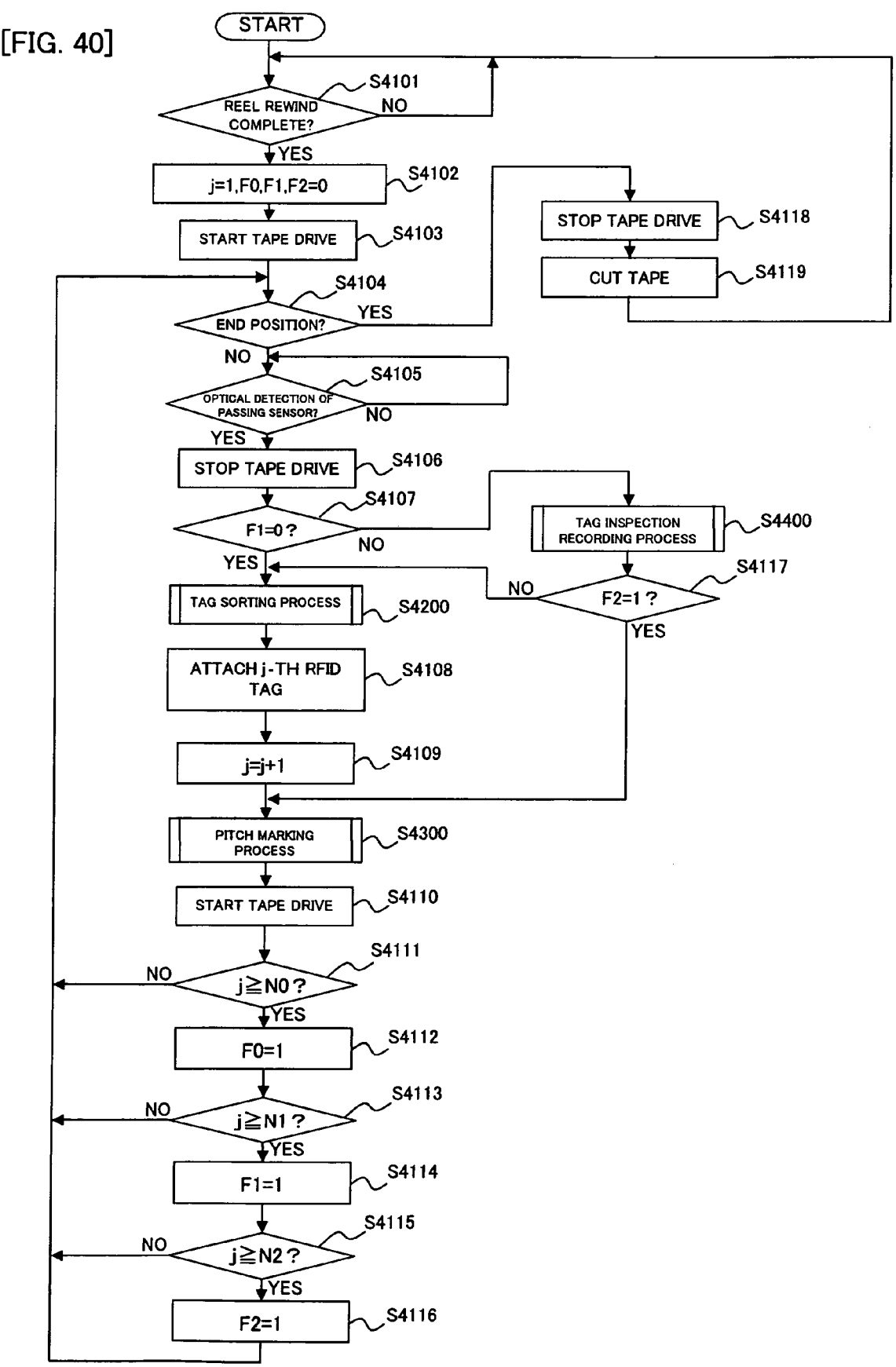

[FIG. 41]
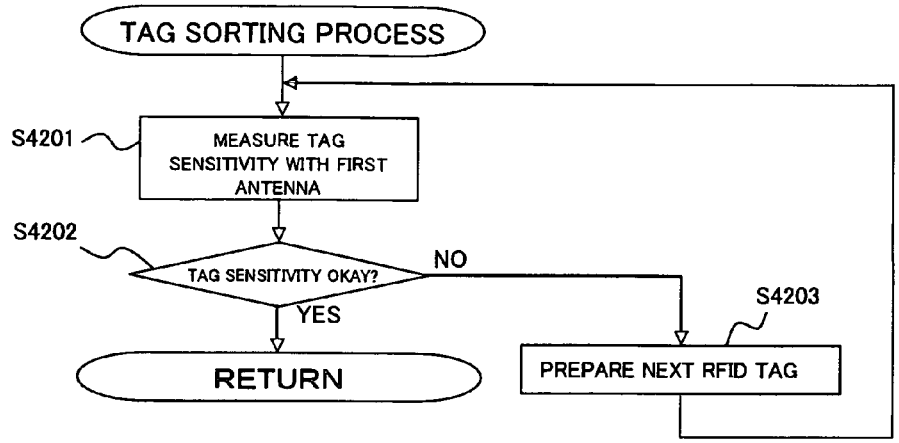
[FIG. 42]
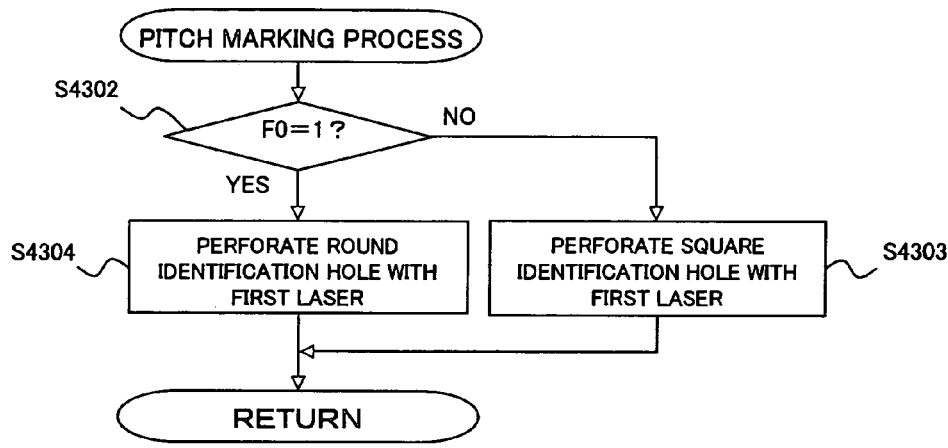
[FIG. 43]
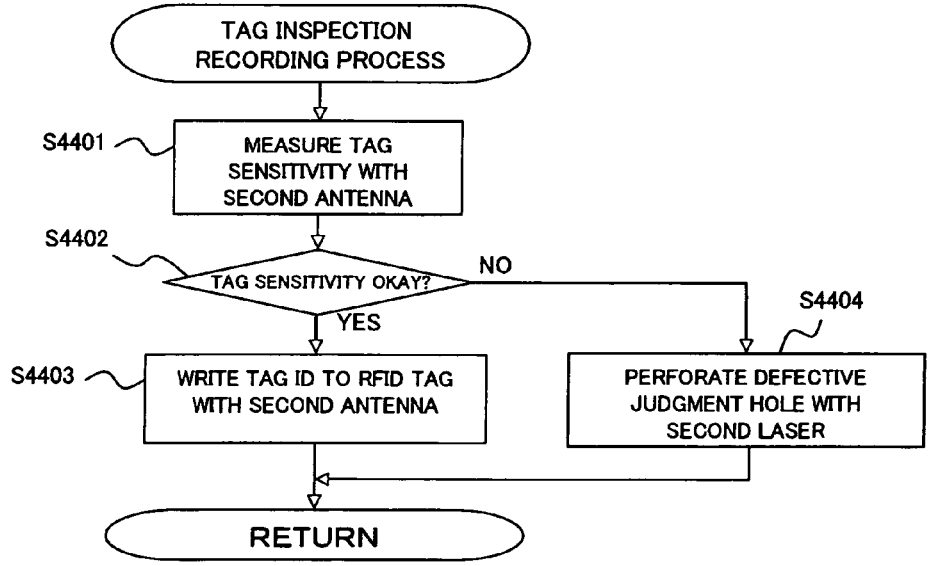

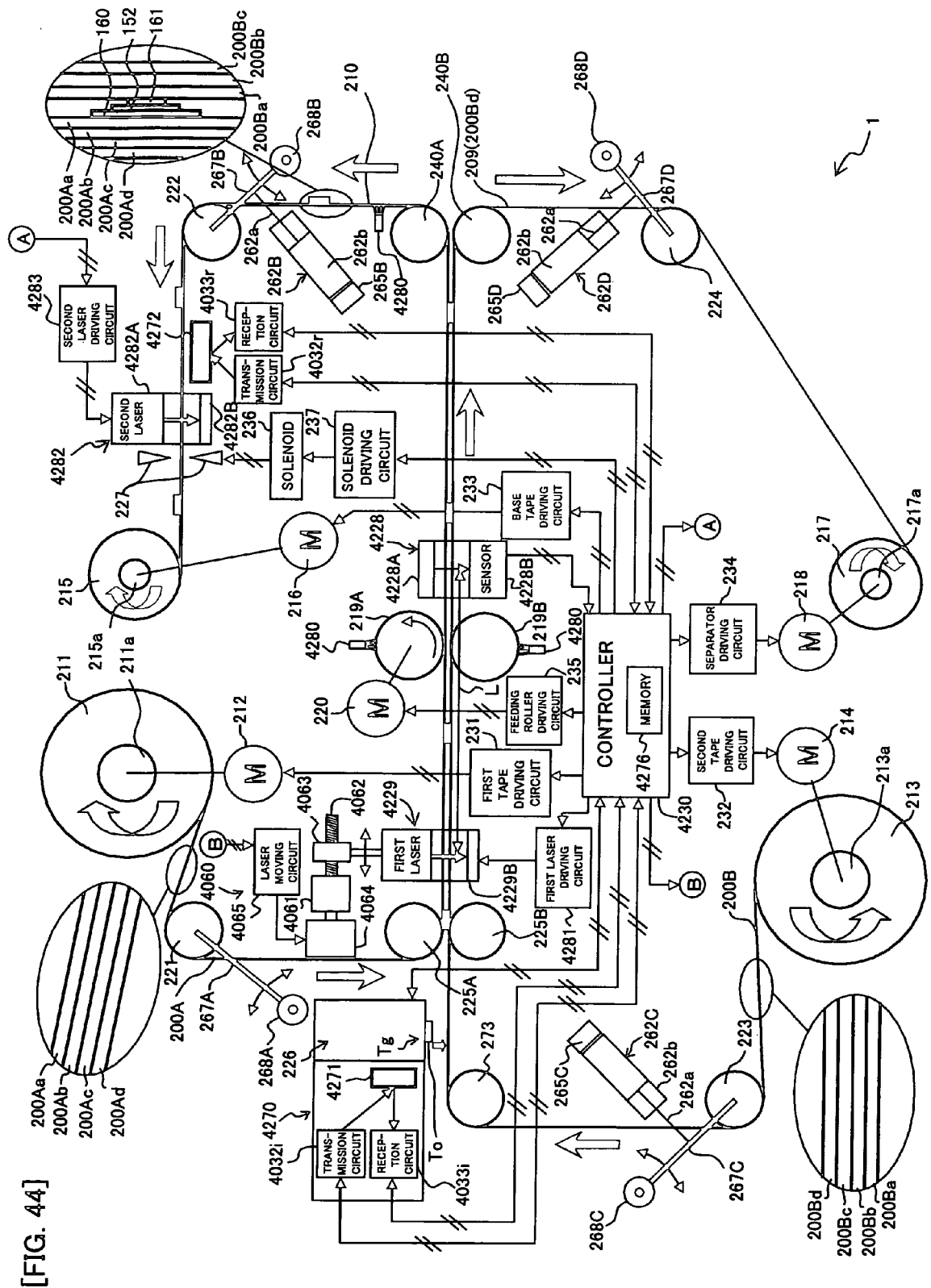
[FIG. 44]

TAPE PROCESSING APPARATUS, TAG LABEL PRODUCING APPARATUS, TAG ASSEMBLY, AND TAPE PROCESSING METHOD

CROSS-REFERENCE TO RELATED APPLICATIONS

This is an application PCT/JP2006/320334, filed Oct. 11, 2006, which was not published under PCT article 21(2) in English and claims the benefits of Japanese Patent application No. 2005-297094 filed Oct. 12, 2005, No. 2005-297089 filed Oct. 12, 2005, No. 2005-297093 filed Oct. 12, 2005, and No. 2005-366089 filed Dec. 20, 2005.

BACKGROUND

1. Field

The present invention relates to a tape processing apparatus and processing method for processing tag tape provided with RFID circuit elements in a lengthwise direction of the tape at predetermined intervals, a tag assembly provided with RFID circuit elements, and a tag label producing apparatus for producing RFID labels using tag tape.

2. Description of the Related Art

In recent years, RFID (Radio Frequency Identification) systems that perform reading/writing between a compact RFID tag and a reader/writer (reading/writing apparatus) in a non-contact manner are known. For example, an RFID circuit element provided to a label-shaped RFID tag comprises an IC circuit part for storing predetermined RFID tag information, and an antenna for transmitting/receiving information, connected to the IC circuit part. With such an arrangement, the reader/writer can access (read/write) the RFID tag information in the IC circuit part even if the RFID tag has become dirty or is arranged in a position where it cannot be seen. Such a technique has been put into practical use in a variety of fields such as asset management, office document control, breast pocket area nametags, and the like.

The RFID label has many uses, and when producing these RFID labels, for example, tag tape is fed out from a tag tape roll onto which is wound a band-like tag tape provided with RFID circuit elements in a lengthwise direction at predetermined intervals, thus feeding each RFID circuit element in sequence. During this feeding, predetermined RFID tag information generated by the apparatus is transmitted via an apparatus antenna to the antenna of each RFID circuit element. By accessing in sequence the RFID tag information of the IC circuit part connected to the antenna of the RFID circuit element, the RFID label is completed.

Conventional tag tape roll manufacturing apparatuses for manufacturing tag tape rolls onto which are wound the tag tape comprise a first supplying means (roll) for supplying a first tape (base sheet) provided with a first adhesive layer (adhesive agent layer), a tag attaching means (circuit sheet arranging means) for attaching at predetermined intervals the RFID circuit elements (electric circuits) for storing information to the first tape supplied by the first supplying means, a second supplying means (roll) for supplying a second tape (cover sheet), a second adhesive layer forming means (adhesive agent layer forming means) for forming a second adhesive layer to the tag bonding position of the second tape supplied by the second supplying means, and a winding means for winding the tag tape produced by bonding the first tape in which TFID circuit elements are attached at predetermined intervals and the second tape in which the second adhesive layer is formed to the tag bonding position, thus achieving a tag tape roll. (See, for example, Patent document 1.)

With this tag tape roll manufacturing apparatus, when the first tape and the second tape are bonded, the RFID circuit elements are sandwiched between the first adhesive layer of the first tape and the second adhesive layer formed on the second tape, and are thus contained inside the tag tape.

With respect to writers (printers) for writing information to such RFID circuit elements, the invention described in Patent Document 2 is known. With this prior art, band-shaped tag tape (base paper) onto which label pieces (RFID labels) are attached in a lengthwise manner at predetermined intervals is fed out from a tag tape roll (supply shaft), and print information corresponding to RFID tag information to be written is printed to the surface of the RFID labels with a printing means (ink jet recording head). The label pieces are thereafter fed downstream in a feeding direction, predetermined RFID tag information generated on the apparatus side is transmitted to the antenna of the RFID circuit element embedded in each label piece, and thus written in sequence to the IC circuit part (IC chip) connected to the antenna. In this manner, RFID labels are completed.

If a write error is produced when writing RFID tag information to the RFID circuit elements, writing is stopped, the tag tape is fed in the opposite direction and returned, the feeding speed of the tag tape is re-set so as to be able to perform successful writing, and writing is re-performed to the RFID circuit element for which writing failed. Reliable writing is thus made possible by re-writing after changing the feeding speed in this manner.

Patent Document 1: JP, A, 2003-6596
Patent Document 2: JP, A, 2003-208573

The prior art has the following problems.

With the prior art described in JP, A, 2003-6596, as described above, a second adhesive layer is formed on a second tape by a second adhesive layer forming means, an RFID circuit element is sandwiched between the second adhesive layer of the second tape and a first adhesive layer of a first tape, and thus a tag tape containing an RFID circuit element is produced. Accordingly, an adhesive application step for forming the second adhesive layer to the second tape is needed, thereby complicating the manufacturing process and incurring an increase in manufacturing cost.

Furthermore, with the prior art described in JP, A, 2003-6596, as described above, a second adhesive layer is formed on a second tape by a second adhesive layer forming means, an RFID circuit element is sandwiched between the second adhesive layer of the second tape and a first adhesive layer of a first tape, and thus a tag tape containing an RFID circuit element is produced. Since this involves disposing RFID circuit elements in the tag tape at a predetermined fixed pitch, the RFID circuit elements are inserted by feeding the first tape and the second tape a predetermined distance corresponding to this pitch, and then stopping the tapes. As a result, there was a need for highly precise control of the feeding means in order to set this feeding distance accurately.

Moreover, when producing RFID labels using a tag label producing apparatus using the completed tag tape, there are cases in which identifiers (marks) formed on the tag tape at a predetermined fixed pitch beforehand are detected using an optical or other method and the tape is positioned, etc., during feeding based on this detection. In such cases, too, when performing marking of such identifiers is done at the same time as producing the tag tape as described above, there is a need to control the feeding means with high precision for the purpose of the fixed pitch marking, as above.

In other words, with the prior art described in JP, A, 2003-6596, it is difficult to simplify the process and obviate the need for high-precision control in order to achieve smooth manufacturing when producing (manufacturing) tag tape or RFID labels.

In general, during manufacturing of RFID circuit elements, variations arise in practice to a certain degree around the intended design specification values for tag characteristic value data such as the communication sensitivity of each RFID circuit element, the memory writing voltage of the IC circuit part, access conditions such as writing time, and so on. When this happens, with the prior art described in JP, A, 2003-6596, tag assemblies are manufactured containing in a predetermined order RFID circuit elements with such variations in their characteristic values. Accordingly, when feeding each RFID circuit element from the manufactured tag assembly and producing (manufacturing) RFID labels by reading or writing RFID tag information, it is impossible to perform wireless communication in an optimum communication mode when reading or writing RFID tag information, since there are variations in the tag characteristic values of the RFID tag circuit elements as described above.

The prior art described in JP, A, 2003-208573 responds to errors which occur during writing due to such variation in tag characteristic values by changing the setting of the feed speed of the tag tape. However, if, for example, an error occurs during writing to an RFID circuit element with a low communication sensitivity, writing will be performed to later RFID circuit elements with the feed speed set slower during writing. As a result, writing will continue to be performed at a slow feed speed if no more errors occur, even if the communication sensitivity of later RFID circuit elements is high, thus lowering the speed of producing RFID labels. Further, in cases where errors occur frequently, the tape feed will be reversed frequently, thus also lowering the speed of producing RFID labels.

In other words, with the prior art described in Patent Documents 1 and 2, it is difficult to improve the communication precision during production (manufacturing) of RFID labels, and thereby to ensure smooth manufacturing.

As described above, with the prior art, it is difficult to ensure smooth manufacturing when manufacturing tag tape or RFID labels.

A first object of the present invention is to provide a tape processing apparatus, a tag assembly, a tag label producing apparatus, and a tape processing method which allows smooth manufacturing of tag tape and RFID labels.

A second object of the present invention is to provide a tape processing apparatus and a tape processing method which allow smooth manufacturing of tag tape by simplifying the manufacturing process and lowering manufacturing costs.

A third object of the present invention is to provide a tape processing apparatus and a tape processing method which allow smooth manufacturing of RFID labels by performing wireless communication with RFID circuit elements in an optimum mode when producing RFID labels.

A fourth object of the present invention is to provide a tag assembly and a tag label producing apparatus which allow smooth manufacturing of RFID labels by producing RFID labels at high speed.

A fifth object of the present invention is to provide a tape processing apparatus which allows smooth manufacturing of tag tape and RFID labels by allowing easy fixed pitch feeding and fixed pitch marking, without performing high-precision control, etc., of a feeding means.

To attain the first object, the first invention comprises a travel processing means for applying travel drive to a tag disposing tape for providing a plurality of RFID circuit elements comprising an IC circuit part that stores information and a tag antenna that performs transmission and reception of information, and a smooth processing means for applying predetermined smooth processing to the tag disposing tape for when forming tag tapes and tag labels, working together with the process of the travel processing means.

In the first invention, the tag disposing tape travels by the travel processing means, and in coordination with this, the smooth processing for when forming tag tapes and tag labels is applied by the smooth processing means. It is thereby possible to ensure smooth manufacturing of tag tape and RFID tag labels.

The second invention is the tape processing apparatus featured by that in the first invention, the travel processing means are a first supplying means and a second supplying means for applying, as the tag disposing tape, a first tape comprising a first adhesive layer, and a second tape comprising a second adhesive layer bonded to the first adhesive layer of the first tape; the smooth processing means is a tag attaching means that attaching the RFID circuit elements at predetermined intervals between the first adhesive layer of the first tape fed out by the first supplying means, and the second adhesive layer of the second tape fed out by the second supplying means, as the smooth process for when forming the tag tape; the tape processing apparatus comprises a take-up means for taking up a tag tape generated by bonding the first tape and the second tape and attaching the RFID circuit elements with the tag attaching means.

In the second invention, the first tape is fed from the first feeding means, the second tape is fed from the second feeding means, and the first adhesive layer provided to the first tape is bonded with the second adhesive layer provided to the second tape. The tag tape is thus generated by the RFID circuit elements being attached at predetermined intervals between the first adhesive layer and the second adhesive layer by the tag attaching means, and the tag tape is wound by the winding means, thus resulting in the tag tape roll. With a constitution in which the first tape and the second tape, each provided with adhesive layers in advance, are provided, and the adhesive layers are bonded, with RFID circuit elements arranged therebetween, there is no need to apply an adhesive material to the tape, as with the conventional arrangement. As a result, it is possible to simplify the manufacturing process and reduce manufacturing costs, since there is no need for an adhesive material process. It is thereby possible to ensure smooth manufacturing of tag tape.

The third invention is the tape processing apparatus featured by that in the second invention, the tag attaching means attaches the RFID circuit elements to the first adhesive layer of the first tape or the second adhesive layer of the second tape on a flat portion in which the first tape or the second tape is in a flat state in a tape feeding path.

In the third invention, the RFID circuit elements are attached to the first adhesive layer of the first tape or the second adhesive layer of the second tape by the tag attaching means, in a flat portion where the first tape or the second tape is in a flat state along the tape feeding path. Thereafter, the first adhesive layer of the first tape is bonded to the second adhesive layer of the second tape, and the tag tape is generated with a constitution in which the RFID circuit elements are arranged therebetween. Thus, by attaching the RFID circuit elements to flat portions of the first tape or the second tape, attachment defects to the adhesive layer are eliminated, and the RFID circuit elements can be attached to the first adhesive layer of the first tape or the second adhesive layer of the second tape reliably.

The fourth invention is the tape processing apparatus featured by that in the second or third invention, the invention further comprises at least one tape feeding means provided between the first and second supplying means and the take-up means along a tape feeding path; and a coordinated control means for providing coordinated control of the tape feeding means and the tag attaching means such that feeding of the first and second tapes stops upon reaching a position at which the RFID circuit element is attached, performing the attachment, and restarting feeding of the first and second tape upon completion of attachment.

By attaching the RFID circuit elements after stopping the tape feed every time the attachment position is reached, it is possible to form a tag tape in which a plurality of RFID circuit elements are arranged at predetermined intervals in the tape lengthwise direction.

The fifth invention is the tape processing apparatus featured by that in the fourth invention, the coordinated control means provides coordinated control of the tape feeding means and the tag attaching means such that a predetermined number of the RFID circuit elements is not attached for every predetermined number of the RFID circuit elements attached.

With the tape processing apparatus of the present invention, a tag tape roll is generated by attaching RFID circuit elements between the first adhesive layer of the first tape and the second adhesive layer of the second tape, and winding this tag tape with the winding means results in the tag tape roll. When the number of RFID circuit elements contained in the wound tag tape roll reaches a predetermined number, the tag tape is cut by the cutter, the wound tag tape roll is removed, a new spool for winding the tag tape is attached, and a tag tape to be newly generated is wound. Tag tape rolls having a predetermined number of RFID circuit elements can thus be manufactured.

At this time, in the fifth invention, a coordinated control means coordinates the tape feeding means and the tag attaching means such that a predetermined number of RFID circuit elements is not attached every time the predetermined number of RFID circuit elements is attached. A tag tape roll can thus be manufactured in which a margin portion is formed in which RFID circuit elements are not attached, every time the predetermined number of RFID circuit elements is attached. As a result, the margin portion can be used as a portion for securing at first to the spool for winding the tag tape onto the winding means, thus improving the windability of the winding means.

The sixth invention is the tape processing apparatus featured by that in the fourth or fifth invention, the tape processing apparatus comprises a first mark provided at predetermined intervals to the first or second tapes; and a mark detecting means for detecting the first mark; wherein the coordinated control means provides coordinated control of the tape feeding means and the tag attaching means such that when the mark detecting means detects the first mark, feeding of the first and second tapes is stopped and the RFID circuit element is attached.

When the first mark is detected provided at predetermined intervals to the first or second tapes by the mark detecting means, the coordinated controlling means provides control such that the tape feed is stepped and an RFID circuit element is attached, thereby making it possible to form a tag tape in which a plurality of RFID circuit elements is arranged at desired intervals in the tape lengthwise direction.

The seventh invention is the tape processing apparatus featured by that in the second to sixth invention, the first tape comprises a first tape base layer that includes said first adhesive layer in one side thereof and a first separation material layer separatably provided to another side of the first tape base layer via a first separation adhesive layer; and the second tape comprises a second tape base layer that includes said second adhesive layer in one side thereof and a second separation material layer separatably provided to another side of the second tape base layer via a second separation adhesive layer.

In the seventh invention, by bonding the first adhesive layer provided to the first tape with the second adhesive layer provided to the second tape, a tag tape is generated having RFID circuit elements at predetermined intervals between the first adhesive layer and the second adhesive layer and with a layer structure of first release layer→first release adhesive layer→first tape base layer→first adhesive layer→second adhesive layer→second tape base layer→second release adhesive layer→second release layer. By, for example, manufacturing a tag tape roll by releasing the second release layer from the above structure and winding it with the winding means, it is possible to make printed RFID labels by bonding the second release adhesive layer of the tag tape fed out from the tag tape roll with the printing tape, and using this bonded tape.

The eighth invention is the tape processing apparatus featured by that in the second to sixth invention, the first tape comprises a first separation material layer separatably provided to the first adhesive layer.

In the eighth invention, by bonding the first adhesive layer of the first tape with the second adhesive layer of the second tape, a tag tape is generated having RFID circuit elements at predetermined intervals between the first adhesive layer and the second adhesive layer and with a layer structure of first release layer→first adhesive layer→second adhesive layer→second tape base layer→second release adhesive layer→second release layer. By, for example, manufacturing a tag tape roll by releasing the second release layer from the above structure and winding it with the winding means, it is possible to make printed RFID labels by bonding the second release adhesive layer of the tag tape fed out from the tag tape roll with the printing tape, and using this bonded tape. Compared to the sixth invention, the layer structure of the generated tag tape can be simplified.

The ninth invention is the tape processing apparatus featured by that in the first second to sixth invention, the second tape comprises a second tape base layer that includes said second adhesive layer in one side thereof, a thermal sensitive layer provided to another side of the second tape base layer for performing predetermined printing, and a non-adhesive layer provided so as to cover a surface of the thermal sensitive layer.

In the ninth invention, by bonding the first adhesive layer provided to the first tape with the second adhesive layer provided to the second tape, a tag tape is generated having RFID circuit elements at predetermined intervals between the first adhesive layer and the second adhesive layer and with a layer structure of first release layer→first release adhesive layer→first tape base layer→first adhesive layer→second adhesive layer→second tape base layer→thermal sensitive layer→non-adhesive layer. By performing desired printing using thermal heads provided with heating elements, for example, on the thermal sensitive layer of the tag tape thus fed out from the tag tape roll, it is possible to make desired printed RFID labels.

The tenth invention is the tape processing apparatus featured by that in the seventh to ninth invention, the invention further comprises a first static electricity eliminating means for eliminating static electricity generated on the first and second tapes, wherein the first static electricity eliminating means is provided in a tape feeding path after a separation position for separating the second separation material layer from the bonded first and second tapes or the second tape.

It is thus possible to eliminate static electricity generated by releasing the second release layer from the bonded first and second tapes or from the second tape. As a result, information is written or read by wireless communication with RFID circuit elements on the tag tape fed from the manufactured tag tape roll, making it possible to prevent adverse effects during wireless communication when making the RFID labels.

The 11th invention is the tape processing apparatus featured by that in the tenth invention, the invention further comprises a second static electricity eliminating means for eliminating static electricity from at least one of the tape feeding means.

It is thus possible to prevent static electricity from forming on the RFID circuit elements in the tag tape due to static electricity from the tape feeding means, and thus adversely affecting wireless communication during making of the RFID labels.

The 12th invention is the tape processing apparatus featured by that in the seventh to eleventh invention, the invention further comprises a mark forming means for providing a second mark to said first separation material layer of said first tape or said bonded first and second tapes every time the tag attaching means attaches a predetermined number of the RFID circuit elements between the first adhesive layer and second adhesive layer.

In the 12th invention, the mark forming means provides a second mark to the first release layer of the first and second tapes thus bonded or the first tape every time the predetermined number of RFID circuit elements has been attached. It is thus possible to, for example, manufacture a tag tape roll provided with the second mark as a mark indicating the end every time the predetermined number of RFID circuit elements is attached. As a result, it is possible to detect the end of the tag tape roll by detecting the second mark when making RFID labels when feeding out the tag tape from the tag tape roll.

The 13th invention is the tape processing apparatus featured by that in the seventh to twelfth invention, the invention further comprises a tag determining means for determining whether or not the RFID circuit element attached between the first adhesive layer and the second adhesive layer by the tag attaching means is suitable; and tag attachment controlling means for controlling the tag attaching means such that the RFID circuit element is not attached in a case in which the tag determining means for determining that the RFID circuit element is unsuitable.

It is thus possible to prevent defective RFID circuit elements from being attached between the first adhesive layer and the second adhesive layer. As a result, it is possible to improve the reliability of the functionality of the tag tape roll thus manufactured.

The 14th invention is the tape processing apparatus featured by that in the first invention, the smooth processing means comprises inspecting means for inspecting characteristics of tag label RFID circuit elements as RFID circuit elements; and a writing means that writes via wireless communication inspection results of the inspecting means to inspection results storing RFID circuit elements for storing inspection results provided to tag assembly capable of storing in a predetermined order a plurality of the tag label RFID circuit elements, and the tape processing apparatus manufactures the tag assembly.

In the fourteenth invention, inspecting means inspects characteristics of a plurality of RFID circuit elements for tag labels contained in a predetermined order in the tag group, and a writing means writes the inspection results (tag characteristic value information) to an inspection result storing RFID circuit element, and the tag group is thus completed. As a result, when making RFID labels using the completed tag groups in the tag label producing apparatus, it is possible to perform communication in a mode that matches the characteristic value information by reading the tag characteristic value information of the RFID circuit element for each tag label stored in the inspection results storing RFID circuit element provided to the tag group, when transmitting and receiving to and from the RFID circuit elements of each tag label. Accordingly, even if variation occurs in the tag characteristic value data during manufacture of RFID circuit elements for each tag label, it is possible to realize an optimum communication mode by controlling the communication mode for each RFID circuit element. It is thereby possible to ensure smooth manufacturing of RFID labels. Wasting energy and adversely affecting communication can be prevented, compared with communication using uniform tag characteristic value data for all RFID circuit elements.

The 15th invention is the tape processing apparatus featured by that in the 14th invention, the writing means writes characteristics of the tag label RFID circuit elements inspected by the inspecting means to the RFID circuit element following the inspected RFID circuit element in a sequential arrangement of a plurality of the tag label RFID circuit elements contained in a predetermined order in the tag assembly as the inspection results storing RFID circuit element.

In the fifteenth invention, the characteristics of RFID circuit elements inspected by the inspecting means are written to the RFID circuit element following the RFID circuit element which was inspected in the ordered arrangement of the plurality of RFID circuit elements for tag labels contained in the tag group in the predetermined order, thus completing the tag group. Thus the tag group is, for example, a tag tape roll formed by winding around a reel member tag tape in which a plurality of RFID circuit elements for tag labels are arranged in a lengthwise direction, and it is possible to perform communication in a mode that reliably matches the characteristics of the RFID circuit element being communicated with by reading the tag characteristic value information stored in the RFID circuit element positioned before the RFID circuit element which is being subject to transmission and reception, when producing RFID labels by performing transmission and reception of sequential information with RFID circuit elements for each tag label in an ordered arrangement which is the opposite of the ordered arrangement when manufacturing the tag group.

The 16th invention is the tape processing apparatus featured by that in the 15th invention, the writing means writes characteristics of the tag label RFID circuit elements inspected by the inspecting means to the tag label RFID circuit element next to the inspected RFID circuit element in the sequential arrangement as the inspection results storing RFID circuit element.

Thus, with the tag label producing apparatus, when producing RFID labels by performing transmission and reception of information with the RFID circuit element of each tag label in an ordered arrangement opposite the ordered arrangement at the time of manufacturing of the tag group, it is possible to perform communication in a mode which reliably matches the characteristics of the RFID circuit element with respect to each RFID circuit element by reading the tag characteristic information stored in the RFID circuit element positioned immediately before the RFID circuit element with which transmission and reception is being performed.

The 17th invention is the tape processing apparatus, featured by that in the 16th invention, the writing means writes to a first RFID circuit element in a sequential arrangement of a plurality of the tag label RFID circuit elements contained in a predetermined order to the tag assembly positional information indicating that this RFID circuit element is in a final sequence position.

With the seventeenth invention, the writing means writes to the first RFID circuit element in the ordered arrangement of the plurality of RFID circuit element for the tag labels contained in the predetermined order in the tag group position information indicating that that RFID circuit element is in the final ordered position. Thus, the tag group is, for example, a tag tape roll formed by winding around a reel member the tag tape in which a plurality of RFID circuit elements for tag labels are arranged in a lengthwise direction, and it is possible to detect that the tag roll has reached its end by detecting the position information indicating that the final ordered position has been reached during transmission and reception with the final RFID circuit element, when producing RFID labels by performing transmission and reception with the RFID circuit element of each tag label in an ordered arrangement opposite the ordered arrangement at the time of manufacturing the tag group, as in the case of producing RFID tag labels by feeding out the tag tape from the tag tape roll in the tag label producing apparatus.

The 18th invention is a tape processing apparatus featured by that in the 14th invention, the writing means writes inspection results associated with all of the tag label RFID circuit elements contained in the tag assembly to the inspection results storing RFID circuit element provided to the tag assembly.

With the eighteenth invention, the writing means writes all the inspection results (tag characteristic value information) for all the RFID circuit elements contained in the tag group to the inspection results storing RFID circuit element, thus completing the tag group. As a result, when producing RFID labels using the completed tag groups in the tag label producing apparatus, it is possible to perform communication with each RFID circuit element in a mode that matches the characteristics by reading the tag characteristic value information for all the RFID circuit elements of the tag labels stored in the inspection results storing RFID circuit element provided to the tag group, before transmitting and receiving to and from the RFID circuit elements of each tag label.

The 19th invention is the tape processing apparatus featured by that in the 14th to 18th invention, the tag assembly is a first cartridge comprising a tag tape as the tag disposing tape in which a plurality of the tag label RFID circuit elements is arranged continuously at predetermined intervals in a tape lengthwise direction, a reel member around an outer circumference of which the tag tape is wound, and a housing that contains the tag tape and the reel member; the inspection results recording RFID circuit element being provided to the housing.

With the nineteenth invention, the inspecting means inspects the characteristics of the RFID circuit elements for all the tag labels arranged at predetermined intervals in the lengthwise direction of the tape, the writing means writes these inspection results (tag characteristic value information) to the inspection storing RFID circuit element provided to the housing, and the tag tape is wound onto a reel member contained inside the housing, thus completing the first cartridge. As a result, when producing RFID labels by feeding out the tag tape from the first cartridge in the tag label producing apparatus, it is possible to perform communication with each RFID circuit element in a mode that matches the characteristics of each RFID circuit element by reading the tag characteristic value information for all the RFID circuit elements of the tag labels stored in the inspection results storing RFID circuit element provided to the housing, before transmitting and receiving to and from the RFID circuit elements for the tag labels provided to the tag tape.

The 20th invention is the tape processing apparatus featured by that in the 14th to 18th invention, the tag assembly is a second cartridge comprising a plurality of rectangular sheet type label material as the tag disposing tape provided with the tag label RFID circuit elements, and a tray member that stores the plurality of rectangular sheet type label material stacked in a flat stack; the inspection results recording RFID circuit element being provided to the tray member.

With the twentieth invention, the inspecting means inspects the characteristics of the RFID circuit elements for the tag labels provided to the strip-like label material, the writing means writes the inspection results (tag characteristic value information) to the inspection results storing RFID circuit element provided to the tray member, and the label material is stacked in a flat stack, thus completing the second cartridge. As a result, when producing RFID labels by feeding out the label material from the second cartridge in the tag label producing apparatus, it is possible to perform communication with each RFID circuit element in a mode that matches the characteristics of each RFID circuit element by reading the tag characteristic value information for all the RFID circuit elements of the tag labels stored in the inspection results storing RFID circuit element provided to the tray member, before transmitting and receiving to and from the RFID circuit elements for the tag labels provided to the label material.

The 21st invention is the tape processing apparatus featured by that in the 14th to 18th invention, the tag assembly is a tag tape roll comprising a tag tape as the tag disposing tape in which a plurality of the tag label RFID circuit elements is arranged continuously at predetermined intervals in a tape lengthwise direction, and a reel member around an outer circumference of which the tag tape is wound; the inspection results recording RFID circuit element being provided inside the reel member.

With the twenty-first invention, the inspecting means inspects the characteristics of the RFID circuit elements for all the tag labels arranged at predetermined intervals in the lengthwise direction of the tape, the writing means writes these inspection results (tag characteristic value information) to the inspection storing RFID circuit element embedded in the reel member, and the tag tape is wound onto the reel member, thus completing the tag tape roll. As a result, when producing RFID labels by feeding out the tag tape from the tag tape roll in the tag label producing apparatus, it is possible to perform communication with each RFID circuit element in a mode that matches the characteristics of each RFID circuit element by reading the tag characteristic value information for all the RFID circuit elements of the tag labels stored in the inspection results storing RFID circuit element embedded in the reel member, before transmitting and receiving to and from the RFID circuit elements for the tag labels provided to the tag tape.

The 22nd invention is the tape processing apparatus featured by that in the 14th to 21st invention, the writing means writes inspection results associated with all of the tag label RFID circuit elements contained in the tag assembly to a last RFID circuit element in an order sequence of the plurality of tag label RFID circuit elements contained in a predetermined order in the tag assembly, as the inspection results storing RFID circuit element.

Thus, the tag group is, for example, a tag tape roll formed by winding around a reel member the tag tape in which a plurality of RFID circuit elements for tag labels are arranged in a lengthwise direction, and the RFID circuit element in which the tag character value information for all the RFID circuit elements for the tag labels is positioned in the first order, when producing RFID labels by performing transmission and reception with the RFID circuit element of each tag label in an ordered arrangement opposite the ordered arrangement at the time of manufacturing the tag group, as in the case of producing RFID tag labels by feeding out the tag tape from the tag tape roll in the tag label producing apparatus. As a result, it is possible to perform transmission and reception with each RFID circuit element after reading the tag characteristic value information for all the RFID circuit elements for the tag labels first, thus making it possible to perform communication in a mode that matches the characteristics of each RFID circuit element.

The 23rd invention is the tape processing apparatus featured by that in the 14th to 22nd invention, the tag label RFID circuit elements comprise an IC circuit part that stores information, and a tag antenna connected to the IC circuit part that performs transmission and reception of information; and the inspecting means inspects a sensitivity of the tag label RFID circuit elements as a characteristic of the tag label RFID circuit elements, and the writing means writes sensitivity information of the inspected RFID circuit elements.

As a result, when making RFID labels using the manufactured tag group, it is possible to perform communication with a transmission output that matches sensitivity information, by reading the sensitivity information of the RFID circuit element for each tag label stored in the inspection results storing RFID circuit element provided to the tag group, when transmitting and receiving to and from the RFID circuit elements of each tag label. Accordingly, even if variation occurs in the sensitivity of each RFID circuit element during manufacturing of the RFID circuit elements, it is possible to realize an optimum communication mode by controlling the transmission output for each RFID circuit element of the tag labels. Wasting energy and adversely affecting communication can thus be prevented, compared with communication using a uniform transmission output for all RFID circuit elements.

The 24th invention is the tape processing apparatus featured by that in the 23rd invention, the inspecting means comprises a transmission output controlling means for increasing in steps a transmission output for inspecting sensitivity of the tag label RFID circuit elements.

With the twenty-fourth invention, the transmission output for inspecting the sensitivity of the RFID circuit elements is increased in steps by a transmission output controlling means. Specifically, after executing communication with an RFID circuit element at a relatively small transmission power which results in an access failure, the transmission power is gradually increased in steps until an access is determined as successful. It is thus possible to inspect the sensitivity of the RFID circuit elements using the minimum transmission output needed.

The 25th invention is the tape processing apparatus featured by that in the 14th to 24th invention, the invention further comprises a tag attaching means for attaching a plurality of the tag label RFID circuit elements to an attachment material at predetermined intervals as the tag disposing tape; wherein the inspecting means inspects characteristics of said tag label RFID circuit elements before the tag attaching means attaches the tag label RFID circuit elements to the attachment material.

With the twenty-fifth invention, the characteristics are inspected with an inspection apparatus before attaching RFID circuit elements for tag labels to an attachment material. Thus, for example, if the inspection results are significantly at variance with normal characteristic values, it is possible not to attach defective RFID circuit elements to the attachment material, by removing them from the tag attaching means. It is thus possible to improve the quality of the manufactured tag group.

The 26th invention is the tape processing apparatus featured by that in the first invention, the travel processing means is a tape feeding means for feeding the tag disposing tape; the smooth processing means comprises a first marking means for assigning an identifier for detection to the tag disposing tape fed by the tape feeding means; and a detecting means disposed downstream in a feeding direction by the tape feeding means of the first marking means for detecting the identifier assigned by the first marking means; the tape processing apparatus further comprises a feed control means for controlling the tape feeding means and the first marking means.

With the twenty-sixth invention, the inspecting means is provided downstream of the first marking means in the feeding direction, and the feed controlling means controls the tape feeding means according to the inspection results. It is thus possible to stop the feeding of the tape feeding means, perform the marking of the identifiers with the first marking means, then restart feeding by the tape feeding means, and stop feeding if the identifier is detected by the detecting means, and perform the same marking on the trailing side during this stoppage, repeating this thereafter. Thus, regardless of the feeding mode or the feeding status of the tape feeding means (e.g., if slippage occurs), feeding can always be performed for a predetermined fixed dimension (e.g., in feeding direction distance from the first marking means to the detecting means) in a single feeding process from the feeding stoppage until the next feeding stoppage. Fixed-pitch feeding and fixed-pitch marking can thus be performed easily, without using high-precision control and so on of the tape feeding means. It is thereby possible to ensure smooth manufacturing of RFID labels. Further, if the predetermined fixed dimension is made so as to allow variable settings, many types of fixed-pitch feeding and fixed-pitch marking can easily be realized with a single tape processing apparatus.

The 27th invention is the tape processing apparatus featured by that in the 26th invention, the feed controlling means provides coordinated control of the tape feeding means and the first marking means so as to repeatedly execute a first procedure for assigning the identifier by the first marking means when feeding of the tag disposing tape is stopped, a second procedure for restarting feeding of the tag disposing tape after assigning the identifier, and a third procedure for stopping feeding of the tag disposing tape after feeding being restarted when the identifier is detected by the detecting means.

It is possible to perform easy fixed-pitch marking without using high-precision control and so on of the tape feeding means by performing marking of an identifier using the first marking means in a first step after stopping the feeding by the tape feeding means, then restarting feeding by the tape feeding means in a second step, stopping feeding in a third step if the identifier is detected with the detecting means, and then performing the same marking on the trailing side during this stoppage, repeating this thereafter.

The 28th invention is the tape processing apparatus featured by that in the 27th invention, the invention further comprises a tag attaching means for attaching at predetermined intervals to the tag disposing tape RFID circuit elements comprising an IC circuit part that stores information, and a tag antenna connected to the IC circuit part.

Tag-containing tape can thus be manufactured by attaching RFID circuit elements to a tag disposing tape fed at a fixed pitch.

The 29th invention is the tape processing apparatus featured by that in the 28th invention, the feed controlling means provides coordinated control of the tag attaching means and the tape feeding means so as to execute a fourth procedure for attaching the RFID circuit element to the tag disposing tape when feeding of the tag disposing tape is stopped in the third procedure.

It is possible to perform fixed-pitch tag attachment to the tag disposing tape fed at a fixed pitch by attaching RFID circuit elements to the tag disposing tape using the tag attaching means in a fourth step during stoppage.

The 30th invention is the tape processing apparatus featured by that in the 29th invention, the feed controlling means provides coordinated control of the first marking means, the tag attaching means, and the tape feeding means so as to perform assigning of the identifier in the first procedure and attaching of RFID circuit elements in the fourth procedure when feeding of the tag disposing tape is stopped in the third procedure.

After performing marking of an identifier using the first marking means in the first step when the feeding by the tape feeding means is stopped, the feeding by the tape feeding means is restarted in the second step, the feeding is stopped in the third step if the identifier is detected by the detecting means, and in the fourth step the tag attaching means attaches the RFID circuit elements to the tag disposing tape. By performing the same marking on the trailing side during this stoppage and tag attachment and repeating this, fixed-pitch tag attachment can be performed easily without using high-precision control and so on of the tape feeding means.

The 31st invention is the tape processing apparatus featured by that in the 29th or 30th invention, the invention further comprises inspecting means for inspecting characteristics of the RFID circuit elements.

The integrity of the RFID circuit elements embedded for manufacturing the tag-containing tape can thus be inspected.

The 32nd invention is the tape processing apparatus featured by that in the 31st invention, the feed controlling means provides coordinated control of the inspecting means and the tape feeding means so as to execute a fifth procedure for inspecting characteristics of the RFID circuit elements when feeding of the tag disposing tape is stopped in the third procedure.

It is possible to attaching tags after characteristic inspection at a fixed pitch by attaching RFID circuit elements to the tag disposing tape fed at a fixed pitch with the tag attaching means in the fourth step during stoppage and at the same time inspecting the RFID circuit elements in a fifth step during that stoppage. It is also possible to inspect the RFID circuit elements embedded in the tag disposing tape during stoppage on the downstream side after feeding, in which case even if the characteristics have changed after embedding and during feeding (e.g., deterioration or breakage due to vibration or outside forces during feeding), this can be detected reliably.

The 33rd invention is the tape processing apparatus featured by that in the 32nd invention, the feed controlling means provides coordinated control of the first marking means, the tag attaching means, the inspecting means, and the tape feeding means so as to perform assigning of the identifier in the first procedure, attaching of RFD circuit elements in the fourth procedure, and inspecting of characteristics of RFID circuit elements in the fifth procedure, when feeding of the tag disposing tape is stopped in the third procedure.

After performing marking of an identifier using the first marking means in the first step when the feeding by the tape feeding means is stopped, the feeding by the tape feeding means is restarted in the second step, the feeding is stopped in the third step if the identifier is detected by the detecting means, and in the fourth step the tag attaching means attaches the RFID circuit elements to the tag disposing tape, while performing characteristic inspection of the RFID circuit elements in the fifth step. By performing the same marking on the trailing side during this stoppage and tag attachment and repeating this, fixed-pitch tag attachment can be performed easily without using high-precision control and so on of the tape feeding means, and tag characteristic inspection can be performed during attachment or after feeding.

The 34th invention is the tape processing apparatus featured by that in the 33th invention, the invention further comprises a second marking means for assigning a second identifier to portions of the tag disposing tape corresponding to the RFID circuit element when the characteristics of the RFID circuit element being inspected do not attain a predetermined standard based on inspection results of the inspecting means.

Predetermined processes can thus be performed on RFID circuit elements whose integrity has deteriorated by distinguishing them from RFID circuit elements whose integrity is maintained as normal.

The 35th invention is the tape processing application featured by that in the 28th to 34th invention, the tape feeding means feeds the tag disposing tape comprising a tape base layer having a mounting adhesive layer for attachment of the RFID circuit elements, an affixing adhesive layer for attaching the tape base layer to what is attached, and an attachment separation material layer for covering an attachment side of the affixing adhesive layer.

By releasing the release layer on the bonding side of the RFID label, and exposing the affixing adhesive layer, the user can easily attach to the attachment side, when producing RFID layers by cutting the manufactured tag-containing tape.

The 36th invention is the tape processing apparatus featured by that in the 28th to 35th invention, the invention further comprises information assigning means for assigning identification information or arrangement information associated with the plurality of RFID circuit elements provided to the tag disposing tape to each of the RFID circuit elements or a corresponding region of the tag disposing tape.

When using the manufactured tag-containing tape by mounting it on the tag label producing apparatus, it is possible to ensure smooth accessing of RFID circuit elements by wireless communication by acquiring the identifying information for each RFID circuit element, or by announcing to the operation of the apparatus (the user) the order of the RFID circuit element, the remaining number, the number used, or the like.

The 37th invention is the tape processing apparatus featured by that in the 26th to 36th invention, the first or second marking means is a perforating means for forming holes as identifiers in the tag disposing tape.

An identifier can reliably be formed mechanically by forming a hole with a perforating means, thus making it possible to easily detect the identifier using an optical method on the detecting means side.

The 38th invention is the tape processing apparatus featured by that in the 37th invention, the perforating means is a laser processing means for performing perforation using laser light.

An identifier can be formed easily and reliably by forming a hole using a laser processing means.

The 39th invention is the tape processing apparatus featured by that in the 37th or 38th invention, the perforating means performs perforation when forming the plurality of holes at predetermined intervals in the tag disposing tape such that shapes of holes in specific sites differ from shapes of other holes.

In a case in which, for example, the manufactured tag-containing tape is envisioned being used by being mounted on the tag label producing apparatus at predetermined length units, if a different mode is used for the feeding direction edge for the predetermined unit (in other words, the end edge when feeding from the tag label producing apparatus), this can be used in the tag label producing apparatus when detecting the tape end during feeding.

The 40th invention is the tape processing apparatus featured by that in the 39th invention, the perforating means performs perforation such that a shape of the holes in specific sites is substantially square and a shape of the other holes is substantially round.

It is thus possible to, for example, perform ordinary equal-pitch detection using substantially round holes and to perform tape end detection using substantially square holes, during feeding with the tag label production apparatus. By having a rectilinear place in a substantially square shape, it is possible to obtain a steep signal during optical detection, which therefore makes achieving relatively high precision easier.

The 41st invention is the tape processing apparatus featured by that in the 36th to 40th invention, the tape processing apparatus is constituted such that an arrangement interval between the first marking means and the detecting means is changeable.

By changing the arrangement interval between the first marking means and the detecting means, the fixed feeding dimension per pitch unit when feeding can be set variably. As a result, many types of fixed-pitch feeding and fixed-pitch marking can be realized simply using a single tape processing apparatus.

The 42nd invention is the tape processing apparatus featured by that in the 41st invention, at least one of the first marking means and the detecting means is constituted such that the arrangement interval can be adjusted manually.

Setting the fixed feeding dimension per pitch when feeding to a variety of values through manual adjustment makes it possible to realize many types of fixed-pitch feeding and fixed-pitch marking simply using a single tape processing apparatus.

The 43rd invention is the tape processing apparatus featured by that in the 41st invention, the invention further comprises a driving means for driving at least one of the first marking means and the detecting means so as to change the arrangement interval; and arrangement adjusting means for controlling the driving means in response to a predetermined input signal, and capable of setting the arrangement interval to a value corresponding to the input signal.

Setting the fixed feeding dimension per pitch when feeding to a variety of values using automatic adjustment based on an input signal makes it possible to realize many types of fixed-pitch feeding and fixed-pitch marking even more simply using a single tape processing apparatus.

In order to achieve the first object, the forty-fourth invention comprises an apparatus housing, a tag assembly attaching portion provided to the apparatus housing that suppliably stores continuously in a predetermined order a plurality of RFID tag circuit elements having an IC circuit part that stores information and a tag antenna connected to the IC circuit part, and is capable of attaching tag assemblies imparted with predetermined smooth processing factors for when forming tag labels, corresponding to each of the plurality of RFID circuit elements, an apparatus antenna that performs transmission and reception of information using wireless communication with the IC circuit parts provided to the RFID circuit elements, access information generating means for generating access information to the IC circuit parts of the RFID circuit elements, information transmitting means that accesses the IC circuit parts by transmitting the access information generated by the access information generating means to the tag antenna provided to the RFID circuit elements in a non-contact manner via the apparatus antenna, and a smooth processing means for performing predetermined smooth processing when forming tag labels based on the smooth processing factors.

In the tag label manufacturing apparatus of the forty-fourth invention, a plurality of RFID circuit elements are suppliably disposed in a fixed order in a tag assembly, and RFID tag labels are produced continuously by reading or writing information to the IC circuit parts by transmitting access information generated by the access information generating means to the tag antenna of the RFID circuit elements via the apparatus antenna using the information transmitting means, with respect to the RFID circuit elements supplied in a predetermined order from the tag assembly. At this time, the predetermined smooth processing factors for when tag labels are formed are imparted to the tag assembly corresponding to the plurality of RFID circuit elements, and the smoothness processing means performs the predetermined smooth processing during formation of tag labels based on these smooth processing factors. It is thereby possible to ensure smooth manufacturing of RFID labels.

The 45th invention is the tag label producing apparatus featured by that in the 44th invention, the tag assembly loading portion is capable of loading the tag assembly in which information associated with the tag characteristic values of a second RFID circuit element supplied with a turn later than a first RFID circuit element is stored as said smooth processing factor in said IC circuit part of said first RFID circuit element supplied with a former than said second RFID circuit element; and the smooth processing means comprises a first reading means for reading information associated with the tag characteristic values of the second RFID circuit element as the smooth processing factor stored in the IC circuit part of the first RFID circuit element, a storing means for storing information associated with the tag characteristic values of the second RFID circuit element read by the first reading means, and a transmission controlling means for controlling a transmission mode to the second RFID circuit element from the information transmitting means so as to match the information associated with the tag characteristic values stored in the storing means.

In the tag label manufacturing apparatus of the forty-fifth invention, a plurality of RFID circuit elements are suppliably disposed in a fixed order in a tag assembly, and RFID tag labels are produced continuously by reading or writing information to the IC circuit parts by transmitting access information generated by the access information generating means to the tag antenna of the RFID circuit elements via the apparatus antenna using the information transmitting means, with respect to the RFID circuit elements supplied in a predetermined order from the tag assembly. At this time, in the plurality of RFID circuit elements contained in the tag group, information associated with tag characteristic information (tag sensitivity information, IC circuit memory capacity information, etc.) of the second RFID circuit element following in order is stored to the IC circuit part of the first RFID circuit element which is ahead. Accordingly, when reading or writing information from or to the second RFID circuit element, communication can be performed in a mode matching the characteristic value information by using the tag characteristic value information of the second RFID circuit element read from the first RFID circuit element by the first reading means beforehand, and stored by the storing means. As a result, compared to a case in which communication is performed using uniform tag characteristic data for all RFID circuit elements, writing failures which occur due to unsuitable conditions can be prevented, thus making it possible to produce RFID labels at high speed, and thus ensure smooth manufacturing of RFID labels. The effect of being able to avoid wasting energy is also provided.

The 46th invention is the tag label producing apparatus featured by that in the 45th invention, comprising: a tag assembly detecting means for detecting whether or not the tag assembly is loaded onto the tag assembly loading portion; and a second reading means for reading from the IC circuit part of an RFID circuit element for tag storing for the first time provided to the tag assembly information associated with the tag characteristic values of the RFID circuit elements supplied first from among the plurality of RFID circuit elements contained in the tag assembly when the tag assembly detecting means detects that the tag assembly has been loaded onto the tag assembly loading portion.

Thus, when producing RFID labels, it is possible to perform communication in a mode matching the characteristic value information with respect to the first RFID circuit element supplied from the tag group by reading and using the tag characteristic value information stored in an RFID circuit element for initial tag storage by the second reading means when mounting the tag group beforehand, when reading or writing information from or to the first RFID circuit element supplied form the tag group.

The 47th invention is the tag label producing apparatus featured by that in the 46th invention, the invention further comprises a tag assembly removal operation detecting means for detecting whether or not an operation has been performed for removing the tag assembly from the tag assembly loading portion; wherein the information transmitting means for transmitting the access information to the IC circuit part of the RFID circuit element for tag storing for the first time and writes information associated with the tag characteristic values stored in the storing means, when the tag assembly removal operation detecting means detects that an operation to remove the tag assembly has been performed.

With the forty-seventh invention, information associated with tag characteristic values stored by the storing means is written to the IC circuit part of the RFID circuit element for initial tag storage provided to the tag group, when an operation to remove the tag group from the tag group mounting portion is performed. Specifically, if, for example, the tag group is removed from the tag group mounting portion during production of RFID labels (before all the plurality of RFID circuit elements contained in the tag group are completely used), information associated with tag characteristic values of an RFID circuit element stored in the storing means immediately before removal (in other words, information associated with tag characteristic values of the next RFID circuit element to be supplied first from the tag group) is written to the IC circuit part of the RFID circuit element for initial tag storage, and therefore, when the tag group is mounted onto the tag group mounting portion again, the tag characteristic value information stored in the RFID circuit element for initial tag storage is read by the second reading means and used, thereby making it possible to perform communication with the first RFID circuit element supplied from the tag group in a mode that matches that characteristic value information. Thus, even if the tag group is removed from the mounting portion, wireless communication can be restarted in an optimum mode after the next mounting.

The 48th invention is the tag label producing apparatus featured by that in the 47th invention, the invention further comprises a cartridge identity determining means for determining whether or not information associated with the tag characteristic values stored in the storing means is identical information associated with the tag characteristic values read from the RFID circuit element for tag storing for the first time by the second reading means, when the tag assembly detecting means detects that a tag assembly has been loaded onto the tag assembly loading portion.

Thus, when a tag group is mounted, it is possible to determine whether or not the tag group is the same as the removed tag group. As a result, if, for example, a different tag group is mounted, it is possible to prevent communication with the RFID circuit elements of the different tag group in the wrong communication mode, by once again reading from the RFID circuit element for initial tag storage. It is also possible to announce this to the operator, and urge the mounting of the correct tag group if the tag characteristic values were not the ones expected by the operator.

The 49th invention is the tag label producing apparatus featured by that in the 46th to 48th invention, the invention further comprises a power on operation detecting means for detecting that power has been turned on; wherein the second reading means reads from the IC circuit part of the RFID circuit element for tag storing for the first time information associated with the characteristic values of the RFID circuit element supplied first when the power on detecting means detects that power has been turned on.

Thus, when producing RFID labels, it is possible to perform communication in a mode matching the characteristic value information with respect to the first RFID circuit element supplied from the tag group by reading and using the tag characteristic value information stored in an RFID circuit element for initial tag storage by the second reading means when turning on the power beforehand, when reading or writing information from or to the first RFID circuit element supplied form the tag group.

The 50th invention is the tag label producing apparatus featured by that in the 49th invention, the invention further comprises a power shut-off operation detecting means for detecting that a power shut-off operation has been performed; wherein the information transmitting means transmits the access information to the IC circuit part of the RFID circuit element for tag storing for the first time and writes information associated with the tag characteristic values stored in the storing means when the power shut-off operation detecting means detects that a power shut-off operation has been performed.

With the fiftieth invention, when an operation to shut off the power is performed, information associated with tag characteristic values stored in the storing means is written to the IC circuit part of the RFID circuit element for initial tag storage provided to the tag group. Specifically, if, for example, the power is shut off during production of RFID labels (before all the plurality of RFID circuit elements contained in the tag group are completely used), information associated with tag characteristic values of an RFID circuit element stored in the storing means immediately before the power is shut off (in other words, information associated with tag characteristic values of the next RFID circuit element to be supplied first from the tag group) is written to the IC circuit part of the RFID circuit element for initial tag storage, and therefore, when the power is turned on again, the tag characteristic value information stored in the RFID circuit element for initial tag storage is read by the second reading means and used, thereby making it possible to perform communication with the first RFID circuit element supplied from the tag group in a mode that matches that characteristic value information. Thus, even if the power is turned off during tag label production, it is possible to restart wireless communication in an optimum mode when the power is turned on again.

The 51st invention is the tag label producing apparatus featured by that in the 46th to 50th invention, the apparatus antenna comprises a first apparatus antenna that performs transmission and reception of information through wireless communication with the IC circuit part of the RFID circuit elements; and a second apparatus antenna that performs transmission and reception of information through wireless communication with an IC circuit part of the RFID circuit element for tag storing for the first time; and the tag label producing apparatus further comprises antenna switching means that switches an antenna for transmitting the access information generated by the access information generating means to the first apparatus antenna or the second apparatus antenna.

With the fifty-first invention, when, for example, the tag group is mounted on the tag group mounting portion or removed from the tag group mounting portion, the antenna for transmitting access information is switched to the second apparatus antenna by the antenna switching means, communication is performed with the IC circuit part of the RFID circuit element for initial tag storage, reading information associated with tag characteristic values of the RFID circuit element supplied first from the tag group, or writing information associated with tag characteristic values of the RFID circuit element stored in the storing means. On the other hand, when producing RFID labels, the antenna for transmitting access information is switched to the first apparatus antenna by the antenna switching means, and communication is performed with the IC circuit part of each RFID circuit element supplied in the predetermined order from the tag group, reading or writing, thereby producing RFID labels continuously. Wireless communication is possible in accordance with the circumstances, by switching the appropriate apparatus antenna with the antenna switching means during production of RFID labels.

In order to achieve the first object, the fifty-second invention is about a tag assembly suppliably storing continuously in a predetermined order a plurality of RFID circuit elements provided with IC circuit parts that stores information and tag antennas that performs transmission and reception of information, wherein a predetermined smooth processing factor for when forming tag labels corresponding to the each of the plurality of RFID circuit elements is assigned.

In the tag assembly of the fifty-second invention, a plurality of RFID circuit elements are suppliably disposed in a predetermined order, and, for example, RFID tag labels are produced continuously by reading or writing information by performing transmission and reception to each RFID circuit element supplied in the predetermined order in the tag label producing apparatus. At this time, a smooth processing factor corresponding to each of the plurality of RFID circuit elements is assigned. Accordingly, it is possible to ensure smooth manufacturing of RFID labels by using a corresponding smooth processing factor during reading or writing of information to each RFID circuit element.

The 53rd invention is the tag assembly featured by that in the 52nd invention, information associated with the tag characteristic values of a second tag RFID circuit element supplied with a turn later than a first RFID circuit element is stored as the smooth processing factor in the IC circuit part of the first RFID circuit element supplied with a turn former than said second RFID circuit element, among said plurality of RFID circuit elements.

In the tag assembly of the fifty-third invention, a plurality of RFID circuit elements are suppliably disposed in a predetermined order, and, for example, RFID tag labels are produced continuously by reading or writing information by performing transmission and reception to each RFID circuit element supplied in the predetermined order in the tag label producing apparatus. At this time, in the plurality of RFID circuit elements, information associated with tag characteristic information (tag sensitivity information, IC circuit memory capacity information, etc.) of the second RFID circuit element following in order is stored to the IC circuit part of the first RFID circuit element which is ahead. Accordingly, when reading or writing information from or to the second RFID circuit element, communication can be performed in a mode matching the characteristic value information by using the tag characteristic value information of the second RFID circuit element read from the first RFID circuit element beforehand. As a result, even if variation occurs in the plurality of RFID circuit elements during manufacture of the tag group, it is possible to realize an optimum communication mode by controlling the communication mode for each RFID circuit element. Writing under unsuitable conditions is thus eliminated, rendering re-writing due to writing errors unnecessary, and ensuring smooth manufacturing of RFID labels since high-speed tag production is possible without testing the conditions. The effect is also provided of preventing the waste of energy and adversely affecting communication, compared with communication using uniform tag characteristic value data for all RFID circuit elements.

The 54th invention is the tag assembly featured by that in the 53rd invention, the tag assembly is constituted as a tag tape roll comprising a tag tape to which a plurality of the RFID circuit elements is disposed continuously in a tape lengthwise direction, and a reel member that takes up the tag tape around an outer circumference thereof.

With the fifty-fourth invention, RFID labels are produced continuously by reading or writing through transmission and reception with each RFID circuit element disposed in the tape lengthwise direction of the tag tape fed out form the tag tape roll. At this time, in the plurality of RFID circuit elements arranged on the tag tape, information associated with tag characteristic value information of a second RFID circuit element fed later is stored in the IC circuit part of a first RFID circuit element fed first from the tag tape roll. Accordingly, when reading or writing information from or to the second RFID circuit element, communication can be performed in a mode matching the characteristic value information by using the tag characteristic value information of the second RFID circuit element read from the first RFID circuit element beforehand.

The 55th invention is the tag assembly featured by that in the 53rd invention, the tag assembly is constituted as a first cartridge comprising a tag tape to which a plurality of the RFID circuit elements is disposed continuously in a tape lengthwise direction, a reel member that takes up the tag tape around an outer circumference thereof, and a cartridge housing that contains the tag tape and the reel member.

With the fifty-fifth invention, RFID labels are produced continuously by reading or writing through transmission and reception with each RFID circuit element disposed in the tape lengthwise direction of the tag tape, as the tag tape, which is wound around a reel member contained inside the cartridge housing, is fed out. At this time, in the plurality of RFID circuit elements arranged on the tag tape, information associated with tag characteristic value information of a second RFID circuit element fed later is stored in the IC circuit part of a first RFID circuit element fed first from the first cartridge. Accordingly, when reading or writing information from or to the second RFID circuit element, communication can be performed in a mode matching the characteristic value information by using the tag characteristic value information of the second RFID circuit element read from the first RFID circuit element beforehand.

The 56th invention is the tag assembly featured by that in the 54th or 55th invention, the RFID circuit elements are arranged in a plurality of rows in a tape width direction; a plurality of RFID circuit element rows are arranged such that tape lengthwise direction positions of the plurality of RFID circuit elements of each of said plurality of RFID circuit element rows, arranged in a tape lengthwise direction do not overlap; and information associated with a tape width direction position of the tag antenna of the second RFID circuit element is stored in the IC circuit part of the first RFID circuit element.

With the fifty-sixth invention, RFID labels are produced continuously by reading or writing through transmission and reception with each RFID circuit element disposed in the tape lengthwise direction of the tag tape fed out form the tag tape roll or a cartridge. Accordingly, if, for example, the apparatus antenna for performing transmission and reception to and form each RFID circuit element is positioned to one side in the tape width direction of the tag tape, the distance from the apparatus antenna and the RFID circuit elements disposed in a zigzag pattern on the tag tape differs for each RFID circuit element.

At this time, in the fifty-sixth invention, information associated with the tape width direction position of the tag antenna of the second RFID circuit element is stored to the IC circuit part of the first RFID circuit element. Thus, in producing RFID labels, when reading or writing information from or to the second RFID circuit element, it is possible to perform communication in a communication mode matching the distance from the apparatus antenna and the tag antenna of the second RFID circuit element, by using the information associated with the tape width direction position of the tag antenna of the second RFID circuit element read from the corresponding first RFID circuit element beforehand.

The 57th invention is the tag assembly featured by that in the 53rd invention, the tag assembly is constituted as a substantially tray-like second cartridge comprising a plurality of rectangular sheet type label material to which is provided the plurality of RFID circuit elements, and a tray member that stores a plurality of the rectangular sheet type label material stacked in a flat stack.

With the fifty-seventh invention, RFID labels are produced continuously by reading or writing through transmission and reception with each RFID circuit element disposed on the strip-like label material fed out from the tray-type cartridge. At this time, in the plurality of RFID circuit elements arranged on the plurality of stacked label materials, information associated with tag characteristic value information of a second RFID circuit element fed later is stored in the IC circuit part of a first RFID circuit element on the label material fed out first from the second cartridge. Accordingly, when reading or writing information from or to the second RFID circuit element, communication can be performed in a mode matching the characteristic value information by using the tag characteristic value information of the second RFID circuit element read from the first RFID circuit element beforehand.

The 58th invention is the tag assembly featured by that in the 53rd to 57th invention, information associated with sensitivity of the second RFID circuit element is stored in the IC circuit part of the first RFID circuit element as information associated with the tag characteristic values of the second RFID circuit element.

It is thus possible to perform communication at a transmission output matching the sensitivity of the RFID circuit element by using information associated with the sensitivity of the second RFID circuit element read from the corresponding first RFID circuit element beforehand when reading or writing information from or to the later second RFID circuit element when producing RFID labels continuously, by reading or writing through transmission or reception to each RFID circuit element supplied in the predetermined order from the tag group in the tag label producing apparatus.

The 59th invention is the tag assembly featured by that in the 58th invention, the invention further comprises an information medium that mediates information associated with sensitivity of the RFID circuit element supplied first among the plurality of RFID circuit elements stored in the tag assembly.

In the tag assembly of the fifty-ninth invention, a plurality of RFID circuit elements are suppliably disposed in a predetermined order, and, for example, RFID tag labels are produced continuously by reading or writing information by performing transmission and reception to each RFID circuit element supplied in the predetermined order in the tag label producing apparatus. At this time, an information medium is provided to the tag group for communicating information associated with sensitivity of the RFID circuit element supplied first, of the plurality of the RFID circuit elements stored in the tag group. Accordingly, when reading or writing information from or to the RFID circuit element supplied first from the tag group, it is possible to perform communication with the first RFID circuit element supplied form the tag group at a transmission output that matches the tag sensitivity, by using the sensitivity information of the information medium beforehand.

The 60th invention is the tag assembly featured by that in the 59th invention, the information medium is an RFID circuit element for tag storing for the first time provided to the tag assembly; and the IC circuit part of said RFID circuit element for tag storing for the first time stores information associated with sensitivity of the first supplied RFID circuit element.

Accordingly, when reading or writing information from or to the RFID circuit element supplied first from the tag group, it is possible to perform communication with the first RFID circuit element supplied from the tag group at a transmission output that matches the tag sensitivity, by using the sensitivity information stored in the RFID circuit element for initial tag storage beforehand. Further, using an RFID circuit element as an information medium for communicating information associated with sensitivity of the RFID circuit element supplied first makes it possible to freely overwrite the information, thus making it possible to respond to a case in which, for example, the tag tape roll is replaced, by rewriting sensitivity information as appropriate.

The 61st invention is the tag assembly featured by that in the 58th invention, information associated with sensitivity of the RFID circuit element supplied first among the plurality of RFID circuit elements stored in the tag assembly is stored in the IC circuit part of the RFID circuit element supplied first.

In the tag assembly of the sixty-first invention, a plurality of RFID circuit elements are suppliably disposed in a predetermined order, and, for example, RFID tag labels are produced continuously by reading or writing information by performing transmission and reception to each RFID circuit element supplied in the predetermined order in the tag label producing apparatus. At this time, information associated with the sensitivity of the RFID circuit element is stored in the IC circuit part of the RFID circuit element first supplied from the tag group. It is possible in this way to write at a transmission output matching the sensitivity of the RFID circuit element supplied first by reading and using the tag sensitivity information acquired when writing beforehand, when writing information to the first RFID circuit element supplied from the tag body, by storing as the sensitivity information associated with sensitivity to the IC circuit part of the first RFID circuit element supplied, for example, when writing information to it.

The 62nd invention is the tag assembly featured by that in the 53rd to 61st invention, information associated with sensitivity of the RFID circuit element is information associated with sensitivity when a writing of information.

It is possible to write to the first RFID circuit element supplied at a transmission output that matches the tag sensitivity, by reading the tag sensitivity information from the time of writing, which is stored in the IC circuit part of the RFID circuit element beforehand, when writing information to the first RFID circuit element supplied form the tag body. It is possible to write to the RFID circuit element at a transmission output matching the tag sensitivity by using the tag sensitivity information from the time of writing, which has a narrower tolerance range than when reading.

The 63rd invention is the tag assembly featured by that in the 53rd to 62nd invention, information associated with a remaining number of suppliable the RFID circuit elements among the plurality of RFID circuit elements stored in the tag assembly is stored in the IC circuit part of the first RFID circuit element.

Thus, when producing RFID tag labels, it is possible to read information associated with a remaining number together with tag characteristic value information of the second RFID circuit element from the IC circuit part of the first RFID circuit element. As a result, it is possible to know the remaining number of RFID circuit elements which can be supplied in the tag body, while producing tag labels.

The 64th invention is the tag assembly featured by that in the 53rd to 63rd invention, information associated with a preamble number output when initiating communication with the second RFID circuit element is stored in the IC circuit part of the first RFID circuit element.

As a result, even if variation occurs in the tag charging time constant of the plurality of RFID circuit elements during manufacturing of the tag body, it is possible to realize an optimum communication mode by controlling the preamble number for each RFID circuit element. As a result, there is no need to send an unnecessary preamble compared to a case in which a uniform preamble number is communicated to all of the RFID circuit elements, thereby making it possible to reduce the amount of time needed in producing the RFID labels.

The 65th invention is the tag assembly featured by that in the 53rd to 64th invention, at least one part of information associated with tag identification information of the second RFID circuit element is stored in the IC circuit part of the first RFID circuit element.

Thus, when producing the RFID labels, it is possible to read or write information from or to only the second RFID circuit element after putting the RFID circuit elements other than the second RFID circuit element into sleep mode, using the tag identification information for the second RFID circuit element read from the IC circuit part of the first RFID circuit element ahead of time. As a result, it is possible to read from and write to the RFID circuit element to be read from or written to.

The 66th invention is the tag assembly featured by that in the 53rd to 65th invention, said IC circuit part of said first RFID circuit element stores information associated with the tag characteristic values of said second RFID circuit element, or information associated with said remaining number, or tag identification information associated with said first RFID circuit element, said identification information having at least one part of tag identification information of said second RFID circuit element.

Thus, RFID labels can be produced at a higher speed, since there is no need to read information associated with tag characteristic values, since information associated with the tag characteristics values of the second RFID tag can be acquired at the same time that identification information for the first RFID circuit element, which is to be written to, is acquired, by sharing at least one part of the tag identification information stored in the IC circuit part of the first RFID circuit element, information associated with tag characteristic values of the second RFID circuit element, the tag remaining number information, or the identification information of the second RFID circuit element. The amount of memory used in the IC circuit part of the RFID circuit elements can be reduced.

The 67th invention is the tag assembly featured by that in the 53rd to 66th invention, information indicating that an RFID circuit element is the last tag is stored in the IC circuit part of the RFID circuit element supplied last of the plurality of RFID circuit elements stored in the tag assembly.

Thus when producing the RFID labels, it is possible to be know that an RFID circuit element is the last tag when accessing the IC circuit part of the RFID circuit element supplied last.

The 68th invention is the tag assembly featured by that in the 67th invention, the information indicating a last tag is stored in the IC circuit part of the RFID circuit element supplied last instead of information associated with the tag characteristic values.

There is no need to store information associated with tag characteristic information in the IC circuit part of the RFID circuit element supplied last of the plurality of RFID circuit elements stored in the tag group, since no RFID circuit element exists after it. Accordingly, it is possible to effectively use the memory capacity without reducing by storing information indicating that a tag is the last tag in lieu of the information associated with tag characteristic values. It is possible to let the user know ahead of time to make appropriate preparations, such as replacing a cartridge, etc.

To attain the first object, the sixty-ninth invention applies travel to a tag disposing tape to which are provided a plurality of RFID circuit elements provided with an IC circuit part that stores information and a tag antenna that performs transmission and reception of information, and in coordination with this travel, applies predetermined smooth processing to the tag disposing tape for when forming tag tape.

In the sixty-ninth invention, a tag disposing tape travels, and in coordination with this, predetermined smooth processing for when forming tag tape is applied. It is thereby possible to ensure smooth manufacturing of tag tape and RFID tag labels.

The 70th invention is the tape processing method featured by that in the 69th invention, the invention further comprises as the smooth processing: attaching the RFID circuit elements between a first adhesive layer of a first tape constituting the tag disposing tape supplied from a first supplying means and a second adhesive layer of a second tape constituting the tag disposing tape supplied from a second supplying means; winding a tag tape generated by bonding together the first tape and the second tape and attachment of the RFID circuit elements; and thus obtaining a tag tape roll.

With the seventieth invention, the first tape is fed from the first feeding means, the second tape is fed from the second feeding means, and the first adhesive layer provided to the first tape is bonded with the second adhesive layer provided to the second tape. The tag tape is thus generated by the RFID circuit elements being attached at predetermined intervals between the first adhesive layer and the second adhesive layer by the tag attaching means, and the tag tape is wound by the winding means, thus manufacturing the tag tape roll. With a manufacturing method in which the first tape and the second tape, each provided with adhesive layers in advance, are provided, and the adhesive layers are bonded, with RFID circuit elements attached therebetween, there is no need to apply an adhesive material to the tape, as with the conventional arrangement. As a result, the manufacturing process can be simplified and manufacturing costs cut as the adhesive application step is not needed, thus ensuring smoother manufacturing of the tag tape.

The 71st invention is the tape processing method featured by that in the 69th invention, the invention further comprises as the smooth processing: performing inspection of characteristics of a plurality of tag label RFID circuit elements; writing the inspection results through wireless communication to an inspection results storing RFID circuit element provided to the tag assembly capable of storing the plurality of tag label RFID circuit elements in a predetermined order; and thus manufacturing the tag assembly.

In the seventy-first invention, inspecting means inspects characteristics of a plurality of RFID circuit elements for tag labels contained in a predetermined order in the tag group, and the inspection results (tag characteristic value information) are written to an inspection results storing RFID circuit element, and the tag group is thus completed. As a result, when making RFID labels using the completed tag groups in the tag label producing apparatus, it is possible to perform communication in a mode that matches the characteristic value information by reading the tag characteristic value information of the RFID circuit element for each tag label stored in the inspection results storing RFID circuit element provided to the tag group, when transmitting and receiving to and from the RFID circuit elements of each tag label. Accordingly, even if variation occurs in the tag characteristic value data during manufacture of RFID circuit elements for each tag label, it is possible to realize an optimum communication mode by controlling the communication mode for each RFID circuit element. It is thereby possible to ensure smooth manufacturing of RFID labels. Wasting energy and adversely affecting communication can be prevented, compared with communication using uniform tag characteristic value data for all RFID circuit elements.

ADVANTAGES OF THE INVENTION

With the first, forty fourth, fifty second, and sixty ninth invention, smooth manufacturing of tag tape or RFID labels can be ensured.

With the second or seventieth invention, the manufacturing process can be simplified, and manufacturing costs reduced.

With the fourteenth and seventy first invention, a tag body capable of wireless communication in an optimum communication mode with each RFID circuit element can be manufactured, when producing RFID labels.

With the forty fifth and fifty third invention, RFID labels can be produced at high speed.

With the twenty sixth invention, fixed-pitch feeding and fixed-pitch marking can be easily performed, without high-precision control and so on of the feeding means.

BRIEF DESCRIPTION OF THE DRAWING

FIG. 1 is a conceptual diagram showing an overall general structure of a tag tape roll manufacturing apparatus 1 according to the first embodiment of the present invention.

FIG. 2 is a conceptual lateral view showing a first tape and a second tape being bonded with an RFID tag disposed therebetween.

FIG. 3 is a flow chart illustrating a control process executed by a controller.

FIG. 4 is a horizontal cross-section view showing a detailed cross-section structure of the first tape, the RFID tag, and the second tape in a modification in which the first tape is constituted by a separation sheet and an adhesive layer.

FIG. 5 is a horizontal cross-section view showing a detailed cross-section structure of the first tape, the RFID tag, and the second tape in a modification in which the second tape is a thermal sensitive tape.

FIG. 6 is a conceptual diagram showing an overall general structure of the tag tape roll manufacturing apparatus in a modification in which the second tape is a thermal sensitive tape.

FIG. 7 is a horizontal cross-section diagram a detailed cross-section structure of the first tape, the RFID tag, and the second tape in a modification in which a separator of the second tape is separated before bonding.

FIG. 8 is a conceptual diagram showing an overall general structure of the tag tape roll manufacturing apparatus in a modification in which the separator of the second tape is separated before bonding.

FIG. 9 is a conceptual diagram showing an overall general structure of the tag tape roll manufacturing apparatus in a modification in which the RFID tag is attached to the first tape.

FIG. 10 is a conceptual diagram showing an overall general structure of a tag tape roll manufacturing apparatus according to the second embodiment of the present invention.

FIG. 11 is a functional block diagram showing detailed functions of a high-frequency circuit.

FIG. 12 is a functional block diagram showing a functional configuration of an RFID circuit element.

FIG. 13 is a flow chart illustrating a control process executed by a controller.

FIG. 14 is a view for describing increasing output of a "Scroll ID" signal in steps when measuring tag sensitivity during reading.

FIG. 15 is a view for describing increasing output of a "Program" signal and a "Verify" signal in steps when measuring tag sensitivity during writing.

FIG. 16 is a view conceptually showing stored content of a memory portion of an IC circuit part of an RFID circuit element provided to the base tape roll.

FIG. 17 is a descriptive view for describing a detailed structure of a cartridge formed by storing a base tape roll.

FIG. 18 is a view conceptually showing stored content of the memory portion of the IC circuit part of the RFID circuit element provided to the manufactured base tape roll in a modification in which the tag's own writing sensitivity and the reading sensitivity of the next tag are stored.

FIG. 19 is conceptual oblique view of a cartridge in a modification in which a tray-type cartridge is used.

FIG. 20 is a diagram illustrating the constitution of a system for generating information of an RFID tag to which a tag label producing apparatus for communicating with an RFID tag is applied in accordance with a third embodiment of the present invention.

FIG. 21 is a conceptual diagram illustrating in detail the structure of a tag label producing apparatus for communicating with an RFID tag according to a third embodiment of the present invention.

FIG. 22 is a descriptive diagram for describing in detail the structure of the cartridge.

FIG. 23 is a functional block diagram showing detailed functions of a high-frequency circuit.

FIG. 24 is a view conceptually showing stored content of the memory portion of the RFID circuit element.

FIG. 25 is a top plan view and a bottom plan view illustrating the appearance of one example of a formed RFID label.

FIG. 26 is cross-sectional view taken along a line XXVI-XXVI' in FIG. 25.

FIG. 27 is a view showing one example of a screen displayed to a terminal or a general-purpose computer.

FIG. 28 is a flow chart showing a control process executed by a control circuit.

FIG. 29 is a flowchart showing a detailed process in step S3120 of FIG. 28.

FIG. 30 is a flow chart showing in detail an RFID tag reading process.

FIG. 31 is a view conceptually showing stored content of the memory portion in a modification in which the sensitivity information of the first tag and the next tag is stored to the first tag.

FIG. 32 is a view conceptually showing stored content of the memory portion in a modification in which a remaining number of RFID circuit elements is stored.

FIG. 33 is a view for describing an arrangement of RFID circuit elements on a base tape in a modification in which RFID circuit elements are arranged in a zigzag pattern.

FIG. 34 is a flowchart showing a control process executed by the control circuit in a modification comprising a cartridge identity check function.

FIG. 35 is a conceptual configuration diagram showing a detailed structure of a tag label producing apparatus according to a modification in which no cartridge is used.

FIG. 36 is a conceptual diagram showing an overall general structure of a tag tape roll manufacturing apparatus according to the fourth embodiment of the present invention.

FIG. 37 is a functional block diagram showing a function configuration of a function associated with accessing RFID circuit elements, among functions of a tag tape roll manufacturing apparatus.

FIG. 38 is a circuit diagram showing in an abbreviated manner a circuit configuration of a connection between a transmission circuit and a reception circuit, and a loop antenna.

FIG. 39 is a functional block diagram showing a functional configuration of an RFID circuit element.

FIG. 40 is a flow chart showing a control process executed by a controller.

FIG. 41 is a flowchart showing details of a tag sorting process in step S4200 in FIG. 40.

FIG. 42 is a flowchart showing details of a pitch marking process in step S4300 in FIG. 40.

FIG. 43 is a flowchart showing details of a tag inspection and storing process in step S4400 in FIG. 40.

FIG. 44 is a conceptual diagram showing an overall general structure of the tag tape roll according to a modification in which the attachment interval of the RFID tags is set variably.

DETAILED DESCRIPTION OF THE PREFERRED EMBODIMENTS

In the following, some embodiments of the present invention will be described with reference to the accompanying drawings.

A first embodiment of the present invention will be described with reference to FIGS. 1-9.

FIG. 1 is a conceptual diagram showing an overall general structure of a tag tape roll manufacturing apparatus 1 (tape processing apparatus) of the present embodiment. In FIG. 1, the tag tape roll manufacturing apparatus 1 produces a base tape 210 by bonding together a first tape 200A (tag disposing tape; detailed structure described below) and a second tape 200B (tag disposing tape; detailed structure described below), and inserting an RFID tag Tg provided with an RFID circuit element To between the two bonded tapes, thereby manufacturing a base tape roll 215 (tag tape roll) by winding the base tape 210 (tag tape).

In other words, the tag tape roll manufacturing apparatus 1 has a first tape roll 211 around in is wound the first tape 200A, a first tape shaft driving motor 212 for driving the first tape roll 211, a tape roll 213 in which is wound the second tape 200B, a second tape shaft driving motor 214 for driving the second tape roll 213, a base tape roll 215 for taking up the base tape 210 made up of layers other than a separator 209 (described in detail below) of a tape in which are bonded the first tape 200A and the second tape 200B fed from the first and second tape rolls 211 and 213 along an outer circumference of a reel member 215a, a base tape shaft driving motor 216 (reeling means) for driving the reel member 215a, a separator roll 217 for reeling the separator 209 along an outer circumference of a reel member 217a, a separator shaft driving motor 218 for driving the reel member 217a, feed rollers 219A (driving) and 219B (driven), provided between the first and second tape rolls 211 and 213 and the base tape roll 215 and the separator roll 217 along a tape feed path of the first and second tapes 200A and 200B, for applying drive to the tapes 200A and 200B in order to feed the first and second tapes 200A and 200B from the first and second tape rolls 211 and 213, and a feed roller shaft driving motor 220 for driving the driving feed roller 219A.

The tag tape roll manufacturing apparatus 1 further has a first step roll 221 provided between the first tape roll 211 and the feed rollers 219A and 219B along the tape feed path of the first tape 200A, retractably provided in an intersecting direction (orthogonal in this example) intersecting the tape feed direction of the first tape 200A being fed, a second step roller 222 provided between the feed rollers 219A and 219B and the base tape roll 215 along the tape feed path of the base tape 210 generated based on the first tape 200A, retractably provided in an intersecting direction (orthogonal in this example) intersecting the tape feed direction of the base tape 210, a third step roller 223 provided between the second tape roll 213 and the feed rollers 219A and 219B along the tape feed path of the second tape 200B, retractably provided in an intersecting direction (orthogonal in this example) intersecting the tape feed direction of the second tape 200B being fed, a fourth step roller 224 provided between the feed rollers 219A and 219B and the separator roll 217 along the tape feed path of the separator 209 generated based on the second tape 200B, retractably provided in an intersecting direction (orthogonal in this example) intersecting the tape feed path of the separator 209, air cylinders 262A, 262B, 262C, and 262D for advancing and retracting the first through fourth step rollers 221 to 224 in the intersecting directions (orthogonal directions with the tape feed paths in this example), and bonding rollers 225A and 225B for pressing together and bonding the first tape 200A fed from the first tape roll 211 and the second tape 200B fed from the second tape roll 213.

The tag tape roll manufacturing apparatus 1 further has a tag inserter 226 (tag attaching means) for attaching at predetermined intervals the RFID tags Tg containing between the first tape 200A and the second tape 200B bonded by the bonding rollers 225A and 225B the RFID circuit element To provided with an IC circuit part 151 (see FIG. 12 discussed below) for storing information and a tag antenna 152 (see FIG. 12 discussed below) connected to the IC circuit part 151 for performing transmission and reception, a tag checker 270 for acquiring a tag characteristic value of the RFID circuit element To in order to determine whether or not the RFID circuit element To provided to the RFID tag Tg attached by the tag inserter 226 is appropriate, a tape holding member 274 for supporting in a flat state an attaching portion 200B1 (flat portion) of the second tape 200B to which the RFID tag Tg is attached by the tag inserter 226, a cutter 227 for cutting the base tape 210 to a predetermined length, a controller 230, a photo sensor 228 (mark detecting means) provided downstream of the feeding rollers 219A and 219B in the tape feeding direction so as to face the feeding path (horizontally in FIG. 1) (in this example, so as oppose the upper side face of the tape as shown in the drawing), for inputting corresponding detection signals to the controller 230, a laser marker 271 (mark forming means) provided upstream of the cutter 227 in the feeding direction of the base tape 210, so as to face the feeding path (horizontally in FIG. 1) (in this example, so as to oppose the bottom side face of the tape as shown in the drawing), for providing an end mark (second mark) not shown in the drawings to the base tape 210 with a laser, and a plurality of neutralizing brushes 275 (first static electricity eliminating means, second static electricity forming means) provided in the vicinity of the feeding rollers 219A and 219B and a roller 240A (discussed below) for neutralizing static electricity generated on the base tape 210 peeled from the feeding rollers 219A and 219B and the separator 209. Moreover, the tag inserter 226 constituting the tag attaching means constitutes the smooth processing means for applying the predetermined smooth processing for when the tag tape is formed in the present embodiment (the first embodiment).

The tag tape roll manufacturing apparatus 1 further has a first tape driving circuit 231 for performing drive control of the first tape shaft driving motor 212 described above, a second tape driving circuit 232 for performing drive control of the second tape shaft driving motor 214 described above, a base tape driving circuit 233 for performing drive control of the base tape shaft driving motor 216 described above, a separator driving circuit 234 for performing drive control of the separator shaft driving motor 218 described above, a feeding roller driving circuit 235 for performing drive control of the feeding roller shaft driving motor 220 described above, a solenoid 236 for driving the cutter 227 and thus causing it to cut, a solenoid driving circuit 237 for controlling the solenoid 236, a laser driving circuit 272 for controlling laser output of the laser marker 271, electropneumatic regulators 256A, 265B, 265C, and 265D comprising shut-off valves (not shown in the drawings) controlled for aperture according to an electrical signal input from the controller 230 and that function as an electricity/air converting means for supplying a gas from a gas source not shown in the drawings to the air cylinders 262A, 262B, 262C, and 262D as operating gas with a pressure corresponding to the electrical signal, a regulator driving circuit not shown in the drawings for controlling the shut-off valves of the electropneumatic regulators 256A, 265B, 265C, and 265D, tension arms 267A, 267B, 267C, and 267D rotatable around a rotation fulcrum by the air cylinders 262A, 262B, 262C, and 262D, rotatably supporting the step rollers 221, 222, 223, and 224 at the tips thereof, and angle sensors 268A, 268B, 268C, and 268D provided to the vicinity of the rotation fulcrum in this example, for detecting tension of the corresponding tapes 200A, 210, 200B, and 209 by detecting the angle of the tension arms 267A, 267B, 267C, and 267D.

The first tape roll 211 winds the first tape 200A around the reel member 211a (first supplying means) driven by the first tape shaft driving motor 212 (first supplying means). Similarly, the second tape roll 213 winds the second tape 200B around the reel member 213a (second supplying means) driven by the second tape shaft driving motor 214 (second supplying means). Moreover, the motors 212 and 214 and the reel members 211a and 213a constituting these first and second supplying means constitute a travel processing means applying travel to a tag disposing tape in the present embodiment (the first embodiment).

The base tape roll 215 winds the base tape 210 around itself using the reel member 215a being driven by the base tape shaft driving motor 216. Similarly, the separator roll 217 winds the base tape 209 around itself by the reel member 217a being driven by the separator shaft driving motor 218.

The first tape 200A has in this example a four-layer structure as shown in the expanded view in FIG. 1, being constituted by stacking an adhesive layer 200Aa (first adhesive layer; mounting adhesive layer) made of an appropriate adhesive agent, a colored tape base layer 200Ab (first tape base layer) made of PET (polyethylene terephthalate) or the like, an adhesive layer 200Ac (first release adhesive layer; affixing adhesive layer) made of an appropriate adhesive agent, and a separator layer 200Ad (first release layer; release layer for bonding), in this order from an interior winding side (the top in the expanded view) of the first tape roll 211 towards the opposite side (the bottom in the expanded view). Note that the separator layer 200Ad is separated when the RFID label is bonded as a completed label-shaped product to a predetermined article or the like, thereby being able to bond to the article or the like by the adhesive layer 200Ac.

The second tape 200B has in this example a four-layer structure as shown in the expanded view in FIG. 2, being constituted by stacking an adhesive layer 200Ba (second adhesive layer; mounting adhesive layer) made of an appropriate adhesive agent, a colored tape base layer 200Bb (second tape base layer) made of PET (polyethylene terephthalate) or the like, an adhesive layer 200Bc (second release adhesive layer) made of an appropriate adhesive agent, and a separator layer 200Bd (second peeling layer), in this order from an interior winding side (the bottom in the expanded view) of the first towards the opposite side (the top in the expanded view). Note that the separator layer 200Bb is ultimately wound around the reel member 217a as the separator 209, and is collected as the separator roll 217.

The air cylinders 262A-D are each provided with a piston 262a and a cylinder body 262b, the piston 262a contained in the cylinder body 262b advances and retreats due to the operation gas supplied from the electropneumatic regulators 265A-D, thus causing the tension arms 267A-D linked to the pistons 262a to rotate around the rotation fulcrum, and thereby the position of the step rollers 221, 222, 223, and 224 are changed, controlling the tension of the tapes 200A, 210, 200B, and 209.

Note that a direct drive using the electromagnetic power of a solenoid, an electric motor (including various types of motor such as a linear motor or a pulse motor), or the like may be used in lieu of the air cylinder 262 as a an actuator.

The controller 230 is a so-called microcomputer. While a detailed description thereof is omitted, the controller 230 is constituted by a CPU which is a central processing unit, ROM, RAM, and the like, and performs signal processing according to programs previously stored in the ROM using the temporary storage function provided by the RAM.

With the above constitution, the first tape 200A is fed out from the first tape roll 211 by the feed drive power of the feed rollers 219A and 219B, passes through the step roller 221, and is supplied to the bonding rollers 225A and 225B. Similarly, the second tape 200B is fed out from the second tape roll 213, passes through the step roller 223 and a roller 273, and is supplied to the bonding rollers 225A and 225B. Next, RFID tags Tg are attached to the second tape 200B in sequence by the tag inserter 226 in the second tape attaching portion 200B1 which is in a flat state, supported by the tape holding member 274, and positioned upstream in the tape feeding direction of the bonding position where the first tape 200A and the second tape 200B are bonded. Thereafter, the first tape 200A and the second tape 200B to which the RFID tags Tg have been attached are bonded by the bonding rollers 225A and 225B. Attachment of the tags is done using a so-called intermittent feeding drive method, in which the feed drive of the first tape 200A and the second tape 200B is stopped and insertion is performed once the predetermined insertion location is reached (for example, at regular intervals). (The positioning at this time is controlled according to a detection signal by the sensor 228, discussed in detail below.)

The tape, thus bonded and with the tags inserted, is separated into the separator 209, made up of the separator layer 200Bd provided to the second tape 200B, and the base tape 210, made up of the remaining portions, at the rollers 240A and 240B positioned downstream of the feeding rollers 219A and 219B. The base tape 210 is reeled in by the reel member 215a and cut by the cutter 227 once it has reached a predetermined length. At this time, an end mark is provided to the base tape 210 by the laser marker 271 upstream of the cutting position by the cutter 227 in the tape feeding direction. At the same time, the separator 209 is reeled in and collected by the reel member 217a. As a result of the above, the base tape 210, on which have been formed in sequence at the predetermined regular intervals a plurality of RFID circuit elements To in the lengthwise direction, is wound around the reel member 215a, and the base tape roll 215 is thus produced.

FIG. 2 is a conceptual lateral view showing the first tape 200A and the second tape 200 being bonded, with the RFID tags Tg being interposed, as described above.

In FIG. 2, the RFID tag Tg comprises an substantially sheet-like tag base 160, the tag antenna 152 provided to a rear side (the lower side in FIG. 2) of the tag base 160 for performing transmission and reception of information, and an IC chip holding member 161 provided with the IC circuit part 151 (not shown in the drawing) for updatably (rewritably) storing information so as to be connected to the tag antenna 152. Note that the RFID circuit element To is constituted by the tag antenna 152 and the IC circuit part 151.

Once the RFID tags Tg are inserted and disposed between the four-layer-structured first tape 200A and the four-layer-structured second tape 200B, the base tape 210 takes on a ten-layer structure in this example, by reeling out and thus eliminating the separator layer 200Bd by the reel member 217a, as described above (see the bottom drawing, and the enlargement in FIG. 1). In other words, the base tape 210 is constituted by stacking the separator layer 200Ad, the adhesive layer 200Ac, the tape base layer 200Ab, the adhesive layer 200Aa, the tag base 160, the tag antenna 152, the IC chip holding member 161, the adhesive layer 200Ba, the tape base layer 200Bb, and the adhesive layer 200Bc in this order from the side onto which it is wound on the outside of the reel member 215a (the top in FIG. 2) to the opposite side (the bottom in FIG. 2).

FIG. 3 is a flow chart showing a control procedure executed by the controller 230.

In FIG. 3, in step S1501, first a determination is made as to whether or not the action of winding the base tape 210 around the reel member 215a is complete. This determination is made, for example, by determining whether or not an operator who has completed the action of winding has input an operation signal to the effect that the winding action is complete via an operation means or the like not shown in the drawing. The determination is met if the winding action is complete, and the process moves to the next step, step S1505.

In step S1505, tape drive is initiated according to an operation signal to the effect of initiating production of base tape, input via an operation means, etc., not shown in the drawing. In other words, a control signal is output to the feeding roller driving circuit 235, and the first tape 200A and the second tape 200B are driven and fed out from the first tape roll 211 and the second tape roll 213 by the driving power of the feeding roller shaft driving motor 220. At the same time, a control signal is output to the first and second tape driving circuits 231 and 232 and the base tape driving circuit 233, and the separator driving circuit 234, and the first and second tape shaft driving motors 212 and 214, and the base tape shaft driving motor 216, and the separator shaft driving motor 218 are also driven. The first tape 200A is thus fed out from the first tape roll 211 and the second tape 200B is fed out from the second tape roll 213, these two are bonded and made into a single unit by the bonding rollers 225A and 225B, and are then fed towards the feeding rollers 219A and 219B.

While not explicitly stated in this process, when initiating the tape drive in step S1505, the motor speed of the first and second tape shaft driving motors 212 and 214, the base tape shaft driving motor 216, and the separator shaft driving motor 218 is controlled, and at the same time tension control (hereafter also referred to as "tape tension control during driving" as appropriate) is also performed so as to achieve an appropriate value for the tension of the tapes 200A, 200B, 209, and 210 during tape feeding, calculated based on the angles of the tension arms 267A-D as detected by the angle sensors 268A-D as the tension arms 267A-D are rotated by the air cylinders 262A-D. Note that the tape tension control during driving is always performed when driving tapes.

In the next step, step S1510, a determination is made as to whether or not the base tape 210, which is being reeled into the reel member 215a has reached a predetermined winding end position. Specifically, a determination is made as to whether or not the number of RFID tags Tg attached to the base tape 210 has reached a predetermined number. For example, a determination is made as to whether or not 40 RFID tags Tg have been attached. Since this determination is not ordinarily satisfied immediately after initiating winding, the process moves to the next step, step S1515.

In step S1515, a determination is made as to whether or not the tape being fed as described above as reached a predetermined position for insertion of an RFID tag Tg. This determination may be made, for example, based on detection results by the photo sensor 228 of marks not shown (first mark) in the drawings provided at a regular pitch to predetermined locations on the surface of the separator layer 200Ad of the first tape 200A as described above. If the determination is satisfied, the process moves to step S1520.

In step S1520, another control signal is output to the feeding roller driving circuit 235, and the driving of first tape 200A and the second tape 200B from the first tape roll 211 and the second tape roll 213 is stopped by stopping the driving of the feeding roller shaft driving motor 220. Note that at this time, the driving of the first and second tape shaft driving motors 212 and 214, the base tape shaft driving motor 216 and the separator shaft driving motor 218 is automatically stopped by the tape tension control during driving described above.

While not explicitly described in this process, when stopping the tape drive in step S1520, tension control is performed such that the sum of the tensions of the first tape 200A and the second tape 200B on the supply side is approximately equal to the sum of the tensions of the base tape 210 and the separator 209 on the reeling-in side, so that position drift of the tape does not occur when the tape drive is stopped in this way (hereafter referred to as "tape tension control during stoppage" as appropriate).

In the next step, step S1525, tag characteristic values (tag sensitivity information and so on) of the RFID circuit elements To provided to the RFID tags Tg attached by the tag inserter 226 and acquired by the tag checker 270 are input.

In the next step, step S1530, a determination is made as to whether or not the tag characteristic values input in step S1525 are within a predetermined suitable range. If the tag characteristic values are not within a suitable range, the determination is not satisfied and the process moves to step S1535. A control signal is output to the tag inserter 226, causing it to prepare to attach the RFID tag Tg following the RFID tag Tg which was provided with the RFID circuit element To which was determined as not being suitable. The process then moves to the previous step, step S1525. As for the RFID tag Tg which was determined as being not suitable, it may, for example, be ejected out of the tag inserter 226 automatically (or by an operation of an operator), and thus not attached to the second tape 200B. On the other hand, if the tag characteristic values are within the predetermined appropriate range, the determination is satisfied, and the process moves to the next step, step S1540.

In step S1540, a control signal is output to the tag inserter 226 with the tape drive stopped at the predetermined tag insertion location as described above, and an RFID tag Tg provided with an RFID circuit element To made up of the IC circuit part 151 and the tag antenna 152 described above is attached to the attachment portion 200B1 of the second tape 200B. At this point it is also possible for a display to be performed for an operator to confirm whether or not to insert the RFID tag Tg instead of automatically inserting it if the tag is appropriate as described above, and then insert the RFID tag Tg only if an appropriate instruction is input by the operator. Thereafter, the process moves to step S1545, and, as in step S1505, a control signal is output to the feeding roller driving circuit 235, and the feed drive of the first tape 200A and second tape 200B is restarted by the driving power of the feeding roller shaft driving motor 220.

Note that in this case, too, the tape tension control during driving is performed for adjusting the tension of the tapes 200A, 200B, 209, and 210 during tape feeding, as in step S1505.

In the next step, step S1550, a determination is made as to whether or not the number of RFID tags Tg attached by the tag inserter 226 is equal to or greater than N. The number of attached RFID tags Tg may be counted by counting the number of times a control signal is output to the tag inserter 226 in step S1540 for example, or it may be added up by inputting an attachment signal from the tag inserter 226 every time an RFID tag Tg is attached. Note that N is the number of RFID tags Tg provided to one roll of the tag tape rolls being manufactured, and is set to around 40, for example. If the number of RFID tags Tg attached is less than N, the determination is not satisfied, and the process returns to step S1510. If the number of RFID tags Tg attached is N or greater, then the determination is satisfied and the process moves to the next step, step S1555.

In step S1555, a determination is made as to whether or not a margin (in this case, a section in which no RFID tags Tg are inserted) of appropriate length is provided to the base tape 210. Specifically, the determination is made as to whether or not a margin equal to the attachment of an appropriate number of RFID tags Tg has been formed by outputting a control signal to the tag inserter 226, stopping the attachment of the RFID tags Tg, and repeating steps S1515, S1520, and S1545 an appropriate number of times. As regards the length of the margin, a length equal to, for example, the attachment of three RFID tags Tg is set. If a margin is formed, the determination is satisfied, and the process returns to step S1510.

In this way, step S1510-step S1550 are repeated until N RFID tags Tg are attached and a margin is formed in step S1555, at which point the number of RFID tags Tg attached to the base tape roll 215 wound around the reel member 215a reaches the predetermined number, the determination in step S1510 is satisfied, and the process moves to the next step, step S1565.

In step S1565, as in step S1520, another control signal is output to the feeding roller driving circuit 235, and the feed drive of first tape 200A and the second tape 200B from the first tape roll 211 and the second tape roll 213 are stopped by stopping the driving of the feeding roller shaft driving motor 220. Note that at this time, as in the case of step S1520, tension control during stoppage is performed such that the sum of the tensions of the first tape 200A and the second tape 200B on the supply side are approximately equal to the sum of the tensions of the base tape 210 and the separator 209 when the tape drive is stopped.

In the next step, step S1570, a control signal is output to the solenoid driving circuit 237, the solenoid 236 is driven, and the base tape 210 is cut (divided) by the cutter 227. This completes the roll made by winding the base tape 210 of a predetermined length. Note that if, for example, a margin equal to the length of three attached RFID tags Tg was formed in step S1555, the cutting position by the cutter 227 is set to a position such that a length of the margin equal to one attached RFID tag is cut off and a length equal to two attached RFID tags remains after cutting.

Thereafter, the process returns to step S1575, a control signal is output to the laser driving circuit 272 causing the laser marker 271 to emit a laser, and this laser provides an end mark (not shown in the drawing) upstream of the cutting position by the cutter 227 of the separator 200Ad in the tape feeding direction on the base tape 210. This end mark is provided in the margin with a length equal to two attached RFID tags remaining after cutting. The process then returns to step S1501.

Note that while not explicitly discussed above, ordinarily when first initiating the manufacturing process of tag tape rolls, there exists a margin portion from the position at which an RFID tag Tg is attached by the tag inserter 226 up to the winding position of the base tape 210 by the reel member 215a in which no RFID tags Tg are attached (for example, a length equal to around ten attached RFID tags Tg). This margin portion is cut off by being cut by the cutter 227 when the position at which the margin portion ends (a position slightly downstream in the tape feeding direction from the position at which the first RFID tag Tg is attached) reaches the cutter 227. Thereafter, when the base tape 210 from which the margin portion has been cut off is wound onto the reel member 215a, the determination in step S1501 is satisfied and the manufacturing of the tag tape roll using the procedure beginning in step S1505 is initiated.

In the above, steps S1520, S1540, and S1545 in the flow shown in FIG. 3 constitute the coordinated controlling means for performing coordinated control on the tape feeding means and the tag attaching means in each of the present invention. Step S1530 constitutes a tag determining means for determining whether or not an RFID circuit element is acceptable. Further, step S1535 constitutes a tag attachment controlling means for controlling the tag attaching means.

As described above, with the tag tape roll manufacturing apparatus 1 of the present embodiment, when manufacturing the base tape 210, the first tape 200A is fed out from the first tape roll 211 and supplied to the bonding rollers 225A and 225B, mainly by the feeding driving power of the feeding rollers 219A and 219B. Similarly, the second tape 200B is fed out from the second tape roll 213 and supplied to the bonding rollers 225A and 225B. Every time a predetermined amount of the first tape 200A and the second tape 200B has been fed, the feeding is temporarily stopped, and an RFID tag Tg is attached by the tag inserter 226 to the attachment portion 200B1 of the second tape 200B on an upstream side where the first tape 200A and the second tape 200B are bonded by the bonding rollers 225A and 225B. After attachment, feeding is restarted. By performing intermittent feed drive in which feeding and stopping of the tape is repeated in this manner, the RFID tags Tg are inserted at predetermined intervals. This multi-layer-structured tape is then fed further downstream by the feeding rollers 219A and 219B, the separator 209 is separated and removed by the rollers 240A and 240B, and the base tape 210 made up of the other portions is wound around the reel member 215a. The base tape roll 215 provided with the RFID circuit elements To at predetermined regular intervals in the tape lengthwise direction is thus manufactured.

At this time, with the present embodiment, the first tape 200A and the second tape 200B provided in advance with the adhesive layers 200Aa and 200Ba respectively are prepared as described above, and the adhesive layers 200Aa and 200Ba are bonded together, thus achieving a constitution in which the RFID tags Tg are interposed therebetween. This eliminates the need to apply adhesive material to the tape and bond it as in the conventional art described above. As a result, the manufacturing process can be simplified and manufacturing costs cut as the adhesive application step is not needed, thus ensuring smoother manufacturing of the base tape 210.

Further, particularly in the present embodiment, the RFID tags Tg are attached to the adhesive layer 200Ba of the second tape 200B at the attachment portion 200B1 at which the second tape 200B is flat due to the tape holding member 274 in the tape feeding path of the second tape 200B. In this way, faulty attachment of RFID tags Tg to the adhesive layer 200Ba is eliminated by attaching the RFID tags Tg with the second tape attachment portion 200B1 which is held flat, thus reliably attaching the RFID tags Tg to the adhesive layer 200Ba of the second tape 200B.

Further, particularly in the present embodiment, the tape drive after every predetermined amount, and the base tape 210 is manufactured provided with the RFID circuit elements To at the predetermined regular intervals in the tape lengthwise direction by attaching the RFID tags Tg using the tag inserter 226 during stoppage. Accordingly, as a result of being able to prevent the occurrence of position drift of the tape while the tape feed is stopped, it is possible to ensure reliable attachment of the RFID circuit elements To at regular intervals.

Further, particularly with the present embodiment, a margin portion is formed in which an appropriate number of RFID tags Tg are not attached, for every N RFID tags Tg attached to the base tape 210. This margin portion can thus be used as a latching portion (or an adhering portion) when first fixing the new base tape 210 after cutting by the cutter 227 to the new reel member 215a. As a result, the fixability of the base tape 210 to the reel member 215a can be improved.

Further, particularly with the present embodiment, neutralizing brushes 275 are provided in the vicinity of the feeding rollers 219A and 219B and the roller 240A. This makes it possible to eliminate static electricity generated in the feeding rollers 219A and 219B and static electricity generated on the base tape 210 by peeling the separator 209. As a result, it is possible to prevent the RFID circuit elements To of the base tape 210 from being destroyed by static electricity.

Further, particularly with the present embodiment, an end mark is provided upstream in the tape feeding direction of the cutting position by the cutter 227 on the base tape 210. In other words, an end mark is first provided to the next base tape 210 after cutting. A tag tape roll can thus be manufactured in which an end mark indicating the end is provided to the first portion wound, by manufacturing a tag tape roll by winding the base tape 210 onto the reel member 215a. As a result, when producing RFID tag labels by feeding the tag tape from the tag tape roll, it is possible to recognize that the tag tape roll has reached its end by detecting this end mark, thus improving workability when producing RFID tag labels, by using this to replace tag tape rolls, and so on.

Further, particular in the present embodiment, a determination is made using the tag checker 270 as to whether or not the RFID circuit elements To of the RFID tags Tg attached by the tag inserter 226 are appropriate or not, and performing control such that if they are determined not to be appropriate, the RFID circuit elements To are not attached to the second tape 200B. This makes it possible to prevent attachment of RFID tags Tg having defective RFID circuit elements To the second tape 200B. As a result, it is possible to improve the reliability of wireless communication functions, since the manufactured tag tape roll only has RFID tags Tg having predetermined performance.

Note that various modifications may be made according to the present embodiment without departing from the spirit and technical scope of the invention, in addition to the above-described embodiment. Description will be made below regarding such modifications.

(1-1) The First Tape Constituted by a Separation Sheet and an Adhesive Layer

In the first embodiment, the first tape 200A had a four-layer structure made up of the tape base layer 200Ab, the adhesive layer 200Ac, and the separator layer 200Ad, however, without being limited to this, a two-layer structure is also possible, made up of the adhesive layer 200Ac and the separator layer 200Ad. FIG. 4 is a horizontal cross-section showing a detailed cross-section structure of a first tape 200A', the RFID tag Tg, and the second tape 200B in the present modification, and is a drawing corresponding to FIG. 2 described above. Note that the same reference numerals are assigned to portions in FIG. 4 which are the same as in FIG. 2 described above, and description thereof is omitted.

As shown in FIG. 4, the first tape 200A' of the present modification has a two-layer structure made up of an adhesive layer 200Ac and a separator layer 200Ad. Note that the constitutions of the RFID tag Tg and the second tape 200B are the same as the constitutions thereof in the first embodiment shown in FIG. 1. With the present modification constituted thus, an RFID tag Tg is attached by the tag inserter 226 to the attachment portion 200B1 of the second tape 200B constituted as described above, then the adhesive layer 200Ac of the first tape 200A' and the adhesive layer 200Ba of the second tape 200B are bonded by the bonding rollers 225A and 225B and fed downstream, and the separator 209 (separator layer 200Bd) is separated and eliminated in the rollers 240A and 240B. Finally, a base tape 210' (not shown in the drawing) made up of the other portions is wound around the reel member 215a. The tag tape roll 210 in which is wound the base tape 210' provided with the RFID circuit elements To at predetermined regular intervals in the tape lengthwise direction is thus manufactured.

With the present modification thus constituted, too, it is possible obtain the same effect as with the first embodiment, namely of simplifying the manufacturing process and cutting manufacturing costs as the adhesive application process is unneeded, and thus ensuring smoother manufacturing of the base tape 210'.

(1-2) The Second Tape being Thermal Sensitive Tape

In the first embodiment, when producing the RFID labels using the manufactured tag tape roll, an example was given of manufacturing a so-called laminate-type base tape 210, wherein tag labels are produced by adhering a cover film on which predetermined printing has been performed onto the adhesive layer 200Bc on the second-tape side of the base tape 210 fed out from the tag tape roll, but, without limiting to this, it is also possible to manufacturing a thermal sensitive type base tape by, for example, constituting the second tape 200B by so-called thermal sensitive tape. FIG. 5 is a horizontal cross-section showing a detailed cross-section structure of the first tape 200A, the RFID tag Tg, and second tape 200B' in the present modification, and is a drawing corresponding to FIG. 2 described above. Note that the same reference numerals are assigned to portions in FIG. 4 which are the same as in FIG. 2 described above, and description thereof is omitted.

As shown in FIG. 5, the second tape 200B' of the present modification has a four-layer structure made up of the adhesive layer 200Ba, the tape base layer 200Bb, a thermal sensitive layer 200Bc' (thermal sensitive layer) constituted by a thermal sensitive agent which colors due to heat (thermal sensitive layer), and a non-adhesive layer 200Bd' (non-adhesive layer) provided so as to cover the surface of the thermal sensitive layer 200Bc'. Note that the constitutions of the first tape 200A and the RFID tag Tg are the same as the constitutions thereof in the first embodiment shown in FIG. 2.

FIG. 6 shows a conceptual diagram of an overall general structure of the tag tape roll manufacturing apparatus 1 for manufacturing a tag tape roll in which is would a base tape 210" in which are bound the first tape 200A and the second tape 200B' of the constitution described above. The differences between the tag tape roll manufacturing apparatus 1 of the present modification shown in FIG. 6 and the tag tape roll manufacturing apparatus 1 shown FIG. 1 described above are the omission of the separator separating step for the second tape 200B', or in other words, the omission of the roller 240B, the fourth step roller 224, the air cylinder 262D, the separator roll 217, the separator shaft driving motor 218 for driving the separator roll 217, the separator driving circuit 234 for performing drive control of the separator shaft driving motor 218, and so on, and the omission of the neutralizing brushes 275 provided after the separator peeling position, since the separator is no longer peeled. Other modes of the constitution are the same as the constitution shown in FIG. 1.

With the tag tape roll manufacturing apparatus 1 thus constituted, RFID tags Tg are attached by the tag inserter 226 to the attachment portion 200B1' of the second tape 200B' thus constituted, the adhesive layer 200Aa of the first tape 200A and the adhesive layer 200Ba of the second tape 200B' are bonded by the bonding rollers 225A and 225B, and the base tape 210" is wounded onto the reel member 215a. The tag tape roll in which is wound the base tape 210" provided with the RFID circuit elements To at predetermined regular intervals in the tape lengthwise direction is thus manufactured.

With the present modification thus constituted, too, it is possible obtain the same effect as with the first embodiment, namely of simplifying the manufacturing process and cutting manufacturing costs as the adhesive application process is unneeded, and thus ensuring smoother manufacturing of the base tape 210".

(1-3) The Separator of the Second Tape being Separated Before Bonding

In the first embodiment, the separator 209 is separated from the second tape 200B after the first tape 200A and the second tape 200B are bonded, but, without being limited to this, it is also the possible, for example, to separate the separator 209 from the second tape 200B before the first tape 200A and the second tape 200B are bonded. FIG. 7 is a horizontal cross-section showing a detailed cross-section structure of a first tape 200A, the RFID tag Tg, and the second tape 200B" in the present modification, and is a drawing corresponding to FIG. 2 described above. Note that the same reference numerals are assigned to portions in FIG. 7 which are the same as in FIG. 2 described above, and description thereof is omitted.

As shown in FIG. 7, the second tape 200B" of the present modification has a three-layer structure made up of the separator layer 200Bd, the adhesive layer 200Ba made of an appropriate adhesive material, and the tape base layer 200Bb. Note that the constitutions of the RFID tag Tg and the first tape 200A are the same as the constitutions thereof in the first embodiment shown in FIG. 2.

FIG. 8 shows a conceptual diagram of an overall general structure of the tag tape roll manufacturing apparatus 1 for manufacturing a tag tape roll in which is would a base tape 210''' in which are bound the first tape 200A and the second tape 200B" of the constitution described above. The difference between the tag tape roll manufacturing apparatus 1 of the present modification shown in FIG. 8 and the tag tape roll manufacturing apparatus 1 shown in FIG. 1 described above is the moving of the separator separating step for the second tape 200B", or in other words the moving of the roller 240B, the fourth step roller 224, the air cylinder 262D, the separator roll 217, and the neutralizing brush 275 upstream in the tape feeding direction from the bonding position of the first tape 200A and the second tape 200B". Other modes of the constitution are the same as the constitution shown in FIG. 1.

With the tag tape roll manufacturing apparatus 1 thus constituted, the separator 209 (separator layer 200Bd) is separated and eliminated from the second tape 200B" thus constituted in the rollers 273 and 240B, then RFID tags Tg are attached by the tag inserter 226 to the attachment portion 200B1" of the second tape 200B", the adhesive layer 200Aa of the first tape 200A and the adhesive layer 200Ba of the second tape 200B" are bonded by the bonding rollers 225A and 225B, and the base tape 210''' is wounded onto the reel member 215a. The tag tape roll in which is wound the base tape 210''' provided with the RFID circuit elements To at predetermined regular intervals in the tape lengthwise direction is thus manufactured.

With the present modification thus constituted, too, it is possible obtain the same effect as with the first embodiment, namely of simplifying the manufacturing process and cutting manufacturing costs as the adhesive application process is unneeded, and thus ensuring smoother manufacturing of the base tape 210'''.

(1-4) Attaching the RFID Tag to the First Tape

In the first embodiment, the RFID tags Tg were attached to the second tape 200B, but, without being limited to this, it is also possible to attach the RFID tags Tg to the first tape 200A. FIG. 9 is a conceptual diagram showing an overall general structure of the tag tape roll manufacturing apparatus 1 according to the present modification, and corresponds to FIG. 1 described above. Note that the same reference numerals are assigned to portions in FIG. 9 which are the same as in FIG. 1 described above, and description thereof is omitted.

The differences between the tag tape roll manufacturing apparatus 1 of the present modification shown in FIG. 9 and the tag tape roll manufacturing apparatus 1 shown in FIG. 1 described above are providing the tape holding member 274 to the first tape 200A side and attaching the RFID tags Tg with the tag inserter 226 to the attachment portion 200A1 of the first tape 200A. With the present modification thus constituted, an RFID tag Tg is attached by the tag inserter 226 to an attachment portion 200A1 of the first tape 200A constituted as described above, then the adhesive layer 200Aa of the first tape 200A and the adhesive layer 200Ba of the second tape 200B are bonded by the bonding rollers 225A and 225B and fed downstream, and the separator 209 is separated and eliminated in the rollers 240A and 240B. Finally, the base tape 210 made up of the other portions is wound around the reel member 215a. The tag tape roll in which is wound the base tape 210 provided with the RFID circuit elements To at predetermined regular intervals in the tape lengthwise direction is thus manufactured.

With the present modification thus constituted, too, it is possible obtain the same effect as with the first embodiment, namely of simplifying the manufacturing process and cutting manufacturing costs as the adhesive application process is unneeded, and thus ensuring smoother manufacturing of the base tape 210.

A second embodiment of the present invention is described with reference to FIGS. 10-19.

FIG. 10 is a conceptual diagram showing an overall general structure of the tag tape roll manufacturing apparatus 1 according to the present embodiment, and corresponds to FIG. 1 described above. Portions equivalent to FIG. 1 are given the same reference numerals, and the description is omitted or simplified.

In FIG. 10, the tag tape roll manufacturing apparatus 1 (tape processing apparatus) produces a base tape 210 by bonding together a first tape 200A (tag disposing tape; detailed structure described below) and a second tape 200B (tag disposing tape; detailed structure described below), and inserting an RFID tag Tg provided with an RFID circuit element To (RFID circuit element for tag label) between the two bonded tapes, thereby manufacturing a base tape roll 215 (Tag tape roll) by winding the base tape 210 (Tag disposing tape, tag tape).

At this time, with the tag tape roll manufacturing apparatus 1 of the present embodiment, a tag checker 2270 as an inspecting means is provided in lieu of the tag checker 270 of the first embodiment in order to determine whether or not the RFID circuit elements To are appropriate, and the tape holding member 274 is omitted. Further, an antenna 2271 is newly provided for performing writing of tag sensitivity information by wireless communication using UHF band or other high-frequency waves with the RFID circuit elements To of the RFID tags Tg provided to the base tape 210. In the present embodiment, a plurality of neutralizing brushes 2280 are provided to the vicinity of the feeding rollers 219A and 219B and the roller 240A, the same as the neutralizing brushes of the first embodiment.

The tag checker 2270 comprises an inspection antenna 2272 for measuring and inspecting tag characteristics (here, the sensitivity of the RFID circuit element To; hereafter "tag sensitivity") of the RFID circuit element To provided to the RFID tags Tg attached by the tag inserter 226. The tag sensitivity indicates a combination of the sensitivity (minimum operating power) of the IC circuit part 151 (chip) itself and the gain of the tag antenna 152.

Further, the tag tape roll manufacturing apparatus 1 comprises a high-frequency circuit 2274 for accessing (writing or reading) the RFID circuit element To via the antenna 2271 and the inspection antenna 2272, and a signal processing circuit 2275 for processing signals read from the RFID circuit element To.

A controller 2230 of the present embodiment is a so-called microcomputer, the same as the controller 230 of the first embodiment, and while a detailed illustration is omitted, the controller 2230 has a CPU, which is a central processing unit, and memory 2276 constituted by ROM, RAM, and so on, and processes signals according to programs stored in advance in the ROM while using the temporary storage function of the RAM of the memory 2276.

With the above constitution, as in the first embodiment, first tape 200A is fed out from the first tape roll 211 mainly by the feeding drive power of the feeding rollers 219A and 219B, passes through the step roller 221, and is supplied to the bonding rollers 225A and 225B. Similarly, the second tape 200B is fed out from the second tape roll 213, passes through the step roller 223 and the roller 273, and is supplied to the bonding rollers 225A and 225B. RFID tags Tg are sequentially attached to the second tape 200B by the tag inserter 226 upstream in the tape feeding direction of the bonding position at which the first tape 200A and the second tape 200B are bonded by the bonding rollers 225A and 225B. Thereafter, the first tape 200A and the second tape 200B to which the RFID tags Tg have been attached are bonded by the bonding rollers 225A and 225B. Attachment of the tags is done using a so-called intermittent feeding drive method, in which the feed drive of the first tape 200A and the second tape 200B is stopped and insertion is performed once the predetermined insertion location is reached (for example, at regular intervals). (The positioning at this time is controlled according to a detection signal by the sensor 228.) At this time, in the present embodiment, the RFID tag Tg (RFID circuit element To) provided to the base tape 210 is positioned near (the writing position) of the antenna 2271 when the feeding drive of the first tape 200A and the second tape 200B is stopped at the predetermined insertion position by the intermittent feeding.

As in the first embodiment, the tape, thus bonded and with the tags inserted, is separated into the separator 209, made up of the separator layer 200Bd provided to the second tape 200B, and the base tape 210, made up of the remaining portions, at the rollers 240A and 240B positioned downstream of the feeding rollers 219A and 219B. The base tape 210 is reeled out by the reel member 215a and cut by the cutter 227 once it has reached a predetermined length. At the same time, the separator 209 is reeled in and collected by the reel member 217a. As a result of the above, the base tape 210, on which have been formed in sequence at the predetermined regular intervals a plurality of RFID circuit elements To in the lengthwise direction, is wound around the reel member 215a, and the base tape roll 215 is thus produced.

FIG. 11 is a functional block diagram which shows the detailed functions of the radio frequency circuit 2274. In FIG. 11, the high-frequency circuit 2274 is constituted by an antenna switch (switching) circuit 2341 switched by the controller 2230, a transmitter 2032 for transmitting signals to the RFID circuit elements To via the antennas 2271 and 2272 passing through the antenna switch circuit 2341, a receiver 2033 for inputting waves reflected from the RFID circuit elements To received by the antennas 2271 and 2272, and a transmit-receive splitter 2034.

The antenna switch circuit 2341 is a switch circuit using a well-known radio frequency FET and diode for connecting one of the antennas 2271 and 2272 to a transmit-receive splitter 2034 in response to a selection signal from the control circuit 2230.

The transmitter 2032 comprises a crystal oscillator 2035 for generating carrier waves for accessing (reading or writing) the RFID tag information of the IC circuit part 151 (see FIG. 12 described below) of the RFID circuit element To, a PPL (Phase Locked Loop) 2036, a VCO (Voltage Controlled Oscillator) 2037, a transmission multiplying circuit 2038 (which may be replaced by a variable amplitude factor amplifier or the like in a case of amplitude modulation) for modulating (in this example, amplitude modulation according to the "TX_ASK" signal supplied from the signal processing circuit 2275) the carrier waves generated based on a signal supplied from the signal processing circuit 2275, and a variable transmission amplifier 2039 for amplifying the modulated waves modulated by the transmission multiplying circuit 2038 with an amplification factor determined according to a "TX_PWR" signal supplied from the controller 2230. The UHF frequency band and the microwave band frequencies are preferably employed for the carrier waves generated as described above, and the output from the transmission amplifier 2039 is transmitted to the antennas 2271 and 2272 via the transmit-receive splitter 2034, and thereby the output is supplied to the IC circuit part 151 of the RFID circuit element To. Note that the RFID tag information is not limited to transmission through a modulated signal but may be transmitted simply on a carrier.

The receiving portion 2033 comprises a first receiving signal multiplying circuit 2040 for multiplying the reflected waves from the RFID circuit element To received from the antennas 2271 and 2272 by the carrier waves generated as described above, a first band-pass filter 2041 for extracting only the signals within the necessary frequency band range from the output of the first receiving signal multiplying circuit 2040, a first receiving signal amplifier 2043 for amplifying the output from the first band-pass filter 2041 and supplying this to a first limiter 2042, a second receiving signal multiplying circuit 2044 for multiplying the reflected waves from the RFID circuit element To received by the antennas 2271 and 2272 by the carrier waves that have been delayed by a phase angle of 90° by a phase shifter 2049 after having been generated as described above, a second band-pass filter 2045 for extracting only the signals within the necessary frequency band range from the output of the second receiving signal multiplying circuit 2044, and a second receiving signal amplifier 2047 for inputting and amplifying the output of the second band-pass filter 2045 and supplying this to a second limiter 2046. The signal "RXS-I" output from the first limiter 2042 and the signal "RXS-Q" output from the second limiter 2046 are input to the signal processing circuit 2275 and processed.

Furthermore, the output of the first receiving signal amplifier 2043 and the second receiving signal amplifier 2047 are input to an RSSI (Received Signal Strength Indicator) circuit 2048. The signal "RSSI" which indicates the strength of these signals is input to the signal processing circuit 2275. In this manner, with the tag tape roll manufacturing apparatus 1 of the present embodiment, the reflected waves from the RFID circuit elements To are demodulated using I-Q quadrature demodulation.

FIG. 12 is a functional block diagram which shows the functional configuration of the RFID circuit element To. In FIG. 12, the RFID circuit element To comprises the tag antenna 152 for transmitting/receiving signals to/from the antennas 2271 and 2272 of the tag tape roll manufacturing apparatus 1 in a non-contact manner using a high frequency such as in the UHF band, and the IC circuit part 151 connected to the tag antenna 152.

The IC circuit part 151 comprises a rectification part 153 for rectifying the carrier waves received via the tag antenna 152, a power source part 154 for storing the energy of the carrier waves rectified by the rectification part 153, which serves as a driving power supply, a clock extraction part 156 for extracting clock signals from the carrier waves received by the tag antenna 152 and supplying the clock signals thus extracted to a control part 155, a memory part 157 capable of storing predetermined information signals, a modem part 158 connected to the tag antenna 152, and the control part 155 for controlling the operation of the RFID circuit element To via the rectification part 153, the clock extraction part 156, the modem part 158, and so on.

The modem part 158 demodulates the communication signal from the antennas 2271 and 2272 of the tag tape roll manufacturing apparatus 1 received by the tag antenna 152, modulates the carrier waves received by the tag antenna 152 based on the response signal from the control part 155, and then re-transmits this as reflected waves with the tag antenna 152.

The control part 155 executes basic control, such as interpreting a received signal demodulated by the modem part 158, generating a response signal based on the information signal stored in the memory part 157, and returning the response signal from the modem part 158.

The clock extraction part 156 extracts the clock component from the received signal and extracts the clock to the control part 155, supplying the clock to the control part 155 corresponding to the speed of the clock component of the received signal.

Here, the most significant feature of the tag tape roll manufacturing apparatus 1 of the present embodiment, which is the above constitution, is manufacturing the base tape roll 215 while inspecting the tag sensitivity (during writing or reading) of the RFID circuit element To (inspection results storing RFID circuit element) of the RFID tag Tg attached by the tag inserter 226, and writing the inspection results to the RFID circuit element To of the RFID tag Tg to be attached after the RFID tag Tg having the RFID circuit element To. A detailed description follows.

FIG. 13 is a flow chart showing a control procedure executed by the controller 2230.

In FIG. 13, in step S2101, first a determination is made as to whether or not the action of winding the base tape 210 around the reel member 215a is complete. This determination is made, for example, by determining whether or not an operator who has completed the action of winding has input an operation signal to the effect that the winding action is complete via an operation means or the like not shown in the drawing. The determination is met if the winding action is complete, and the process moves to the next step, step S2102.

In step S2102, an identifier j expressing the number (in order) of the RFID tag to be attached by the tag inserter 226 is reset to 1, and an identifier k and flags F1 and F2 (described below) expressing the number of tags to which information (tag sensitivity) has been written by wireless communication via the antenna 2271 are reset to 0.

In the next step, step S2103, tape drive is initiated according to an operation signal to the effect of initiating production of base tape, input via an operation means, etc., not shown in the drawing. In other words, a control signal is output to the feeding roller driving circuit 235, and the first tape 200A and the second tape 200B are driven and fed out from the first tape roll 211 and the second tape roll 213 by the drive force of the feeding roller shaft driving motor 220. At the same time, a control signal is output to the first and second tape driving circuits 231 and 232 and the base tape driving circuit 233, and the separator driving circuit 234, and the first and second tape shaft driving motors 212 and 214, and the base tape shaft driving motor 216, and the separator shaft driving motor 218 are also driven. The first tape 200A is thus fed out from the first tape roll 211 and the second tape 200B is fed out from the second tape roll 213, these two are bonded and made into a single unit by the bonding rollers 225A and 225B, and are then fed towards the feeding rollers 219A and 219B.

While not explicitly stated in this process, when initiating the tape drive in step S2103, the motor speed of the first and second tape shaft driving motors 212 and 214, the base tape shaft driving motor 216, and the separator shaft driving motor 218 is controlled, and at the same time tension control (hereafter also referred to as "tape tension control during driving" as appropriate) is also performed so as to achieve an appropriate value for the tension of the tapes 200A, 200B, 209, and 210 during tape feeding, calculated based on the angles of the tension arms 267A-D as detected by the angle sensors 268A-D as the tension arms 267A-D are rotated by the air cylinders 262A-D. Note that the tape tension control during driving is always performed when driving tapes.

In the next step, S2104, a determination is made as to whether or not the base tape 210, which is being reeled into the reel member 215a has reached a predetermined end position. Specifically, determination is made as to whether or not the number of RFID tags Tg attached to the base tape 210 has reached a predetermined number. For example, a determination is made as to whether or not 40 RFID tags Tg have been attached. Since this determination is not ordinarily satisfied immediately after initiating winding, the process moves to the next step, step S2105.

In step S2105, a determination is made as to whether or not the tape being fed as described above as reached a predetermined position for insertion of an RFID tag Tg. This determination may be made, for example, based on detection results by the photo sensor 228 of marks not shown in the drawings provided at a regular pitch to predetermined locations on the surface of the separator layer 200Ad of the first tape 200A as described above. If the determination is satisfied, the process moves to step S2106.

In step S2106, another control signal is output to the feeding roller driving circuit 235, and the driving of first tape 200A and the second tape 200B from the first tape roll 211 and the second tape roll 213 is stopped by stopping the driving of the feeding roller shaft driving motor 220. Note that at this time, the driving of the first and second tape shaft driving motors 212 and 214, the base tape shaft driving motor 216 and the separator shaft driving motor 218 is automatically stopped by the tape tension control during driving described above.

While not explicitly described in this process, when stopping the tape drive in step S2106, tension control is performed such that the sum of the tensions of the first tape 200A and the second tape 200B on the supply side is approximately equal to the sum of the tensions of the base tape 210 and the separator 209 on the reeling-in side, so that position drift of the tape does not occur when the tape drive is stopped in this way (hereafter referred to as "tape tension control during stoppage" as appropriate).

In the next step, step S2107, a determination is made as to whether or not the flag F1, which indicates whether or not the RFID tag Tg (RFID circuit element To) has reached the writing portion by the antenna 2271 due to tape feed, is 0, indicating that it has not reached that position. Specifically, whether or not the RFID tag Tg has reached the writing position is made is determined by whether or not a number j of the RFID tag Tg attached by the tag inserter 226 has reached N1 (see step S2115 discussed below). Note that when RFID tags Tg are attached at the predetermined intervals by the tag inserter 226, N1 is the number of RFID tags Tg disposed on the base tape 210 (the second tape 200B) from the attachment position of the RFID tags Tg by the tag inserter 226 until the writing position by the antenna 2271, and is set to, for example, around 10. When the number j of the RFID tag Tg attached by the tag inserter 226 reaches N1, the RFID tag Tg (RFID circuit element To reaches the writing position by the antenna 2271 for the first time. If the flag G1 is 0, the RFID tag Tg is deemed not to have reached the writing position, the determination is satisfied, and the process moves to step S2108.

In the next step, step S2108, the tag checker 2270 measures the tag sensitivity of during reading and writing of the RFID circuit element To provided to the RFID tag Tg attached by the tag inserter 226. The measurement of the tag sensitivity of the RFID circuit element To is done as follows. Namely, a selection signal is output to the antenna switch circuit 2341, switching the antenna switch circuit 2341 such that the inspection antenna 2272 is connected to the transmit/receive splitter 2034. Next, the "TX_PWR" signal is output to the variable transmission amplifier 2039 provided to the transmitter 2034 of the high-frequency circuit 2274, increasing the access power (output power amount) to the RFID circuit element To of the transmitter 2032 in steps, as shown in FIG. 14 discussed below. Meanwhile, a "Scroll ID" signal is transmitted to the RFID circuit element To be read, via the high-frequency circuit 2274 as RFID tag information generated by the signal processing circuit 2275, prompting a reply. The tag sensitivity is calculated from the access power used when a reply is received from the RFID circuit element To. The tag sensitivity during reading is calculated in this way.

Next, tag sensitivity during writing is measured. As above, the "TX_PWR" signal is output to the variable transmission amplifier 2039 provided to the transmitter 2032 of the high-frequency circuit 2274, and the access power value (output power amount) to the RFID circuit element To of the transmitter 2032 is increased in steps as shown in FIG. 15 discussed below. Meanwhile, the "Program" signal generated by the signal processing circuit 2275 is transmitted to write the information, the "Verify" signal for verifying the content written is transmitted, and a reply is prompted. The tag sensitivity is calculated from the access power used when a reply is received from the RFID circuit element To in response to the "Verify" signal. The tag sensitivity during writing is calculated in this way.

In the next step, step S2109, a determination is made as to whether or not the tag sensitivity calculated in step S2108 is within a predetermined acceptable range. If the tag sensitivity is not within an acceptable range, the determination is not satisfied and the process moves to step S2110. A control signal is output to the tag inserter 226, causing it to prepare to attach the RFID tag Tg following the RFID tag Tg which was provided with the RFID circuit element To which was determined as not being suitable. The process then returns to step S2108 and measures tag sensitivity again. As for the RFID tag Tg which was determined as being not suitable, it may, for example, be ejected out of the tag inserter 226 automatically (or by an operation of an operator), and thus not attached to the second tape 200B. On the other hand, if the tag sensitivity is within the predetermined acceptable range, the determination is satisfied, and the process moves to the next step, step S2111.

In step S2111, the tag sensitivity of RFID circuit element To determined to be acceptable (the tag sensitivity of the RFID circuit element To provided to the j-th RFID tag Tg) is saved to the memory 2276.

In the next step, step S2112, with the tape drive stopped at the predetermined tag insertion location as described above, a control signal is output to the tag inserter 226, and the RFID tag Tg provided with the RFID circuit element To determined to be acceptable (the j-th RFID tag Tg) is attached to the second tape 200B. At this point it is also possible for a display to be performed for an operator to confirm whether or not to insert the RFID tag Tg instead of automatically inserting it if the tag is appropriate as described above, and then insert the RFID tag Tg only if an appropriate instruction is input by the operator.

In the next step, step S2113, 1 is added to the identifier j expressing the number (in order) of the RFID tag attached by the tag inserter 226. Thereafter, the process moves to step S2114, and, as in step S2103, a control signal is output to the feeding roller driving circuit 235, and the feed drive of the first tape 200A and second tape 200B is restarted by the driving force of the feeding roller shaft driving motor 220. Note that in this case, too, the tape tension control during driving is performed for adjusting the tension of the tapes 200A, 200B, 209, and 210 during tape feeding, as in step S2103.

In the next step, step S2115, a determination is made as to whether the identifier j expressing the number (in order) of the RFID tag attached by the tag inserter 226 is N1 or more. If the identifier j is less than N1, the RFID tag Tg (RFID circuit element To) in the base tape 210 is deemed as not having reached the writing position by the antenna 2271, the determination is not satisfied, and the process returns to step S2104. On the other hand, if the identifier N1 expressing the number (in order) of the RFID tag attached by the tag inserter 226 reaches N1 by repeating step S2104 to step S2115, the RFID tag Tg (RFID circuit element To) in the base tape 210 is deemed to have reached the writing position by the antenna 2271, the determination is satisfied, and the process moves to the next step, step S2116.

In step S2116, the flag F1 indicating whether or not the RFID tag Tg (RFID circuit element To) has reached the writing position by the antenna 2271 is set to 1, indicating that it has reached the position.

Next, in step S2117, a determination is made as to whether the identifier j expressing the number (in order) of the RFID tag attached by the tag inserter 226 is N2 or more. N2 is the total number of RFID tags Tg attached to the base tape 210 manufactured from the first tape 200A and the second tape 200B fed out from one reel of the first tape roll 211 and the second tape roll 213 in the tag tape roll manufacturing apparatus 1, and when the identifier j reaches N2, attachment of tags by the tag inserter 226 is finished. If the identifier j is less than N2, the determination is not satisfied and the process returns to step S2104. On the other hand, if by repeating step S2104 to step S2117 the identifier j reaches N2, tag attachment by the tag inserter 226 is deemed to have finished, the determination is satisfied, and the process moves to the next step, step S2118.

In step S2118, the flag F2 indicating whether or not tag attachment by the tag inserter 226 is finished is set to 1, indicating that it has finished, and the process returns to step S2104.

When step S2104 to step S2115 are repeated and the identifier j expressing the number (in order) of the RFID tag attached by the tag inserter 226 reaches N1, the flag F1 is set to 1 in step S2116 as described above, and the process moves to step S2104. The determination in step S2107 is thereby no longer satisfied, and the process moves to the next step, step S2119.

In Step S2119, a determination is made as to whether the identifier k expressing the number of tags to which information has been written using wireless communication via the antenna 2271 is 0. When the first RFID tag Tg reaches the writing position of the antenna 2271, the number of tags written to is 0, and therefore the determination is satisfied, the process returns to step S2120, and end information is read from the memory 2276. This end information is information indicating that the tag in question is the tag in the final order position among the plurality of tags provided to the base tape roll 215, and is stored in the memory 2276 in advance. On the other hand, if the number of tags written to is not 0, the determination is not satisfied, the process moves to step S2121, and the tag sensitivity information of the k-th RFID tag Tg (RFID circuit element To) among the tag sensitivities of the RFID tags Tg (RFID circuit elements To) stored in the memory 2276 is read. Thereafter, the process moves to the next step, step S2122.

In step S2122, the end information read in step S2120 or the tag sensitivity information for the k-th RFID tag Tg (RFID circuit element To) read in step S2121 is written to the k+1 RFID tag Tg (RFID circuit element To). Writing of this tag sensitivity information is done as follows. Namely, a selection signal is output to the antenna switch circuit 2341, switching the antenna switch circuit 2341 such that the antenna 2271 is connected to the transmit/receive splitter 2034. Then, a "program" command to write the tag ID and the tag sensitivity information to the memory part 157 of the IC circuit part 151 of the RFID circuit element To is output to the signal processing circuit 2275. On the basis of this, the "Program" signal is generated in the signal processing circuit 2275 and sent to the k+1 RFID tag Tg (RFID circuit element To) via the transmitter 2032 and the antenna 2271 of the high-frequency circuit 2274, and the information is written to the memory part 157 of the IC circuit part 151.

Note that in the description above, the end information is read from the memory 2276 and written to the first RFID tag Tg, but without being limited to this, it is also possible, for example, to generate a signal corresponding to the end information in the signal processing circuit 2275 and write this.

In the next step, step S2123, 1 is added to the identifier k expressing the number of tags two which information has been written, and the process moves to step S2124.

In step S2124, a determination is made as to whether or not the flag F2 indicating whether or not tag attachment by the tag inserter 226 is finished is set to 1. If the flag F2 is 0, tag attachment is not finished, and therefore the determination is not satisfied, and the process returns to step S2108. If the flag F2 is 1, tag attachment has finished, and therefore the determination is satisfied, and the process returns to step S2114.

If while step S2104 to step S2107→step S2119 to step S2124→step S2108 to step S2117, etc. is being repeated the number of RFID tags Tg attached in the base tape roll 215 wound onto the reel member 215a reaches the predetermined number, the determination in step S2104 is satisfied, and the process moves to the next step, step S2125.

In step S2125, as in step S2106, another control signal is output to the feeding roller driving circuit 235, and the feed drive of first tape 200A and the second tape 200B from the first tape roll 211 and the second tape roll 213 is stopped by stopping the driving of the feeding roller shaft driving motor 220. Note that at this time, as in the case of step S2106, tension control during stoppage is performed such that the sum of the tensions of the first tape 200A and the second tape 200B on the supply side are approximately equal to the sum of the tensions of the base tape 210 and the separator 209 when the tape drive is stopped.

In the next step, step S2126, a control signal is output to the solenoid driving circuit 237, the solenoid 236 is driven, and the base tape 210 is cut (divided) by the cutter 227. This completes the base tape roll 215 made by winding the base tape 210 of the predetermined length.

Note that while not explicitly discussed above, ordinarily when first initiating the manufacturing process of the base tape roll 215, there exists a margin portion from the position at which an RFID tag Tg is attached by the tag inserter 226 up to the winding position of the base tape 210 by the reel member 215a in which no RFID tags Tg are attached (for example, a length equal to around ten attached RFID tags Tg). This margin portion is cut off by being cut by the cutter 227 when the position at which the margin portion ends (a position slightly downstream in the tape feeding direction from the position at which the first RFID tag Tg is attached) reaches the cutter 227. Thereafter, when the base tape 210 from which the margin portion has been cut off is wound onto the reel member 215a, the determination in step S2101 is satisfied and the manufacturing of the base tape roll 215 using the procedure beginning in step S2102 is initiated.

Thereafter, until the RFID tag Tg attached by the tag inserter 226 reaches the writing position by the antenna 2271 by the tape feed, step S2104 to step S2115 is repeated. When the first RFID tag Tg reaches the writing position, the flat F1 is set to 1 in step S2116, and therefore S2104 to step S2107→step S2119 to step S2124→step S2108 to step S2117 is repeated thereafter. As a result, the tag sensitivity of the k-th RFID tag Tg (RFID circuit element To) is written to the k+1 RFID tag Tg (RFID circuit element To) while the RFID tags Tg are attached by the tag inserter 226, and the base tape 210 thus generated is wound onto the reel member 215a. While repeating S2104 to step S2107→step S2119 to step S2124→step S2108 to step S2117, the base tape 210 of a predetermined length is would onto the reel member 215a, thereby satisfying the determination in step S2104, causing the base tape to be cut in step S2126, and thus completing one reel of the base tape roll 215. Once the winding of the base tape 210 thus cut onto the reel member 215a is completed by an operator, the determination in step S2101 is satisfied, and once again S2104 to step S2107→step S2119 to step S2124→step S2108 to step S2117 is repeated, the tag sensitivity of the k-th RFID tag Tg (RFID circuit element To) is written to the k+1 RFID tag Tg (RFID circuit element To) while the RFID tags Tg are attached by the tag inserter 226, and the base tape 210 is wound onto the reel member 215a. By repeating the above, a plurality of base tape rolls 215 are manufactured. If while S2104 to step S2107→step S2119 to step S2124→step S2108 to step S2117 is being repeated attachment of the RFID tags Tg by the tag inserter 226 is completed, the flag F2 is set to 1 in step S2118, and therefore S2104 to step S2107→step S2119 to step S2124→step S2108 to step S2118 is repeated. As a result, even after tag attachment is finished, the writing process of writing tag sensitivity information of the k-th RFID tag Tg (RFID circuit element To) to the k+1 RFID tag Tg (RFID circuit element To), and once the base tape 210 of the predetermined length is wound onto the reel member 215a, the base tape is cut in step S2126, and the final base tape roll 215 is complete.

FIG. 14 is a view for explaining increasing (transmission output controlling means) in steps the output of the "Scroll ID" signal when measuring tag sensitivity during reading in step S2108, and FIG. 15 is a view for explaining increasing (transmission output controlling means) in steps the output of the "Program" signal when measuring tag sensitivity during writing in step S2108.

FIG. 16 is a view conceptually showing stored content of the memory part 157 of the RFID circuit element To provided to the base tape roll 215 manufactured as described above. As shown in FIG. 16, the tag sensitivity (writing/reading) of the RFID circuit element To fed out after the current RFID circuit element To is stored in the memory part 157 of the RFID circuit element To provided to the base tape 210 fed out from the base tape roll 215. End information is stored to the RFID circuit element To fed out last from the base tape roll, and not tag sensitivity information. The tag sensitivity information of the last RFID circuit element To fed out is stored in an RFID circuit element TA provided to the housing 100A of a cartridge 100, described below.

The base tape roll 215 thus manufactured is stored in a case together with a roll in which is wound clear cover film, etc., thus forming the cartridge 100 (tag assembly, first cartridge). RFID labels are produced using the base tape roll 215 by attaching this cartridge 100 to a tag label producing apparatus not shown. FIG. 17 is an explanatory diagram for describing the detailed configuration of the cartridge 100.

In FIG. 17, the cartridge 100 comprises the base tape roll (cartridge housing) 215 disposed inside the housing 100A (cartridge housing) and in which is wound the base tape 210 in the shape of a band, the second roll 104 around which is wound the clear cover film 103 with approximately the same width as the base tape 210, a ribbon supply side roll 111 for feeding out the ink ribbon 105 (thermal transfer ribbon, which is unneeded, however, if the cover film is constituted by thermal sensitive tape), a ribbon take-up roller 106 for taking up the ribbon 105 after printing, a feeding roller for feeding the tape in a direction shown by the arrow A, while pressing and thus mutually adhering the base tape 210 and the cover film 103, thus making them a printed tag label tape (also functions as a feeding roller), and an RFID circuit element TA provided to a position substantially facing a cartridge antenna (not shown) on the side of the tag label producing apparatus on an outer circumferential surface of the housing 10A.

As described above, the base tape roll 215 holds the base tape 210, wound around the reel member 215a, in which the plurality of RFID circuit elements To are sequentially disposed at predetermined regular intervals in a lengthwise direction.

The second roll 104 holds the cover film 103 wound around a reel member 104a. The cover film 104 fed out from the second roll 104 is pressed against the ribbon 106 driven by the ribbon supply side roll 211 and the ribbon take-up roller 105, which are disposed inward from the back side of the cover film 103 (i.e., the side of the cover film 103 which is affixed to the base tape 210), by the print head 10 of the tag producing apparatus, such that the ribbon 105 is brought into close contact with the back side of the cover film 103.

The ribbon take-up roller 106 and the feeding roller 107 are respectively rotationally driven by a driving force of a cartridge motor (not shown) which is transmitted to the ribbon take-up roller driving shaft 11 and the feeding roller driving shaft 12. The cartridge motor 23 may be, for example, a pulse motor provided to the tag label producing apparatus, outside the cartridge 100.

Of the plurality of RFID circuit elements To provided to the base tape roll 215, the tag sensitivity of the first RFID circuit element To fed out (in other words, the last RFID circuit element To attached by the tag inserter 226 when manufacturing the base tape roll 215) is stored in the IC circuit part 151 of the RFID circuit element TA. As a result, when producing tag labels, a control circuit (not shown) of the tag label producing apparatus reads the tag sensitivity information of the RFID circuit element TA and controls a high-frequency circuit (not shown), thereby allowing access (writing or reading) in an optimal communication manner of the last RFID circuit element To fed out from the base tape roll 215.

In the cartridge 100 constituted as described above, the base tape 210 fed out from the first roll 102 is supplied to the feeding roller 107. The cover film 103 fed out from the second roller 104, in turn, is pressed against the ribbon 105 driven by the ribbon supply roll 111 and the ribbon take-up roller 105, which are disposed inward from the back side of the cover film 103 (i.e., the side of the cover film 103 which is adhered to the base tape 210), by the print head 10, such that the ink ribbon 105 is brought into close contact with the back side of the cover film 103.

Then, when the cartridge 100 is loaded in a cartridge holder (not shown) of the tag label producing apparatus body, and a roll holder (not shown) is moved from a separated position to a contact position, the cover film 103 and the ink ribbon 105 are sandwiched between the print head 10 and a platen roller 108 (installed in the tag label producing apparatus), while the base tape 210 and the cover film 103 are sandwiched between the tape feeding roller 107 and a sub-roller 109 (installed in the tag label producing apparatus). The ribbon take-up roller 106 and the feeding roller 107 are then synchronously rotationally driven in the directions indicated by the arrow B and the arrow D, respectively, by the driving force provided from the cartridge motor (not shown). Furthermore, the feeding roller driving shaft 12, the sub-roller 109, and the platen roller 108 are connected to one another by a gear (not shown) separately provided to the tag label producing apparatus. With such an arrangement, upon driving the feeding roller driving shaft 12, the feeding roller 107, the sub-roller 109, and the platen roller 108 rotate, thereby feeding out the base tape 210 from the base tape roll 215 to the feeding roller 107 as described above. On the other hand, the cover film 103 is fed out from the second roll 103, and a plurality of heating elements of the print head 10 are powered by a print-head driving circuit 25 separately provided to the tag label producing apparatus. As a result, printing R (not shown) is printed on the back side of the cover film 103. Then, the base tape 210 and the printed cover film on which printing has finished 103 are adhered to each other by the feeding roller 107 and sub-roller 109 so as to form a single tape, thereby forming the printed tag label tape 110, which is then fed out of the cartridge 100. Subsequently, the ribbon take-up roller driving shaft 11 is driven to take up the ink ribbon 105, for which printing to the cover film 103 is finished, onto the ribbon take-up roller 106. A guide roller 120 is provided next to where the base tape roll 215 is fed out, limiting the positional relationship between the apparatus antenna 14 and the RFID circuit element To a predetermined range, even if an outer diameter D changes due to the remaining amount of the base tape roll 214.

In the above, the signal processing circuit 2275, the high-frequency circuit 2274, and the antenna 2271 constitute the writing means for writing to the inspection results storing RFID circuit element via wireless communication, described in each of the present invention. Further, the tag checker 2270 constitutes the inspecting means for inspecting characteristics of the RFID circuit elements for tag labels as the RFID circuit elements. Further, the signal processing circuit 2275, the high-frequency circuit 2274, the antenna 2271, and the tag checker 2270 constitute the smooth processing means for applying the predetermined smooth processing to the tag disposing tape when forming the tag tape or the tag labels.

As described above, with the tag tape roll manufacturing apparatus 1 of the present embodiment, when manufacturing the base tape 210, the first tape 200A is fed out from the first tape roll 211 and supplied to the bonding rollers 225A and 225B, mainly by the feeding drive force of the feeding rollers 219A and 219B. Similarly, the second tape 200B is fed out from the second tape roll 213 and supplied to the bonding rollers 225A and 225B. Every time a predetermined amount of the first tape 200A and the second tape 200B has been fed, the feeding is temporarily stopped, and an RFID tag Tg is attached by the tag inserter 226 to the second tape 200B on the upstream side where the first tape 200A and the second tape 200B are bonded by the bonding rollers 225A and 225B. After attachment, feeding is restarted. By performing intermittent feed drive in which feeding and stopping of the tape is repeated in this manner, the RFID tags Tg are inserted at predetermined intervals. This multi-layer-structured tape is then fed further downstream by the feeding rollers 219A and 219B, the separator 209 is separated and removed by the rollers 240A and 240B, and the base tape 210 made up of the other portions is wound around the reel member 215a. The base tape roll 215 in which is wound the base tape 210 provided with the RFID circuit elements To at predetermined regular intervals in the tape lengthwise direction is thus manufactured.

Next, according to the present embodiment, the tag checker 2270 inspects the tag characteristics (the tag sensitivity, in the present embodiment) of the plurality of RFID circuit elements To contained in a predetermined order in the base tape roll 215 as described above, and the tag characteristic information which is the result of the inspection is written to the following RFID circuit element To (in other words, upstream in the tape feeding direction), and thus the base tape roll 215 is completed. As a result, when producing an RFID label T (see FIG. 25, etc., discussed below) by feeding the base tape 210 out from the completed base tape roll 215 in the tag label producing apparatus and accessing (writing or reading) the plurality of RFID circuit elements To provided to the base tape 210 using wireless communication, the tag characteristics of the subsequently fed out RFID circuit element To are stored in the previously fed out RFID circuit element To. Accordingly, when reading or writing information to or from an RFID circuit element To, communication in an mode matching those characteristics (in the present embodiment, an access power value matching the tag sensitivity) can be used by using the tag characteristic information of the RFID circuit element To read from the previous RFID circuit element To ahead of time. Accordingly, even if variation occurs in the tag characteristic value data during manufacture of RFID circuit elements To, it is possible to realize an optimum communication mode by controlling the communication mode for each RFID circuit element To when producing the tag labels. It is thereby possible to ensure smooth manufacturing of RFID labels. Wasting energy and adversely affecting communication, for example, can be prevented, compared with communication using uniform tag characteristic value data for all RFID circuit elements To.

Furthermore, in particular with the present embodiment, of the plurality of RFID tags Tg contained in the predetermined order in the manufactured base tape roll 215, end information is written to the RFID circuit element To of the RFID tag Tg wound onto the reel member 215a first indicating that that RFID circuit element To is in the last position. As a result, when producing RFID labels with the tag label producing apparatus by feeding out the base tape 210 from the completed base tape roll 215 and accessing (writing to or reading) the plurality of RFID circuit elements To provided to the base tape 210 suing wireless communication, it can be detected that the base tape roll 215 has reached its end by reading the end information when transmitting/receiving to/from the final RFID circuit element To.

Further more, particularly with the present embodiment, when the tag checker inspects the tag sensitivity of the RFID circuit elements To attached by the tag inserter 226, the access power (output power) value is increased in steps while transmitting the "Scroll ID" signal (or the "Program" or "Verify" signals) to the RFID circuit element To to be inspected, and a response is prompted. In other words, after executing communication with an RFID circuit element To at a relatively small transmission power which results in an access failure, the transmission power is gradually increased in steps until an access is determined as successful. As a result, it is possible to inspect the sensitivity of an RFID circuit element To at the minimum required transmission power, making it thus possible to avoid wasting energy.

Further, particularly with the present embodiment, the tag checker inspects the tag sensitivity of an RFID circuit element To before the RFID circuit element To is to be attached to the second tape 200B by the tag inserter 226, and if the tag sensitivity is not within an acceptable range, the RFID tag Tg having that RFID circuit element To is not attached to the second tape 200B. As a result, it is possible to improve the reliability of wireless communication functions, since the manufactured base tape roll 215 only has RFID tags Tg having predetermined performance.

Note that various modifications may be made according to the second embodiment without departing from the spirit and technical scope of the invention, in addition to the above-described embodiment. Description will be made below regarding such modifications.

(2-1) Storing the Writing Sensitivity of One Tag and the Reading Sensitivity of the Next Tag With the second embodiment, tag sensitivity of an RFID circuit element To attached by the tag inserter 226 during writing and reading is inspected, and the inspection results are written to the next RFID circuit element To attached after the inspected RFID circuit element To, thereby storing the tag sensitivity during writing and reading of the RFID circuit element To supplied after the RFID circuit element To which the information is written, as shown in FIG. 16, when producing RFID labels, but this is not a limitation. In other words, it is also possible for an RFID circuit element To store its own tag sensitivity information during writing, and the tag sensitivity information during reading of the next RFID circuit element To supplied.

FIG. 18 is a view conceptually showing stored content of the memory part 157 of the RFID circuit element To provided to the base tape roll 215 manufactured according to this modification, and corresponds to FIG. 16. As shown in FIG. 18, with the present modification, each RFID circuit element To provided to the base tape 210 fed out from the base tape roll 215 stores its own tag sensitivity information during writing, and also stores the tag sensitivity information during reading of the RFID circuit element To supplied next.

When producing the base tape roll 215 of the present modification, in step S2121 of the flow chart of FIG. 13 described above, it is possible to read from the memory 2276 the tag sensitivity (during reading) of the k-th RFID circuit element To and the tag sensitivity (during writing) of the k+1 RFID circuit element To, and to write these two pieces of information to the k+1 RFID circuit element To in the next step, step S2122.

With this modification, when producing RFID labels using the manufactured base tape roll 215, it is possible to read the tag sensitivity information during writing of one RFID circuit element To and at the same time read the tag sensitivity information during reading of the next RFID circuit element To supplied from the base tape roll 215, from the same RFID circuit element To. Therefore, it is possible to read this information and then write the tag sensitivity information to the RFID circuit element To at an access power matching the tag sensitivity using the tag sensitivity during writing thus read.

(2-2) Storing all Tag Inspection Results to a Single Tag

With the second embodiment, the tag sensitivity information of each RFID circuit element To is written to the RFID circuit element To attached after that RFID circuit element To, while only the tag sensitivity information for the final RFID circuit element To be attached is stored in an RFID circuit element TA provided to the housing 100A of the cartridge 100, but this is not a limitation. In other words, it is possible, for example, to store in a batch the sensitivity information for all RFID circuit elements To provided to the manufactured base tape roll 215 to the RFID circuit element TA (an RFID circuit element for storing inspection results).

In this case, sensitivity information is not written to each RFID circuit element To in steps S2119 to step S2124 in the flow chart of FIG. 13 described above, but instead the sensitivity information for all tags read from the 2276 is written in a batch to the RFID circuit element TA provided to the cartridge housing 100A containing the manufactured base tape roll 215.

In the present modification, when producing the RFID labels, communication with each RFID circuit element To can be done in a mode matching its tag characteristics by reading the tag sensitivity information of all the RFID circuit elements To from the RFID circuit element TA provided to the housing 100A at the beginning.

Note that when writing the tag sensitivity information of all the RFID circuit elements To provided to the base tape roll 215 in this manner, it is not necessary for the tag to be written to be the RFID circuit element TA provided to the cartridge housing 100A. In other words, for example, it is also possible to write to the last RFID circuit element To (inspection results storing RFID circuit element) attached by the tag inserter 226 when manufacturing the base tape roll 215. Since in this case the last RFID circuit element To attached during tag label production is the first to be fed out from the base tape roll 215, the tag sensitivity information for all the RFID circuit elements To can be read from this first RFID circuit element To fed out, thus making it possible to communicate with each RFID circuit element To in a mode that matches its tag characteristics.

(2-3) Variations in Tag Assemblies

In the second embodiment, the form of a tag assembly was described using the example of a so-called roll-type tag cartridge, in which the housing 100A contains the base tape roll 215 manufactured by winding the base tape 210 around the reel member 215a, but this is not a limitation. For example, as shown in FIG. 19, it is also possible to manufacture a so-called tray-type cartridge 91, by cutting the base tape 210 into rectangular strip-like tapes 92 (sheet) on which is disposed at least one RFID circuit element To, stacking the tapes 92 (tag disposing tape; label material, attachment material) in a rectangular box-like tray member 91A (second cartridge, tag body), and making this into a cartridge. The tray member 91A contains a plurality of the rectangular strip-like tapes 92 provided with RFID circuit elements To, stacked in a flat pile. By pulling out one of the tapes 92 at a time from a slot provided to one side face of the tray member 91A (for example, the side in the center of the drawing), the plurality of RFID circuit elements To can be taken out in sequence. In this case, when producing the RFID labels, this cartridge 91 is mounted on a mounting portion (cartridge holder; not shown) on the tag label producing apparatus, and the tapes 92 are moved and fed from the tray member 91A, and then printed on and written to.

Note that in the present modification, as described in (2-2) above, it is also possible to store in a batch the sensitivity information of all the RFID circuit elements To provided to the cartridge 91 to the RFID circuit element TA (RFID circuit element for storing inspection results) provided to the tray member 91A.

With the present modification, when producing the RFID labels, it is possible to achieve the same effect as with the second embodiment, namely of ensuring smooth manufacturing of the RFID labels T by performing wireless communication with each RFID circuit element To in the optimum communication mode.

Further, while not particularly illustrated and described, a constitution in which the manufactured base tape roll 215 is mounted directly onto the tag label producing apparatus is also possible, instead of the cartridge type as in the second embodiment. In this case, the RFID circuit element TA (RFID circuit element for storing inspection results) provided to the cartridge housing 100A in the second embodiment may be constituted so as to be built into the reel member 215a of the base tape roll 215, for example. This case provides similar effects to those of the second embodiment.

(2-4) Other (i) Writing Characteristic Information Other than Tag Sensitivity

With the second embodiment, when inspecting characteristics of the RFID circuit elements To, the tag sensitivity is calculated from the access power when a reply is received from each RFID circuit element To, and this tag sensitivity information is written to the following RFID circuit element To. However, this is not a limitation, and it is also possible to write the access power information as-is when a reply is received, to the next RFID circuit element To, instead of calculating the tag sensitivity. Further, it is also possible to write access conditions such as memory writing voltage, writing time, and so on of the memory part 157 in the IC circuit part 151 of the RFID circuit element To as other tag characteristic information. In this case, too, when performing wireless communication with each RFID circuit element To during RFID label production, it is possible to read the access conditions from the preceding RFID circuit element To, and set the transmitter 2032 of the high-frequency circuit 2274 so as to correspond to the access conditions such as the memory writing voltage, writing time, and so on, thereby making it possible to access the following RFID circuit elements To using a communication mode that matches the access conditions of each tag.

(ii) Writing to a Tag a Few Tags Later, and not to the Next Tag

In the second embodiment, the tag sensitivity of each RFID circuit element To is measured, and the measurement results of the RFID circuit element To which was inspected are written to the next RFID circuit element To attached thereafter, but this is not a limitation. In other words, it is also possible to write to an RFID circuit element To attached two tags or more thereafter. This case provides similar effects to those of the second embodiment.

(iii) Manufacturing a Non-Laminated Base Tape Roll

In the above, a case was described as an example in which a so-called laminated-type base tape roll 215 is manufactured by printing on a cover film 103 separated from the base tape 210 provided with the RFID circuit elements To, and the two are bonded together, but this is not a limitation. It is also possible to apply the present invention to a case in which a so-called non-laminated-type base tape roll 215 is manufactured by printing on a cover film provided to a base tape. In this case, when producing the RFID labels by manufacturing the base tape roll 215 by providing a plurality of RFID circuit elements To a thermal sensitive tape, it is also possible to print the printing on a surface of the thermal sensitive tape using a print head having a plurality of heating elements, and it is also possible to print using an ink ribbon, as in the second embodiment.

Below, a third embodiment of the present invention is described with reference to FIGS. 20-35. Components identical to those in the first and second embodiments are designated the same reference numerals, and descriptions thereof are omitted or simplified as appropriate.

FIG. 20 is a system configuration diagram showing an RFID tag manufacturing system which applies an apparatus for communicating with an RFID tag according to the present embodiment.

In the RFID tag generating system 20 shown in FIG. 1, a tag label producing apparatus (RFID tag information communication apparatus) 2 according to the present embodiment is connected to a route server 4, a terminal 5, a general purpose computer 6, and a plurality of information servers 7 via a communication line 3 in a wired or wireless manner.

FIG. 21 is a conceptual diagram representing the configuration of the tag label producing apparatus 2 in greater detail.

In FIG. 21, a main body 8 of the tag label producing apparatus 2 is formed with a recessed cartridge holder (not shown) in which a cartridge 100 (first cartridge, tag body) is removably loaded, as in FIG. 17. The main body 8 is provided with an opening/closing lid OC rotatably connected to the main body 8 so as to cover the cartridge holder when closed. A forward plate OCa is formed on the opening/closing lid OC in order to cover a forward face 8a of the main body 8 when closed. A latching hole 51 is provided in the forward plate OCa. The main body 8 is provided with a lock solenoid 53 for insertably driving a latching pin 52 into the latching hole with the opening/closing lid OC closed.

The main body 8 has a print head (thermal head) 10 as in FIG. 17 described above for performing predetermined printing on the cover film 103 fed out from a second roll 104, a ribbon take-up roller driving shaft 11 as in FIG. 17 described above for driving an ink ribbon 105 which has completed printing to the cover film 103, a feeding roller driving shaft 12 as in FIG. 17 described above for bonding the cover film 103 and a base tape 101 fed out from a first roll 102 (tag tape; corresponding to the base tape 210 in the first and second embodiments and the fourth embodiment described below) and feeding this out from the cartridge 100 as a printed tag label tape 110, an antenna 14 (apparatus antenna, first apparatus antenna) for transmitting and receiving signals through wireless communication using UHF band and other high-frequencies to and from RFID circuit elements To (discussed in detail below) provided to the base tape 101, a cartridge antenna 19 (second apparatus antenna) for transmitting and receiving signals through wireless communication as described above with an RFID circuit element TA (information medium, RFID circuit element for initial tag storage) provided to the cartridge 100, a cutter 15 for generating label-like RFID labels T (discussed in detail below) by cutting the printed tag label tape 110 to a predetermined length at a predetermined timing, a feeding roller 17 for carrying and feeding the RFID labels T to a discharge port 16, a sensor 18 for detecting the presence of the RFID labels T in the discharge port 16, a sensor 20 (tag body detecting means) for detecting whether or not the cartridge 100 is loaded in the cartridge holder, and a housing 9 (apparatus housing) constituted with an outer shell to contain the above and provided with the cartridge holder and discharge port 16 for removably mating the cartridge 100.

The sensor 20 is an optical sensor using reflected light. Specifically, the sensor 20 is constituted so as to comprise a light-emitting diode for emitting light based on a signal from a control circuit 30, and a photo transistor for receiving light which is the reflection of the emitted light off of an outer surface of the cartridge housing 100A (described below) and outputting a detection signal to the control circuit 30 corresponding to this reflected light. Note that a sensor such as one using a mechanical switch pressed when loading the cartridge 100A, for example, may also be used, aside from this sensor 20. This sensor may also be used to identify the type of the cartridge.

The antenna 14 comprises a directional antenna (a so-called patch antenna in this example) which is directional in one direction (in front of the sheet in FIG. 2 in this example), and is disposed near the first roll 102 in the axial direction (behind the sheet in FIG. 21) in an axial direction, and is disposed so as to make communication possible with an area X near the first roll 102 from which the base tape 101 is fed out.

Also, the apparatus main body 8 further comprises a high-frequency circuit 21 for accessing (writing or reading) the RFID circuit elements To and TA via the antenna 14 and a cartridge antenna 19, a signal processing circuit 22 for processing signals read from the RFID circuit elements To and TA, a cartridge motor 23 for driving the ribbon take-up roller driving shaft 11 and the feeding roller driving shaft 12, a cartridge driving circuit 24 for controlling the driving of the cartridge motor 23, a printing driving circuit 25 for powering the print head 10, a solenoid 26 configured to drive the cutter 15 to perform the cutting operation, a solenoid driving circuit 27 for controlling the solenoid 26, a feeding roller motor 28 for driving the feeding roller 17, a control circuit 30 for controlling the high-frequency circuit 21, the signal processing circuit 22, the cartridge driving circuit 24, the printing driving circuit 25, the solenoid driving circuit 27, the feeding roller driving circuit 29, and the like, thereby controlling the operation of the overall system of the tag label producing apparatus 2, and a lock solenoid driving circuit 58 for controlling the lock solenoid 53.

The control circuit 30 is a so-called microcomputer. While a detailed description thereof is omitted, the control circuit 30 is constituted by a CPU which is a central processing unit, ROM, RAM, and the like, and performs signal processing according to programs previously stored in the ROM using the temporary storage function provided by the RAM. Furthermore, the control circuit 30 is connected to the communication line via the input/output interface 31, for example. Such an arrangement allows the control circuit 30 to exchange information with the route server 4, the other terminal 5, the general purpose computer 6, the information server 7, etc., which are connected to this communication line.

FIG. 22 is a descriptive diagram for describing the cartridge 100 in detail, and corresponds to FIG. 17.

In FIG. 22, the cartridge 100 of the present embodiment comprises the first roll 102 (corresponding to the base tape roll 215 of FIG. 17) constituted by winding the band-like base tape 101 around the reel member 102a (corresponding to the reel member 215a of FIG. 17), inside the housing 100A. The feeding roller 107 presses and thereby adheres the base tape 101 and the cover film 103 together, thereby producing the printed tag label tape 110, which is then fed in the direction indicated by arrow C. The RFID circuit element TA as in FIG. 17 is provided to a position substantially opposing the cartridge antenna 19 of the apparatus main body 8 on an outer circumferential surface of the housing 100A.

The first roll 102 holds the base tape 101, wound around the reel member 102a, in which the plurality of RFID circuit elements To are sequentially disposed at predetermined regular intervals in a lengthwise direction.

In this example, the base tape 101 has a four-layer structure (refer to the partially enlarged view in FIG. 22) comprising an adhesive layer 101a formed of a suitable adhesive material, a colored base film 101b formed of PET (polyethylene terephthalate) or the like, an adhesive layer 101c formed of a suitable adhesive material, and a separation sheet 101d. The four layers of the base tape 101 are layered in that order from the side rolled to the inside (the right side in FIG. 22) to the side corresponding to the opposite side (the left side in FIG. 22).

The antenna (tag antenna) 152 for transmitting and receiving information is provided integrally to the back side of the base film 101b (the left side in FIG. 22), to which is formed the IC circuit part 151 for updatably (rewritably) storing information for connecting to this. This constitutes the RFID circuit element To. (The RFID circuit element TA described above is the same.)

The adhesive layer 101a for adhering to the cover film 103 at a later time is formed on the front side of the base film 101b (on the right side in FIG. 22). Furthermore, the separation sheet 101d is adhered to the back side (on the left side of FIG. 22) of the base film 101b by the adhesive layer 101c provided so as to contain the RFID circuit element To. Note that the separation sheet 101d is peeled off when the RFID label T is adhered as a finished label-like product to a predetermined article or the like, thereby adhering the RFID label T to the article or the like by the adhesive layer 101c.

A described using FIG. 17 in the second embodiment, the ribbon take-up roller 106 and the feeding roller 107 are respectively rotationally driven by a driving force of the cartridge motor 23 (refer to FIG. 21 described above) which is transmitted to the ribbon take-up roller driving shaft 11 and the feeding roller driving shaft 12. The cartridge motor 23 may be, for example, a pulse motor externally provided to the cartridge 100.

As in the second embodiment, the IC circuit part 151 of the RFID circuit element TA stores information (here, the sensitivity information of the RFID circuit elements To, hereafter referred to as "tag sensitivity information;" this is the "smooth processing factor") associated with the tag characteristic values of the first RFID circuit element To supplied (or in other words, the first to which information is written), of the plurality of RFID circuit elements To provided to the base tape 101. By reading this tag sensitivity information and controlling the high-frequency circuit 21, the control circuit 30 can access the first RFID circuit element To supplied using the optimum communication mode. (See below for details.) The tag sensitivity information is a combination of the sensitivity (minimum operating power) of the IC circuit part 151 (chip) itself and the gain of the tag antenna 152 (described below). Alternately, it is possible to use minimum writing power information or optimum writing power information when using the writing antenna, acting as a reference. Once this tag sensitivity information is known, it is possible to set optimum writing conditions and reading conditions according to the gain and directionality of the antenna on the tag label producing apparatus and the distance of an RFID circuit element To from the antenna.

As described in the second embodiment using FIG. 17, with the cartridge 100 thus constituted, the base tape 101 fed out from the first roll 102 is fed to the feeding roller 107. The cover film 103 fed out from the second roller 104, in turn, is pressed against the ribbon 105 driven by the ribbon supply roll 111 and the ribbon take-up roller 105, which are disposed inward from the back side of the cover film 103 (in other words, the side of the cover film 103 which is adhered to the base tape 101), by the print head 10, such that the ink ribbon 105 is brought into close contact with the back side of the cover film 103.

Then, when the cartridge 100 is loaded in the cartridge holder of the main body 8, and a roll holder (not shown) is moved from a separated position to a contact position, the cover film 103 and the ink ribbon 105 are sandwiched between the print head 10 and a platen roller 108, while the base tape 101 and the cover film 103 are sandwiched between the feeding roller 107 and the sub-roller 109. Subsequently, the ribbon take-up roller 106 and the feeding roller 107 are simultaneously rotationally driven in the directions indicated by the arrow B and the arrow D, respectively, by the driving force provided from the cartridge motor 23. Furthermore, the feeding roller driving shaft 12, the sub-roller 109, and the platen roller 108 are connected to one another by a gear (not shown). With such an arrangement, upon driving the feeding roller driving shaft 12, the feeding roller 107, the sub-roller 109, and the platen roller 108 rotate, thereby feeding out the base tape 101 from the first roll 102 to the feeding roller 107 as described above. On the other hand, the cover film 103 is fed out from the second roll 104, and a plurality of heating elements of the print head 10 are powered by the print-head driving circuit 25. As a result, a printing R (see FIG. 25, described below) is printed on the back side of the cover film 103. Then, the base tape 101 and the printed cover film 103 onto which printing has finished are adhered to each other by the feeding roller 107 and sub-roller 109 so as to form a single tape, thereby forming a printed tag label tape, which is then fed out of the cartridge 100. Subsequently, the ribbon take-up roller driving shaft 11 is driven to take up the ink ribbon 105, for which printing to the cover film 103 is finished, onto the ribbon take-up roller 106. A guide roller 120 is disposed near where the tape is fed out from the first roll 102, and maintains constant conditions for communications with the RFID circuit elements To by restricting the distance between the transport path of the base tape 102 and the antenna 14 to within a predetermined range at all times, even if the outer diameter of remaining amount on the base tape roll 102 changes.

FIG. 23 is a functional block diagram showing detailed functions of the radio frequency circuit 21. In FIG. 23, the high-frequency circuit 21 is constituted by an antenna switch (switching) circuit 341 (antenna switching means) switched by the control circuit 30, a transmitter 32 for transmitting signals to the RFID circuit elements To and TA via the antennas 14 and 19 passing through the antenna switch circuit 341, a receiver 33 for inputting waves reflected from the RFID circuit elements To and TA received by the antennas 14 and 19, and a transmit/receive splitter 34.

The antenna switch circuit 341 is a switch circuit using a well-known radio frequency FET and diode for connecting one of the antennas 14 and 19 to a transmit-receive splitter 34 in response to a selection signal from the control circuit 30.

The transmitter 32 comprises a crystal oscillator 35 for generating carrier waves for accessing (reading or writing) the RFID tag information of the IC circuit part 151 of the RFID circuit elements To and TA, a PPL (Phase Locked Loop) 36, a VCO (Voltage Controlled Oscillator) 37, a transmission multiplying circuit 38 (which may be replaced by a variable amplitude factor amplifier or the like in a case of amplitude modulation) for modulating (in this example, amplitude modulation according to the "TX_ASK" signal supplied from the signal processing circuit 22) the carrier waves generated based on a signal supplied from the signal processing circuit 22, and a variable transmission amplifier 39 for amplifying the modulated waves modulated by the transmission multiplying circuit 38 with an amplification factor determined according to a "TX_PWR" signal supplied from the control circuit 30. The UHF frequency band and the microwave band frequencies are preferably employed for the carrier waves generated as described above, and the output from the transmission amplifier 39 is transmitted to either the antennas 14 or 19 via the transmit-receive splitter 34, and thereby the output is supplied to the IC circuit part 151 of the RFID circuit elements To and TA. Note that the RFID tag information is not limited to transmission through a modulated signal but may be transmitted simply on a carrier.

Note that the high-frequency circuit transmitter 32 and the signal processing circuit 22 constitute an access information generating means for generating access information to IC circuit parts of RFID circuit elements, and constitute an information transmitting means for transmitting access information generated by the access information generating means to the tag antenna provided to the RFID circuit element via the apparatus antenna in a non-contact manner, and thereby accessing the IC circuit part.

The receiving portion 33 comprises a first receiving signal multiplying circuit 40 for multiplying the reflected waves from the RFID circuit elements To and TA received from the antennas 14 and 19 by the carrier waves generated as described above, a first band-pass filter 41 for extracting only the signals within the necessary frequency band range from the output of the first receiving signal multiplying circuit 40, a first receiving signal amplifier 43 for amplifying the output from the first band-pass filter 41 and supplying this to a first limiter 42, a second receiving signal multiplying circuit 44 for multiplying the reflected waves from the RFID circuit elements To and TA received by the antennas 14 and 19 by the carrier waves that have been delayed by a phase angle of 90° by a phase shifter 49 after having been generated as described above, a second band-pass filter 45 for extracting only the signals within the necessary frequency band range from the output of the second receiving signal multiplying circuit 44, and a second receiving signal amplifier 47 for inputting and amplifying the output of the second band-pass filter 45 and supplying this to a second limiter 46. The signal "RXS-I" output from the first limiter 42 and the signal "RXS-Q" output from the second limiter 46 are input to the signal processing circuit 22 and processed.

Furthermore, the output of the first receiving signal amplifier 43 and the second receiving signal amplifier 47 are input to an RSSI (Received Signal Strength Indicator) circuit 48.

The signal "RSSI" which indicates the strength of these signals is input to the signal processing circuit 22. In this manner, with the tag label producing apparatus 2 of the present embodiment, the reflected waves from the RFID circuit elements To are demodulated using I-Q quadrature demodulation.

Note that while not described in particular in the above, with the present embodiment, control is provided so as to update a communications protocol according to the switch position of the antenna switch circuit 341 in order to prevent mixing communication when the antenna switch circuit 341 is switched to the cartridge antenna 19 side (communication between the cartridge antenna 19 and the RFID circuit element TA) on the one hand and communication when the antenna switch circuit 341 is switched to the antenna 14 side (communication between the antenna 14 and an RFID circuit element To). As a result, the desired RFID circuit element can be accessed without mixing signals. Further note that it is also possible to change the access frequencies (for example, 13 MHz and 950 MHz) used with the RFID circuit elements according to the switching position of the antenna switch circuit 341, instead of changing protocols. Furthermore, mixing signals can be prevented if an ID of the RFID circuit element TA and an ID of the RFID circuit element To are made not to match, and reading and writing were done by designating the ID of the RFID circuit element TA, since the RFID circuit element To would not respond in this case. It is also possible to access the RFID circuit element TA after having put the RFID circuit element To in sleep mode ahead of time.

Note further that the functional configuration of the RFID circuit element To and RFID circuit element TA in the present embodiment are the same as that shown in FIG. 12 in the second embodiment, and therefore a description thereof is omitted.

FIG. 24 is a view conceptually showing stored content of the memory part 157 of the RFID circuit element To according to the present embodiment. As shown in FIG. 24, in the present embodiment, the memory part 157 of each RFID circuit element To (second RFID circuit element) provided to the base tape 101 fed out from the first roll 102 stores the tag sensitivity information of the following RFID circuit element To (first RFID circuit element) (to which writing of RFID tag information is being performed) (noted as "next writing condition" in the drawing). The tag sensitivity information of the first RFID circuit element To supplied is stored in the RFID circuit element TA provided to the cartridge 100 as described above.

FIGS. 25A and 25B are diagrams showing an example of the outer appearance of an RFID label T cut from the printed tag label tape 110 after RFID circuit element To information writing as described above. FIG. 25A is a top view, and FIG. 25B is a bottom view. FIG. 26 is a view showing a horizontal cross-section XXVI-XXVI' from FIG. 25 rotated by 90°.

Referring to FIGS. 25A, 25B, and 26, the RFID label T has a five-layer structure in which the cover film 103 is added to the four-layer structure shown in FIG. 22. The five layers are constituted by the cover film 103, the adhesive layer 101a, the base film 101b, the adhesive layer 101c, and the separation sheet 101d, which are laminated from the cover film 103 (upper side in FIG. 26) towards the opposite side (lower side in FIG. 7). Thereafter, the RFID circuit element To including the tag antenna 152 which is provided to the back side of the base film 101b as described above is provided in the adhesive layer 101c, and printing R (in this example, the letters "RFID") is printed to the back side of the cover film 103.

FIG. 27 is a diagram showing one example of a screen displayed on the terminal 5 or general purpose computer 6 when the tag label producing apparatus 2 as described above accesses RFID tag information (reading or writing) in the IC circuit part 151 of the RFID circuit element To.

In FIG. 27, the type of RFID label T (access frequency and tape dimensions), the printed letters R printed correspondingly to the RFID circuit element To, an access (writing or reading) ID which is the unique ID of the RFID circuit element To, an article information address stored in the information server 7, a storage destination address of the corresponding information stored in the route server 4, and so on can be displayed on the terminal 5 or the general purpose computer 6. The tag label producing apparatus 2 is operated by operating the terminal 5 or the general-purpose computer 6, the print letters R being printed on the cover film 103 and the writing ID, article information, or other information being written to the IC circuit part 151 as discussed below (or the tag information of the article information, etc., stored ahead of time in the IC circuit part 151 is read out).

At the time of the above-described writing (or reading), the correspondence between the ID of the RFID label T thus produced and the information read from (or written to) the IC circuit part 151 of the RFID label T is stored in the route server 4, and can be referred to as required.

The most significant feature of the tag label producing apparatus 2 according to the present embodiment is that the control circuit 30 writes the tag sensitivity information of the first supplied RFID circuit element To, stored in the RFID circuit element TA and thereby controls the high-frequency circuit 21, then, with respect to the RFID circuit element To supplied afterward, reads the tag sensitivity information of the next supplied RFID circuit element To stored in the IC circuit part 151 of the previously supplied RFID circuit element To, and thereby controls the high-frequency circuit 21. In this way, each RFID circuit element To can be accessed in an optimum communications mode. This is discussed in detail below, with reference to FIG. 28.

FIG. 28 is a flow chart showing a control procedure executed by the control circuit 30 when accessing each RFID circuit element To using the optimum communications mode described above. Specifically, the control circuit 21 reads the tag sensitivity information of the first supplied RFID circuit element To, stored in the RFID circuit element TA, then, as with respect to the next supplied RFID circuit element To, reads the tag sensitivity information of the next supplied RFID circuit element To, stored in the IC circuit of the previously supplied RFID circuit element To, and controls the high-frequency circuit 21 to achieve the optimum communications mode, before accessing the RFID circuit element To.

In FIG. 28, this process flow is initiated when power is supplied to the tag label producing apparatus 2 (power on detecting means).

First, in step S3005, a variable N which counts the number of times there is no response from the RFID circuit element To and a retry is performed, and a flag F expressing whether communication is good or bad are initialized to 0.

In the next step, step S3010, a determination is made as to whether or not a cartridge is loaded into the cartridge holder. Specifically, a determination is made as to whether or not a detection signal corresponding to a loaded state of the cartridge 100 is input from the sensor 20. If the cartridge 100 is loaded into the cartridge holder, the determination is satisfied, and the process moves to the next step, step S3020.

In step S3020, a control signal corresponding to locking the lid is output to the lock solenoid driving circuit 58, the latching pin 52 is inserted into the latching hole 52, and the opening/closing lid OC is locked.

In the next step, step S3030, the tag access is switched to the cartridge side, and information stored in the RFID circuit element TA, namely the tag sensitivity information of the first supplied RFID circuit element To, is read (second reading means). Specifically, a selection signal is output to the antenna switch circuit 341, switching the antenna switch circuit 341 such that the cartridge antenna 19 is connected to the transmit/receive splitter 34. The tag sensitivity information of the first supplied RFID circuit element To, stored in the memory part 157 of the RFID circuit element TA is then read.

In the next step, step S3040, tag access is switched to the tape side, and writing conditions are set according to the tag sensitivity information read in step S3030 above (transmission controlling means, smooth processing means). Specifically, a selection signal is output to the antenna switch circuit 341, and the antenna switch circuit 341 is switched such that the antenna 14 is connected to the transmit/receive splitter 34, while the "TX_PWR" signal is output to the variable transmission amplifier 39 provided to the transmitter 32 of the high-frequency circuit 21, setting the access power (output power) value in the transmitter 32 corresponding to the RFID circuit element To a value corresponding to the tag sensitivity information read in step S3030.

In the next step, step S3050, the printing information to be printed to the RFID label T by the print head 10, input via the terminal 5 or the general-purpose computer 6, is read via the communication line 3 or the input/output interface 31.

In the next step, step S3060, the RDID tag information to be written to the IC circuit part 151 of the RFID circuit element To using the antenna 14, input from the terminal 5 or the general-purpose computer 6 is read via the communication line 3 or the input/output interface 31.

In the next step, step S3070, the tape feeding is initiated, and a determination is made as to whether or not the print start position on the tape has reached the position of the print head 10. Specifically, a control signal is output to the cartridge driving circuit 24, whereupon the ribbon take-up roller 106 and feeding roller 107 are rotationally driven by the driving force of the cartridge motor 23. As a result, the base tape 101 is fed out from the first roll 102 and supplied to the tape feeding roller 107, while the cover film 103 is fed out from the second roll 104. Furthermore, a control signal is output to the feeding roller motor 28 via the feeding roller driving circuit 29 so as to rotationally drive the feeding roller 17. As a result, the base tape 101 is bonded integrally to the cover film 103 on which printing is finished by the feeding roller 107 and the sub-roller 109, and the tapes 101, 103, and 110 are driven so as to transported this as the printed tag label tape 110 out of the cartridge body 100. Whether or not the print start position on the tape has reached the position of the print head 10 is determined by, for example, detecting a marker provided to the separation sheet 101d with an optical sensor which is not shown. When the print start position on the tape has reached the position of the print head 10, the determination is satisfied and the process moves to the next step, step S3080. Note that the above is not a limitation, and that it is also possible to determine whether or not a print start command input via the terminal 5 or the general-purpose computer 6 has come in via the input/output interface 31.

In step S3080, printing is started. Specifically, a control signal is output to the print-head driving circuit 25 to power the print head 10 and print the printing R read at step S3050, such as characters, symbols, a bar code, or the like in a predetermined area of the cover film 103 (for example, an area to be bonded to the back side of one of RFID circuit elements To arranged on the base tape 101 at a predetermined pitch and at regular intervals).

In the next step, step S3090, tag sensitivity information of the next supplied RFID circuit element To, stored in the current RFID circuit element To, is read (first reading means; smooth processing means). Specifically, a "Scroll All ID" command for reading information stored in the RFID circuit element To is output to the signal processing circuit 22, a "Scroll All ID" signal is generated as the RFID tag information in the signal processing circuit 22 based on this and transmitted via the high-frequency circuit 21 to the RFID circuit element To be read, and a response is prompted.

In the next step, step S3100, the tag sensitivity information of the RFID circuit element To read next in step S3090 is stored to a storing means such as a RAM, etc., which is not shown.

In the next step, step S3110, the tag sensitivity information of the next RFID circuit element To which has been read and stored in step S3090 and step S3100 is deleted from the RFID circuit element To in which that tag sensitivity information was stored.

In the next step, step S3120, a writing process is performed in which the RFID tag information is transmitted and written to the RFID circuit element To. (See FIG. 29, described below, for further details).

In the next step, step S3130, a determination is made as to whether or not the flag F=0. In a case where the writing process has been successfully completed, the flag F remains zero (refer to step S3128 in the flow shown in FIG. 29, described below). Accordingly, the determination is satisfied, and the process moves to step S3140. On the other hand, if the writing process has not been successfully completed for some reason, the flag F is set to 1 (see step S3128 in the flow shown in FIG. 29, described below). Accordingly, the determination is not satisfied and the process moves to step S3145, and a control signal is output to the print-head driving circuit 25 to stop the power to the print head 10, which stops the printing. After explicitly displaying that the pertinent RFID circuit element To is defective due to such interrupted printing, the process moves to step S3160, described below.

In step S3140, the combination of the information written to the RFID circuit element To in step S3120 and the corresponding printing information already printed by the print head 10 is output via the input/output interface 31 and the communication line 3 via the terminal 5 or general purpose computer 6, and is stored in the information server 7 or the route server 4. Note that the stored data is stored and maintained, for example, within a database referable from the terminal 5 or the general-purpose computer 6 as required.

Subsequently, in step S3150, verification is made as to whether or not characters have been printed on areas of the cover film 103 corresponding to the RFID circuit elements To which should be processed at this time, and the process moves to step S3160.

In step S3160, the tag sensitivity information of the next RFID circuit element To stored in the RAM or other unshown storing means in step S3100 is read.

In the next step, step S3170, a determination is made as to whether or not an operation has been performed to remove the cartridge 100 from the cartridge holder. Specifically, a determination is made as to, for example, whether or not an open button for opening the opening/closing lid OC not shown has been pressed by an operator, and a corresponding operation signal has been input. If an operation to remove the cartridge 100 has been made, the determination is satisfied and the process moves to the next step, step S3180.

In step S3180, tag access is switched to the cartridge side, and a writing process is performed for writing the tag sensitivity information of the next RFID circuit element To read in step S3160 to the RFID circuit element TA provided to the cartridge housing 100A. Specifically, a selection signal is output to the antenna switch circuit 341, switching the antenna switch circuit 341 such that the cartridge antenna 19 is connected to the transmit/receive splitter 34. The tag sensitivity information of the next RFID circuit element To read in step S3160 is written to the memory part 157 of the RFID circuit element TA. The description of this writing process is omitted, as it is the same as that in step S3120 (FIG. 29 described below).

In step S3190, a control signal corresponding to unlocking the lid is output to the lock solenoid driving circuit 58, the latching pin 52 is retracted from the latching hole 52, and the opening/closing lid OC is unlocked. The process then returns to step S3005.

Note that if no operation to remove the cartridge 100 is performed in step S3170, the determination is not satisfied, and the process moves to the next step, step S3200.

In step S3200, a determination is made as to whether or not an operation is made to turn off the power. Specifically, a determination is made as to, for example, whether or not an operation is made to turn off the power switch of the tag label producing apparatus 2 by an operator. If no power off operation is made, the determination is not satisfied, and the process returns to step S3040. If a power off operation is made, however, the determination is satisfied, and the process moves to step S3210.

In step S3210, the same procedure as in step S3180 is performed. Namely, tag access is switched to the cartridge side, and a writing process is performed for writing the tag sensitivity information of the next RFID circuit element To read in step S3160 to the RFID circuit element TA provided to the cartridge housing 100A.

In the next step, step S3220, a control signal corresponding to unlocking the lid is output to the lock solenoid driving circuit 58, the latching pin 52 is retracted from the latching hole 52, and the opening/closing lid OC is unlocked. In the next step, step S3230, the power to the tag label producing apparatus is turned off, and the process flow is ended.

As described above, with the tag label producing apparatus of the present embodiment, if no operation is made to remove the cartridge 100 or turn off the power after turning on the power, step S3040 to step S3170→step S3200→step 3040 is repeated. In this manner, tag sensitivity information of the next supplied RFID circuit element To, stored in the IC circuit part 151 of the RFID circuit element To of the previously supplied RFID circuit element To is read, making it possible to write to the RFID circuit element To by controlling the high-frequency circuit 21 to employ the optimum communication mode for each RFID circuit element To.

On the other hand, if an operation is made to remove the cartridge 100 or turn the power off during tag label production, in step S3180 or step S3210 the tag sensitivity information of the next RFID circuit element To, stored in the RAM, etc., at the moment that operation is made is written to the memory part 157 of the RFID circuit element TA. As a result, when the cartridge 100 is loaded in the cartridge holder again or the power is turned on again, the tag sensitivity information of the next RFID circuit element To is read from the RFID circuit element TA in step S3030, and writing can be performed to the RFID circuit elements To supplied thereafter by controlling the high-frequency circuit 21 so as to employ the optimum communications mode for each RFID circuit element To.

Note that, while omitted from the above description, after printing is completed in step S3150, at a predetermined cutting position, the drive from the cartridge motor 23 and the feeding roller motor 28 is stopped and feeding of the printed tag label tape 110 is stopped, by outputting a control signal to the cartridge driving circuit 24 and the feeding roller driving circuit 29. Cutting of the printed tag label tape 110 by the cutter 15 is performed by driving the solenoid 26 by outputting a control signal to the solenoid driving circuit 27. As a result, the predetermined RFID tag information is written and the label-like RFID label T on which the predetermined printing is correspondingly performed is generated.

In the above, writing of the RFID tag information is written after printing begins, but this is not a limitation. It is also possible to reverse the procedure, according to the arrangement of the antenna 14 and the print head 10 in the tag label producing apparatus 2. Namely, printing may be started after initiating writing of the RFID tag information.

FIG. 29 is a flow chart illustrating in detail the procedure in step S3120.

In FIG. 29, after step S3110 described above in FIG. 28, the process moves first to step S3121, where the control circuit 30 supplies the "Program" command to the signal processing circuit 22 for writing desired data into the memory part 157. In response, the signal processing circuit 22 generates a "Program" signal which constitutes RFID tag information including ID information that the operator essentially wishes to write. The "Program" signal is transmitted to all RFID circuit elements To existing in a communicable area (in the aforementioned region X) through the transmitter 32 of the high-frequency circuit 21 and the antenna 14 to write the information into the memory portions 157 of the RFID circuit elements To.

Subsequently, at step S3122, the control circuit 30 outputs a "Verify" command to the signal processing circuit 22 to verify the contents of the memory part 157. In response, the signal processing circuit 22 generates a "Verify" signal which is transmitted to all the target RFID circuit elements To present within the communicable area through the transmitter 32 of the high-frequency circuit 21 and the antenna 14 to prompt the RFID circuit elements To return a reply.

The process then moves to step S3123, reply (response) signals are received, transmitted from all the target RFID circuit elements To present within the communicable area in response to the "Verify" signal through the antenna 14, and the control circuit 30 captures the reply signals through the receiver 33 of the high frequency circuit 21 and the signal processing circuit 22.

Next, In step S3124, a determination is made as to whether or not a valid reply signal (a signal expressing that information has been stored successfully in the memory part 157) has been received from the RFID circuit elements To in the communication area.

If the determination is satisfied, the routine is terminated, since writing to the RFID circuit elements To in the communication area of the region X was done successfully. If the determination is not satisfied, the process moves to step S3125 where 1 is added to N, and then to step S3126, where a determination is made as to whether or not N=5. In a case where N is less than or equal to four, the determination is not satisfied, and the process returns to step S405 and the same procedure is repeated. If N=5, the process moves to step S3127. In step S3127, an error display signal to the terminal 5 or general purpose computer 6 through the input/output interface 31 and communication line 3 to display a writing failed error. Next, in step S3128, the flag F is set to 1, and the procedure is terminated. In this way, even in the event of a failure in writing the RFID tag information, the apparatus for communicating with an RFID tag retries the writing procedure up to five times, thus maximally ensuring the reliability of the writing procedure.

Note that the above is a description of a case in which tag sensitivity information during writing of RFID circuit elements To is stored to the RFID circuit element TA and RFID circuit elements To, and the RFID tag information is written to the IC circuit part 151 for each RFID circuit element To after setting the optimum access power according to that tag sensitivity information. However, this is not a limitation. There are also cases in which RFID tag information is read from read-only RFID circuit elements To in which predetermined RFID tag information (tag identification information, etc.) is un-overwritably stored and held ahead of time after setting the optimum access power, printing is performed according to this, and the RFID tag labels T are thus produced.

In this case, the tag sensitivity information during reading of the RFID circuit elements To may be stored in the RFID circuit element TA and the RFID circuit elements To, making it possible to read in an optimum communications mode with respect to each RFID circuit element To. In other words, in FIG. 28 described above, acquisition of the writing information in step S3060 maybe deleted, and the setting of reading conditions, reading, deleting, and writing may be performed in steps S304, S3090, S3110, S3160, S3180, and S3210, with the writing process for RFID tag information being performed in step S3120. (See FIG. 30 discussed below for details.) In the next step, step S3140, a combination of the information to be printed and the read RFID tag information is saved.

FIG. 30 is a flow chart illustrating in detail the RFID tag information reading procedure mentioned above.

In FIG. 30, when the RFID circuit element To whose information is to be read is transported to the vicinity of the antenna 14, a "Scroll All ID" command for reading information stored in the RFID circuit element To is output to the signal processing circuit 22 in step S3221. The signal processing circuit 22 generates a "Scroll All ID" signal as RFID tag information based upon the "Scroll All ID" command, and the "Scroll All ID" signal is transmitted to the RFID circuit element To from which information is to be read (hereinafter "target RFID circuit element To") via the radio frequency circuit 21, prompting a reply.

Next, in step S3222, the reply signal (RFID tag information including ID information and the like) transmitted from the target RFID circuit element To is received in response to the "Scroll All ID" signal through the antenna 14. Then, the control circuit 30 captures the reply signal through the radio frequency circuit 21 and signal processing circuit 22.

Next, in step S3223, a determination is made as to whether or not the reply signal received in the above step S3222 is erroneous using a publicly known error detecting code (a CRC (Cyclic Redundancy Check) code or the like).

If the determination is not satisfied, the process moves to step S3224 where 1 is added to N, and then to step S3225, where a determination is made as to whether or not N=5. In a case where N is less than or equal to four, the determination is not satisfied, and the process returns to step S3221 and the same procedure is repeated. If N=5, the process moves to step S3226, where an error display signal is sent to the terminal 5 or general purpose computer 6 through the input/output interface 31 and communication line 3 to display a writing failed error. Thereafter, in step S3227, the flag F is set to 1, and the routine is terminated. With such an arrangement, a maximum of five retries are performed even if information reading fails, thereby expending all possible means to ensure readout reliability.

In a case where the decision is made that the condition is satisfied in step S3223, the reading of the RFID tag information from the target RFID circuit element To is completed, whereupon the routine is terminated.

In the above, step S3170 in the process flow shown in FIG. 28 constitutes the tag assembly loading/unloading operation detecting means described in the claims for detecting whether or not an operation has been performed to unload a tag assembly from the tag assembly loading portion. Further, step S3200 also constitutes a power shut-off operation detecting means described in the claims for detecting whether or not a shut-off operation of the power has been performed. Further, step S3035 in the process flow of FIG. 34 constitutes the cartridge identity determining means.

With the tag label producing apparatus 2 of the present embodiment described above, RFID tag labels T are produced continuously by reading or writing information through transmission and reception to and from each RFID circuit element To supplied in a predetermined order, from the cartridge 100 having the first roll 102 in which is wound the base tape 101 in which a plurality of RFID circuit elements To is suppliably arranged in a predetermined order. Information associated with tag characteristic value information (tag sensitivity information in the present embodiment) for one plurality of RFID circuit element To is stored to the IC circuit part 151 of the previous RFID circuit element To. Accordingly, when reading or writing information to or from the next RFID circuit element To, communication in a mode matching the characteristic value information (in the present embodiment, an access power value matching the tag sensitivity) can be used by using the tag characteristic information of the RFID circuit element To read from the previous RFID circuit element To ahead of time. As a result, even if variation in the tag characteristic value data occurs in each of the plurality of RFID circuit elements To during manufacture of the cartridge 100 (the first roll 102), it is possible to communicate with each RFID circuit element To in an optimum communication mode by controlling the communication mode for each RFID circuit element To when producing (manufacturing) the RFID tag labels T. This makes it possible to produce RFID tag labels T at high speed due to the fact that writing is not longer performed under inappropriate conditions, rewriting, etc., due to writing errors is no longer needed, and trial-and-error testing of conditions is no longer necessary, Thereby ensure smoother manufacture of RFID tag labels. Wasting energy and adversely affecting communication, for example, can be prevented, compared with communication using uniform tag characteristic value data for all RFID circuit elements To. Further, it is also possible to produce tag labels at a fixed feed rate compared to a case, for example, in which the feed rate of the base tape 101 is changed according the tag characteristic value data, thereby suppressing misprints by the print head 10.

Further, particularly with the present embodiment, the RFID circuit element TA is provided to the housing 100A of the cartridge 100, and information associated with the sensitivity of the RFID circuit element To supplied first from the first roll 102 is stored to the RFID circuit element TA. It is possible to communicate at an access power that matches the sensitivity of the first RFID circuit element To supplied by reading and using the sensitivity information stored in the RFID circuit element To provided to the cartridge housing 100A ahead of time, when reading or writing information with respect to the first RFID circuit element To fed out of the first roll 102. Further, it is possible to freely overwrite information by using the RFID circuit element TA as an information medium for holding information associated with the sensitivity of the first RFID circuit element To supplied. As a result, it is possible to overwrite sensitivity information in a corresponding manner even, for example, when the first roll 102 in the cartridge housing 100A is exchanged.

Further, particularly with the present embodiment, tag sensitivity stored in the memory is written to the RFID circuit element TA when an operation to remove the cartridge 100 from the cartridge holder is performed, the tag sensitivity information from the RFID circuit element TA is read when the sensor 20 detects that a cartridge has been loaded, and the access power is set using this information. As a result, even in a case, for example, in which the cartridge 100 is removed from the cartridge holder before all the RFID circuit elements To provided to the base tape 101 of the first roll 102 are used up, it is possible to communicate using an access power that matches a tag's sensitivity by writing to the RFID circuit element TA the tag sensitivity information of the RFID circuit element To supplied first the next time a cartridge 100 is loaded, and reading that tag sensitivity information stored in the RFID circuit element TA when the cartridge is loaded next.

Further, particularly with the present embodiment, tag sensitivity stored in the memory is written to the RFID circuit element TA when an operation to shut off the power to the tag label producing apparatus 2 is performed, the tag sensitivity information from the RFID circuit element TA is read when the power is turned on the to the tag label producing apparatus 2, and the access power is set using this information. As a result, even in a case, for example, the power to the tag label producing apparatus 2 is turned off before all the RFID circuit elements To provided to the base tape 101 of the first roll 102 are used up, it is possible to communicate using an access power that matches a tag's sensitivity by writing to the RFID circuit element TA the tag sensitivity information of the RFID circuit element To supplied first the next time the power is turned on, and reading that tag sensitivity information stored in the RFID circuit element TA when the power is turned on to the tag label producing apparatus 2 next.

It should be understood that the third embodiment can be modified in various fashions without departing from the spirit and technical idea of the invention other than the foregoing. The following descriptions will be given of such exemplary modifications one by one.

(3-1) Variations in the Information Media Provided to the Cartridge

With the third embodiment, the RFID circuit element TA is used as an information medium for holding the tag sensitivity information of the first RFID circuit element To be supplied, but this is not a limitation. It is also possible, for example, to use a contact-type recording device such as an IC card, a memory means such as ROM or RAM, or a recording means such as a bar code. For example, in a case using a bar code, it is possible to read a storage destination address or the like in the route server 4 and recorded in the bar code for the tag sensitivity information of the first RFID circuit element To be supplied, and then for the control circuit 30 to read the tag sensitivity information of the RFID circuit element To in question via the communication line 3 and the input/output interface 31 from the storage destination address, and then to set the transmitter 32 of the high-frequency circuit 21 so as to use the optimum communication mode corresponding to that information. This makes it possible to access using a communication mode that matches the sensitivity of the first RFID circuit element To supplied.

(3-2) Storing Tag Sensitivity Information of a First Tag and of a Next Tag in the First Tag With the third embodiment, the RFID circuit element TA is provided to the housing 100A of the cartridge 100, and tag sensitivity information of the RFID circuit element To supplied first from the first roll 102 (as an information medium) is written to the RFID circuit element TA, but this is not a limitation. Specifically, it is also possible to store the tag sensitivity information (during writing) of the first RFID circuit element To supplied to the IC circuit part 151 of that RFID circuit element To (as an information medium), as well as the tag sensitivity information of the next RFID circuit element To supplied.

FIG. 31 is a view conceptually showing stored content of the memory part 157 in the present modification, and corresponds to FIG. 24 described above. As shown in FIG. 31, with the present modification, the memory portion 147 of each RFID circuit element To provided to the base tape 101 fed out from the first roll 102 stores the tag sensitivity information (denoted as "writing conditions" in the drawing) for that RFID circuit element To, and also stores the tag sensitivity information (denoted as "next writing conditions") of the next RFID circuit element To supplied after the RFID circuit element To in question.

With the present modification, it is possible to read the tag sensitivity information during writing of the first RFID circuit element To supplied from the first roll 102 when reading the tag sensitivity information of the next RFID circuit element To supplied after the first RFID circuit element To, making it possible to write using an access power matching the tag sensitivity by using the tag sensitivity information thus read, when writing RFID tag information to the first RFID circuit element To. Further, with the present modification, there is no need to provide the RFID circuit element TA for storing the tag sensitivity information of the first RFID circuit element To supplied, or the a cartridge antenna 19 for performing communication the RFID circuit element TA, thereby making it possible to simplify the structure and reduce costs.

(3-3) Storing the Remaining Number of RFID Circuit Elements

With the third embodiment, as shown in FIG. 24 described above, the tag ID of RFID circuit element To is stored to the IC circuit part 151 of that RFID circuit element To, as well as the tag sensitivity information of the next RFID circuit element To supplied, but this is not a limitation. Specifically, for example, it is possible to store information associated with the remaining number of suppliable RFID circuit elements To of the plurality of RFID circuit elements To provided to the base tape 101 wound in the first roll 102 (hereafter referred to as "remaining number information").

FIG. 32 is a view conceptually showing stored content of the memory part 157 in the present modification, and corresponds to FIG. 24 described above. As shown in FIG. 32, in the present modification, the memory part 157 of each RFID circuit elements To provided to the base tape 101 fed out from the first roll 102 stores the tag sensitivity information of the following RFID circuit element To (noted as "next writing condition" in the drawing), and the remaining number information of the RFID circuit elements To supplied from the first roll 102 is also stored.

With the present modification, remaining amount information of the RFID circuit elements To supplied from the first roll 102 is stored to the IC circuit part 151 of each RFID circuit element To together with the tag sensitivity information of the next RFID circuit element To, as described above. Therefore, the same effect as in the third embodiment is provided, namely, achieving smoother manufacturing of RFID labels thanks to the ability to access each RFID circuit element To in an optimum communications mode. Moreover, the effect of being able to produce RFID labels T while being aware of the remaining number of RFID circuit elements To which can be supplied in the first roll 102 can be achieved.

Further, since with the present modification two items of information other than the tag ID, namely the tag sensitivity information and the remaining number information, of the next RFID circuit element To are stored to each RFID circuit element To, the amount of memory using in the memory part 157 of the IC circuit part 151 is relatively large. Accordingly, it is also possible, for example, to express the remaining number information as a logarithmic value when storing this information. This allows the number of digits in the remaining number to be compressed, thus saving memory capacity.

(3-4) Storing a Preamble (Cycle Clock) Number

Specifically, it is also possible to store to the IC circuit part 151 of each RFID circuit element To the tag sensitivity information of the RFID circuit element To be supplied next, together with information associated with the preamble (cycle clock) number (hereafter "preamble number information") sent when initiating communication with the RFID circuit element To be supplied next.

With the present modification, when manufacturing the cartridge 100 (first roll 102), even if variations arise in the tag charge constant of each of the plurality of RFID circuit elements To, it is possible to realize the optimum communications mode by controlling the preamble number for each RFID circuit element To by reading the preamble information together with the tag sensitivity information of the next RFID circuit element To from each RFID circuit element To when producing the RFID labels T. As a result, there is no need to send an unnecessary preamble compared to a case in which a uniform preamble number is communicated to all of the RFID circuit elements To, thereby making it possible to reduce the amount of time needed in producing the RFID labels T.

Moreover, the preamble number is preferably 16 cycles or more (or 8 bits if 1 bit is expressed in two cycles) per the specs, but a number in the vicinity of 6 to 9 cycles (3-4.5 bits) is sufficient as an actual value. Therefore, it is also possible to store the cycle number or bit number to each RFID circuit element To.

(3-5) Storing Tag ID Information of the Next RFID Circuit Element To

Specifically, it is also possible to store the tag sensitivity information of the RFID circuit element To be supplied next to the IC circuit part 151 of each RFID circuit element To, together with at least part of information associated with the RFID circuit element To be supplied next (hereafter "tag ID information"). Thus when producing the RFID labels T, it is possible to read or write information to only the next RFID circuit element To by using the tag ID information of the next RFID circuit element To read from the IC circuit part 151 of each RFID circuit element To and putting all RFID circuit elements To other than the next RFID circuit element To in sleep mode. As a result, it is possible to read from and write to the RFID circuit element To be reading from or written to.

(3-6) Using Part of the ID Information and the Sensitivity Information for Other Purposes Specifically, it is also possible to share at least part of the unique ID information stored in the IC circuit part 151 of each RFID circuit element To, the tag sensitivity information of the RFID circuit element To be supplied next, the preamble number information or the tag ID information, and the remaining number, and so on. Thus when producing the RFID labels T, it is possible to acquire the tag ID information for the RFID circuit element To be written to, and at the same time acquire remaining number information and information associated with the tag characteristic values of the RFID circuit element To be supplied next, and so on, obviating the need to read the various types of information separately, thus making it possible to produce the RFID labels T faster. This also provides the effects of being able to save the amount of memory in the IC circuit parts 151 of the RFID circuit elements To.

(3-7) Storing End Information to the Last RFID Circuit Element To

Specifically, it is also possible to store end information indicating that an RFID circuit element To is the last tag to the IC circuit part 151 of the RFID circuit element To to be supplied last among the plurality of RFID circuit elements To provided to the base tape 101 wound in the first roll 102. Thus when producing the RFID labels T, it is possible to be know that an RFID circuit element To is the last tag when accessing the IC circuit part 151 of the RFID circuit element To supplied last.

Moreover, in this case, since there are no more RFID circuit elements To be supplied after the RFID circuit element To which is supplied last, there is no need to store tag sensitivity information to this RFID circuit element To which is supplied last. Therefore, it is also possible to store this end information instead of the tag sensitivity information to the IC circuit part 151 of the RFID circuit element To supplied last (in other words, storing only the end information to the last RFID circuit element To). Thus, it is possible to effectively use the memory capacity of the memory part 157 of the IC circuit part 151 of the last RFID circuit element To without waste.

(3-8) Variations in the Tag Characteristic Value Information which is Stored

In the above, tag sensitivity information in the form of characteristic value information of the RFID circuit elements To is stored to the RFID circuit element TA and the RFID circuit elements To (information combining the sensitivity of the IC circuit part 151 (the minimum operating power) and the gain of the tag antenna 152), but this is not a limitation. In other words, it is also possible to store the memory writing voltage, writing time, and other access conditions of the memory part 157 of the IC circuit part 151 as the characteristic information. In this case, too, it is possible to access using a communication mode matching the RFID circuit element To by reading the access conditions information stored to the RFID circuit element TA and setting the transmitter 32 of the high-frequency circuit 21 to correspond to the memory writing voltage, writing time, and other access conditions.

Further, since the required energy varies depending on the memory capacity of the memory part 157, the writing voltage needed when writing changes depending on the memory capacity. In this sense, it is also possible to include "memory capacity" in the characteristic value information for controlling to the optimum required power, and storing this in the RFID circuit element TA and RFID circuit elements To.

Furthermore, for example in a case as shown in FIG. 33 in which a cartridge 100' (tag body; not shown) is used in which is stored a first roll 102' (tag tape roll) in which is wound a base tape 101' (tag tape) in which a plurality of the RFID circuit elements To are arranged in the tape width direction and each RFID circuit element To row is disposed in the tape lengthwise direction so as not to overlap (in other words, in a zigzag fashion), it is also possible to store information associated with the tape width direction portion of the tag antenna 152 of the RFID circuit element To supplied next, in addition to the tag sensitivity information, as the tag characteristic value information (hereafter "antenna position information").

By reading or writing information in this way by transmitting and receiving to the base tape 101' in which the RFID circuit elements To are arranged in a zigzag pattern, the distance between the apparatus antenna 14 which transmits to and receives from each RFID circuit element To and the tag antenna 152 of each RFID circuit element To arranged in a zigzag pattern on the base tape 101' varies with each RFID circuit element To in a case in which the RFID labels T are produced continuously. (See L1 and L2 in FIG. 33.)

Accordingly, with the present modification, the antenna position information of the RFID circuit element To supplied next is stored in the IC circuit part 151 of each RFID circuit element To as described above, and therefore when producing the RFID labels, it is possible to communicate in the optimum communication mode matching the distance between the antenna 14 and the tag antenna 152 of the IC circuit part 151 of each RFID circuit element To by using the tag sensitivity information and the antenna position information of the next RFID circuit element To read from the previous corresponding RFID circuit element To ahead of time, when reading or writing information from or to the next RFID circuit element To.

(3-9) Providing a Cartridge Identity Check Function

Specifically, when an operation to remove the cartridge 100 or an operation to shut off the power to the tag label producing apparatus 2 is performed, it is also possible to provide a function to check whether or not a cartridge is the same as the cartridge that was loaded when another cartridge 100 is loaded or power is turned on to the tag label producing apparatus 2.

FIG. 34 is a flow chart showing a control procedure executed by a control circuit 30' (not shown) in the present modification, and corresponds to FIG. 28 described above. Note that the same reference numerals are given to portions in FIG. 34 which are the same as in FIG. 28 described above, and description thereof is omitted.

The present process flow differs from the process flow in FIG. 28 in the addition of steps S3035 to S3037. Namely, in step s3035, a determination is made as to whether or not, when the cartridge 100 is removed and another cartridge 100 is loaded, the loaded cartridge 100 is the same as the cartridge which was unloaded. Specifically, the determination is made as to whether the tag sensitivity information read from the RFID circuit element TA of the cartridge 100 in step S3030 is the same as the tag sensitivity information stored in a storing means such as RAM, not shown, in step S3100. If they are the same, the cartridge 100 is deemed to be identical, the determination is satisfied, and the process moves to step S3040. On the other hand, if they are not the same, the process moves to step S3036, a control signal is output to the terminal 5 or the general-purpose computer 6 via the input/output interface 31, and an announcement (display, etc.) is made to the effect that the cartridges are not the same.

In the next step, step S3037, an operation is entered by an operator into the terminal 5 or the general-purpose computer 6 to continue the process, and a determination is made as to whether or not this operation signal has been input via the input/output interface 31. If it has been input, the determination is satisfied, and the process moves to step S3040, and tag labels are produced using the different cartridge. If, on the other hand, the operation signal has not been input, the determination is not satisfied, the process moves to step S3190, where the opening/closing lid OC is unlocked. This permits the operator to replace the cartridge.

With the present modification, it is possible to check the identity of the cartridge 100. Therefore, if, for example, the cartridge is replaced with a different one, or if it is replaced with a different cartridge while the power is shut off, it is possible to prevent communicating in an incorrect communication mode to the RFID circuit elements To in the different cartridge.

(3-10) Other (i) Not Using a Cartridge

FIG. 35 is a conceptual configuration view showing a construction of a tag label producing apparatus 2' in detail according to a modification in which a cartridge is not used, and corresponds to FIG. 21 according to the third embodiment. Note that the parts identical to those in FIG. 21 are denoted using the same reference numerals, and descriptions thereof will be suitably omitted. In FIG. 35, with the present modification, a housing 9 provided with a discharge port 16 is provided to an apparatus main body 8, and this housing 9 is provided with antennas 14 and 19', as in the third embodiment.

As in the third embodiment, the antenna 14 comprises a directional antenna (a patch antenna) which is directional in one direction (in front of the sheet in FIG. 35 in this example), and is disposed near the first roll 102 (tag tape roll, tag body) in the axial direction (behind the sheet in FIG. 35) in an axial direction, and is disposed so as to make communication possible with an area X near the first roll 102 from which the base tape 101 is fed out. As a result, the antenna 14 is constituted such that an RFID circuit element To which has been discharged out of the housing 9 via the discharge port 16 is outside the communication range thereof. As a result, initialization of RFID tag information of RFID circuit elements To which have exited the housing 9 from the discharge port 16 can be reliably prevents, as can further writing of different information from the antenna 14. To achieve this object, a shielding means is appropriately provided around the discharge port 16.

Unlike the third embodiment, in which the cartridge antenna 19 is disposed so as to oppose the RFID circuit element TA provided to the housing 100A of the cartridge 100, the cartridge antenna 19' in this modification is constituted by a directional antenna (patch antenna) provided with directionality in one direction (on the front side facing the page in FIG. 35 in this example), and is disposed near the axial direction (on the rear side facing the page in FIG. 35) of the reel member 102*a* of the first roll 102, and is disposed so as to be able to communication with RFID circuit element TA provided to the reel member 102*a* (for example, to one side (the front side facing the page in FIG. 35) of the reel member 102*a*).

In contrast with the cartridge 100 above, in which members provided to the cartridge 100 are provided directly to the housing 9, in this example, the feeding roller driving shaft 12 and the ribbon take-up roller driving shaft 11 are driven by a pressure roller motor 23' driven by a pressure roller driving circuit 24' corresponding to the cartridge motor 23 driven by the cartridge driving circuit 24 of the third embodiment.

With the present modification, a sensor 20' (tag body detecting means) for detecting whether or not the roll 102 has been loaded onto the loading portion (not shown) of the housing 9 is provided instead of the sensor 20 for detecting whether or not the cartridge 100 has been loaded onto the cartridge holder.

With the present modification, the control circuit 30 writes the tag sensitivity information of the first supplied RFID circuit element To via the cartridge antenna 19', stored in the RFID circuit element TA and thereby controls the high-frequency circuit 21, then, with respect to the RFID circuit element To supplied afterward, reads the tag sensitivity information of the next supplied RFID circuit element To stored in the IC circuit part 151 of the previously supplied RFID circuit element To, and thereby controls the high-frequency circuit 21. In this way, each RFID circuit element To can be accessed in an optimum communications mode, thus achieving the same effect as in the third embodiment.

On the other hand, if an operation is made to remove the first roll 102 or turn the power off during tag label production, the tag sensitivity information of the next RFID circuit element To, stored in the RAM, etc., at the moment that operation is made is written to the memory part 157 of the RFID circuit element TA. As a result, when the first roll 102 is next loaded onto the housing 9 or the power is turned on, the tag sensitivity information of the RFID circuit element To supplied first is newly read from the RFID circuit element TA, thereby making it possible to perform writing to the RFID circuit elements To by controlling the high-frequency circuit 21 so as to ensure an optimum communications mode.

In the third embodiment, with a constitution using the cartridge 100, the RFID circuit element TA was provided to the housing 100A of the cartridge 100, but this is not a limitation. It is also possible to provide the RFID circuit element TA to the reel member 102a inside the cartridge 100 as in the present modification. In this case, it is sufficient to constitute the cartridge antenna 19 in the same was as the cartridge antenna 19' according to the present modification, by a directional antenna (a patch antenna) provided with directionality in a single direction (on the front side facing the page in FIG. 21).

(ii) Using a Tray-Type Cartridge

In the third embodiment, an example of a cartridge was given using the cartridge 100 which was provided with the first roll 102 for winding the band-like base tape 101 on which a plurality of RFID circuit elements To are provided in order in the lengthwise direction, but this is not a limitation. Other aspects of a cartridge are also possible.

Specifically, for example, a cartridge 91 provided with a tray member 91A may be used, as shown in FIG. 19 described above. In this case, the RFID circuit elements To taken out of the tray member 91A are set to a position opposing the antenna 14 provided to the tag label producing apparatus 2, and are read. Further, the RFID circuit element (second RFID circuit element) TA provided to one side face of the tray 91A (the left side of the drawing in the example of FIG. 19) is arranged so as to be positioned substantially opposite the cartridge antenna 19 provided to the apparatus main body 8 when the tray member 91A is attached to the loading portion (not shown) of the apparatus main body 8 of the tag label producing apparatus 2.

With the present modification, the control circuit 30 writes the tag sensitivity information of the first supplied RFID circuit element To via the cartridge antenna 19', stored in the RFID circuit element TA and thereby controls the high-frequency circuit 21, then, with respect to the RFID circuit element To supplied afterward, reads the tag sensitivity information of the next supplied RFID circuit element To stored in the IC circuit part 151 of the previously supplied RFID circuit element To, and thereby controls the high-frequency circuit 21. In this way, each RFID circuit element To can be accessed in an optimum communications mode, thus achieving the same effect as in the third embodiment of ensuring smooth manufacturing of RFID labels.

(ii) Not Performing Bonding

No drawings are used in this description, but specifically, it is also possible to apply the present invention to a so-called non-laminated type cartridge in which printing is done onto a cover film provided to the tag tape, instead of printing onto a cover film 103 separate from the base tape 101 provided with the RFID circuit elements To, and bonding these two, as in the third embodiment. In this case, when producing the RFID labels by manufacturing the base tape roll 215 by providing a plurality of RFID circuit elements To to a thermal sensitive tape, it is also possible to print the printing on a surface of the thermal sensitive tape using a print head having a plurality of heating elements, and it is also possible to print using an ink ribbon, as in the second embodiment.

With the present modification, the same effect is achieved as in the third embodiment, namely, of being able to access each RFID circuit element To in an optimum communication mode.

(iii) The Tag Label Producing Apparatus Contains all Functions Alone

Specifically, the tag label producing apparatus 2 according to the present modification comprises some kind of storing means which functions as a database, a displaying means (display) for displaying printed letters, a tag ID, and so on as shown in FIG. 27 described above, and an operating means for an operator to input operations (a keyboard, a mouse, a touch panel, or the like). In this case, printing information, access (writing or reading) IDs of RFID circuit elements To, article information, and other corresponding information associated therewith is stored in a storing means (database) provided to the tag label producing apparatus 2.

With the present modification, the same effect can be achieved as in the third embodiment, namely, of being able to access each RFID circuit element To in an optimum communication mode.

(iv) Writing/Reading Outside the Cartridge

In the third embodiment and the modifications thereof, examples were given of performing reading/writing and printing of RFID tag information to the base tape 101 moving through the cartridge 100, etc., but this is not a limitation. It is also possible to performing reading/writing and printing of RFID tag information to the base tape 101 while moving outside the cartridge 100. Further, it is also possible to stop the base tape 101, etc., at a predetermined position (it is also possible to hold it in a predetermined feed guide for reading and writing) and thus performing the printing or reading/writing.

Without being limited to something which can be loaded onto a tag label producing apparatus body such as the cartridge 100, it is also possible to use a so-called seated or integrated type which cannot be removed from the apparatus body, and provide the first roll 102 therein. In this case, the first roll 102 constitutes the tag assembly suppliably containing continuously in a predetermined order a plurality of RFID circuit elements To provided with an IC circuit part for storing information and a tag antenna for performing transmission and reception of information.

Further, in the third embodiment and the modifications thereof, examples were described using a case in which the tag labels T are produced by cutting with a cutter 15 the printed tag label tape 110 with respect to which printing and access (reading or writing) of the RFID circuit elements To is complete, but this is not a limitation. Specifically, in a case where a label mount (a so-called die cut label) separated in advance to a predetermined size corresponding to the label is continuously disposed on the tape fed out from the roll, it is also possible for the label not to be cut using the cutter 15, but rather to peel only the label mount (a label mount containing the accessed RFID circuit element To for label production on which corresponding printing has been performed) from the tape after the tape has been discharged from the discharge port 16, thereby producing RFID labels T.

A fourth embodiment of the present invention is described with reference to FIGS. 36-44. Components identical to those in embodiments 1 to 3 are denoted using the same reference numerals, and descriptions thereof will be omitted or simplified as appropriate.

FIG. 36 is a conceptual diagram showing an overall general structure of the tag tape roll manufacturing apparatus 1 according to the present embodiment, and corresponds to FIG. 1 and FIG. 10 described above.

In FIG. 36, with the tag tape roll manufacturing apparatus 1 according to the present embodiment, a tag checker (inspecting means) 4270 is provided for inspecting tag characteristics (here, the sensitivity of the RFID circuit element To; hereafter "tag sensitivity") of the RFID circuit elements To, as with the tag checker 270 and 2270 described above, in order to make a determination as to whether or not the RFID circuit elements To provided to the RFID tags Tg attached by the tag inserter 226 are acceptable.

Further, the tag tape roll manufacturing apparatus 1 comprises a first laser (first marking means, smooth processing means; perforating means, laser processing means) 4229 for perforating holes of a predetermined shape (not shown; hereafter "identification holes") as a first identifier by a control signal from a controller 4230 in a first tape 200A and a second tape 200B, which are bonded together, upstream of the feeding rollers 219A and 219B in the tape feeding direction, a photo sensor (detecting means, smooth processing means) 4228 for inputting a detection signal corresponding to the identification holes to the controller 4230 (corresponding to the controller 230 and 2230; feed controlling means) downstream of the feeding rollers 219A and 219B in the tape feeding direction, a first loop antenna 4271 provided to the tag checker 4270 for measuring tag sensitivity through magnetic induction with the RFID circuit elements To provided to the RFID tags Tg attached by the tag inserter 226, a second loop antenna (information applying means) 4272 for measuring tag sensitivity through magnetic induction with the RFID circuit elements To of the RFID tags Tg provided to the base tape 210, and also writing tag sensitivity information, a second laser (second marking means; perforating means, laser processing means) 4282 for perforating defect-determination holes (not shown) as a second identifier by a control signal from the controller 4230 in the base tape 210 downstream of the second loop antenna 4272 in the tape feeding direction, and a plurality of neutralizing brushes provided near the feeding rollers 219A and 219B and the roller 240A (described below) for eliminating static electricity occurring on the feeding rollers 219A and 219B and on the base tape 210 from which the separator 209 has been separated. As described above, the tag sensitivity indicates a combination of the sensitivity (minimum operating power) of the IC circuit part 151 (chip) itself and the gain of the tag antenna 152.

Further, the tag tape roll manufacturing apparatus 1 further comprises two transmission circuits 4032i and 4023r for outputting a modulated wave to the first loop antenna 4271 and the second loop antenna 4272 for accessing (reading or writing) the RFID circuit elements To, two reception circuits 4033i and 4033r for demodulating a reply signal received from the RFID circuit elements To via the first loop antenna 4271 and the second loop antenna 4272 and outputting this to the controller 4230, a first laser driving circuit 4281 for driving the first laser 4229 and causing the perforation operation, and a second laser driving circuit 4283 for driving the second laser 4282 and causing the perforation operation.

The first laser 4229 comprises an irradiating portion 4229A and a light hitting portion 4229B sandwiching the feeding path of the bonded first tape 200A and the second tape 200B (horizontal in FIG. 36), and can perforate identification holes of the same shape in matching positions in the first tape 200A and the second tape 200B simultaneously by irradiating laser light from the irradiating portion 4229A separated from and opposite the surface of the top side of the tape. The laser light passes through the tape and hits the light hitting portion 4229B separated from and opposite the surface of the bottom side of the tape, without escaping outside. The timing of the perforation operation and the shape of the identification holes being perforated are controlled by a control signal input from the controller 4230 via the first laser driving circuit 4281. As regards the shape of the identification holes which are perforated, in this example a square (or for example a hexagon) is perforated only in the first RFID tag Tg attached, and ordinary circles are perforated in all the other RFID tags Tg.

The second laser 4282 is constituted as the first laser 4229 above, and perforates the defect-determination holes by irradiating laser light on a position different from the laser light irradiation position of the first laser (a position separate in the tape width direction, for example), in the same RFID tags Tg attached on the tape. Moreover, the second laser 4282 is controlled by a control signal input from the controller 4230 via the second laser driving circuit 4283.

The photo sensor 4228 comprises a light emitting portion 4228A and a light receiving portion 4228B, sandwiching the feeding path (horizontal in FIG. 36) of the first tape 200A and the second tape 200B, which are bonded. Sensor light is emitted from the light emitting portion 4228A which is separated from and opposite the top side of the tape, and when this sensor light passes through one of the identification holes moving as the tape is fed, the light receiving portion 4228B separated from and opposite the surface of the bottom side of the tape receives this sensor light. It is thus possible to detect that an identification hole has reached the detection position of the photo sensor 4228. The area of irradiation of the sensor light on the tape surface is larger than the identification holes, and therefore the light receiving portion 4228B is able to identify the shape of the sensor light (i.e., the shape of the identification hole) passing through the identification hole.

The first laser 4229 and the photo sensor 4228 are fixed in an arrangement such that a distance L between the perforation position of the first laser 4229 with respect to the surface of the tape and the irradiation position of the sensor light is the same distance as the predetermined interval at which are attached the RFID tags Tg.

As with the controllers 230 and 2230, the controller 4230 is a so-called microcomputer and while a detailed illustration is omitted, the controller 4230 has a CPU, which is a central processing unit, and memory 4276 constituted by ROM, RAM, and so on, and processes signals according to programs stored in advance in the ROM while using the temporary storage function of the RAM of the memory 4276.

Moreover, in the above constitution, the feeding rollers 219A and 219B, the tag inserter 226, the photo sensor 4228, the first laser 4229, the controller 4230, the tag checker 4270 comprising the first loop antenna 4271, the second loop antenna 4272, and the second laser 4282 constitute the tape feeding apparatus.

With the above constitution, as in the first and second embodiments, the first tape 200A is fed out from the first tape roll 211 mainly by the feeding force of the feeding rollers 219A and 219B, passes through the step roller 221, and is supplied to the bonding rollers 225A and 225B. Similarly, the second tape 200B is fed out from the second tape roll 213, passes through the step roller 223 and the roller 273, and is supplied to the bonding rollers 225A and 225B. The RFID tags Tg are sequentially attached to the second tape 200B by the tag inserter 226 upstream in the tape feeding direction of the bonding position at which the first tape 200A and the second tape 200B are bonded by the bonding rollers 225A and 225B. Thereafter, the first tape 200A and the second tape 200B to which the RFID tags Tg have been attached are bonded by the bonding rollers 225A and 225B.

Attachment of the tags is done using a so-called intermittent feeding drive method, in which the feed drive of the first tape 200A and the second tape 200B is stopped and insertion is performed once the predetermined insertion location is reached (for example, at regular intervals). (The positioning at this time is controlled according to a detection signal by the photo sensor 4228, discussed in detail below.) At this point, the RFID tag Tg (RFID circuit element To) provided to the base tape 210 is positioned near (the writing position, downstream inspecting position) of the second loop antenna 4272 when the feeding drive of the first tape 200A and the second tape 200B is stopped at the predetermined insertion position by the intermittent feeding.

The tape, thus bonded and with the tags inserted, is separated into the separator 209, made up of the separator layer 200Bd provided to the second tape 200B, and the base tape 210, made up of the remaining portions, at the rollers 240A and 240B positioned downstream of the feeding rollers 219A and 219B. The base tape 210 is taken up by the reel member 215a and cut by the cutter 227 once it has reached a predetermined length. At the same time, the separator 209 is reeled in and collected by the reel member 217a. As a result of the above, the base tape 210, on which have been formed in sequence at the predetermined regular intervals a plurality of RFID circuit elements To in the lengthwise direction, is wound around the reel member 215a, and the base tape roll 215 is thus produced. Note that, while not shown in the drawings, it is also possible to provide a half cutter for cutting only the separator layer 200Ad of the base tape 210 at an appropriate position along the tape feeding path (for example, a position separated from the cutter 227 by the distance L).

FIG. 37 is a functional block diagram showing a functional configuration associated with an access function (reading and writing) to the RFID circuit elements To, one of the functions of the tag tape roll manufacturing apparatus 1.

In FIG. 37, the tag tape roll manufacturing apparatus 1 comprises the two transmission circuits 4032*i* and 4032*r* for generating carrier signals to the two loop antennas 4271 and 4272 for accessing (reading/writing from/to) the RFID circuit elements To, and modulating the carrier waves based on the control signal input from the controller 4230, and the two reception circuits 4033*i* and 4033*r* for demodulating the reply signals received via the two loop antennas 4271 and 4727 from the RFID circuit elements To and outputting this to the controller 4230, the controller 4230 performing modulation control of the carrier waves in the transmission circuits 4032*i* and 4032*r* and processing the signals demodulated by the reception circuits 4033*i* and 4033*r*.

FIG. 38 is a circuit diagram showing a simplified circuit configuration of a connections between the transmission circuits 4032*i* and 4032*r*, the reception circuits 4033*i* and 4033*r*, and the loop antennas 4271 and 4272.

In FIG. 38, the transmission circuits 4032*i* and 4032*r* are connected to the apparatus loop antennas 4271 and 4272, and the reception circuits 4033*i* and 4033*r* are connected to a capacitor 4310 connected in series with the apparatus loop antennas 4271 and 4272.

FIG. 39 is a functional block diagram showing a functional configuration of the RFID circuit element To, and corresponds to FIG. 12 of the second embodiment. In FIG. 39, in this example the tag antenna 152 is constituted as a loop antenna 152 for performing transmission and reception of signals in a non-contact manner through magnetic induction with the tag tape roll manufacturing apparatus 1 loop antennas 271 and 272, and the IC circuit part 151 is connected to this loop antenna 152.

As described above, the IC circuit part 151 comprises a rectification part 153 for rectifying the carrier waves received via the loop antenna 152, a power source part 154 for storing the energy of the carrier waves rectified by the rectification part 153, which serves as a driving power supply, a clock extraction part 156 for extracting clock signals from the carrier waves received by the loop antenna 152 and supplying the clock signals thus extracted to a control part 155, a memory part 157 capable of storing predetermined information signals, a modem part 158 connected to the loop antenna 152, and the control part 155 for controlling the operation of the RFID circuit element To via the rectification part 153, the clock extraction part 156, the modem part 158, and so on.

The most significant feature of the present embodiment thus constituted is in the first laser 4229 perforating an identification hole in the tape being fed, the photo sensor 4228 positioned downstream thereof in the tape feeding detection and detecting this identification hole, and the controller 4230 controlling the tape feeding and the perforation operation of the first laser 4229 according to the detection results of the photo sensor 4228. A detailed description follows.

FIG. 40 is a flow chart showing a control procedure executed by the controller 4230.

In FIG. 40, in step S4101, first a determination is made as to whether or not the action of winding the base tape 210 around the reel member 215a is complete. This determination is made, for example, by determining whether or not an operator who has completed the action of winding has input an operation signal to the effect that the winding action is complete via an operation means or the like not shown in the drawing. The determination is met if the winding action is complete, and the process moves to the next step, step S4102.

In step S4102, an identification variable j expressing the number (in order) of the RFID tags Tg attached by the tag inserter 226 is set to 1, and flags F0, F1, and F2 (described below) are reset to 0.

In the next step, step S4103, tape drive is initiated according to an operation signal to the effect of initiating production of base tape, input via an operation means, etc., not shown in the drawing. In other words, a control signal is output to the feeding roller driving circuit 235, and the first tape 200A and the second tape 200B are driven and fed out from the first tape roll 211 and the second tape roll 213 by the driving power of the feeding roller shaft driving motor 220. At the same time, a control signal is output to the first and second tape driving circuits 231 and 232 and the base tape driving circuit 233, and the separator driving circuit 234, and the first and second tape shaft driving motors 212 and 214, and the base tape shaft driving motor 216, and the separator shaft driving motor 218 are also driven. The first tape 200A is thus fed out from the first tape roll 211 and the second tape 200B is fed out from the second tape roll 213, these two are bonded and made into a single unit by the bonding rollers 225A and 225B, and are then fed towards the feeding rollers 219A and 219B.

While not explicitly stated in this process, when initiating the tape drive in step S4103, the motor speed of the first and second tape shaft driving motors 212 and 214, the base tape shaft driving motor 216, and the separator shaft driving motor 218 is controlled, and at the same time tension control (hereafter also referred to as "tape tension control during driving" as appropriate) is also performed so as to achieve an appropriate value for the tension of the tapes 200A, 200B, 209, and 210 during tape feeding, calculated based on the angles of the tension arms 267A-D as detected by the angle sensors 268A-D as the tension arms 267A-D are rotated by the air cylinders 262A-D. Note that the tape tension control during driving is always performed when driving tapes.

In the next step, step S4104, a determination is made as to whether or not the base tape 210, which is being reeled into the reel member 215a has reached a predetermined end position. Specifically, determination is made as to whether or not the number of RFID tags Tg attached to the base tape 210 has reached a predetermined number. For example, a determination is made as to whether or not 40 RFID tags Tg have been attached. Since this determination is not ordinarily satisfied immediately after initiating winding, the process moves to the next step, step S4105.

In step S4105, a determination is made as to whether or not the sensor light of the photo sensor 4228 has passed through an identification hole perforated in a predetermined place of the bonded first tape 200A and second tape 200B and detected by the light receiving portion 4228B. This is the determination as to whether or not the tape being fed has reached the predetermined position at which an RFID tag Tg is to be inserted. Step S4105 is repeated until the determination is satisfied, and once the determination is satisfied, the process moves to step S4106.

In step S4106, another control signal is output to the feeding roller driving circuit 235, and the driving of first tape 200A and the second tape 200B from the first tape roll 211 and the second tape roll 213 is stopped by stopping the driving of the feeding roller shaft driving motor 220. Note that at this time, the driving of the first and second tape shaft driving motors 212 and 214, the base tape shaft driving motor 216 and the separator shaft driving motor 218 is automatically stopped by the tape tension control during driving described above.

While not explicitly described in this process, when stopping the tape drive in step S4106, tension control is performed such that the sum of the tensions of the first tape 200A and the second tape 200B on the supply side is approximately equal to the sum of the tensions of the base tape 210 and the separator 209 on the reeling-in side, so that position drift of the tape does not occur when the tape drive is stopped in this way (hereafter referred to as "tape tension control during stoppage" as appropriate).

In the next step, step S4107, a determination is made as to whether or not the flag F1, which indicates whether or not the RFID tag Tg (RFID circuit element To) has reached the writing position (the downstream inspecting position) by the second loop antenna 4272 due to tape feed, is 0, indicating that it has not reached that position. Specifically, whether or not the RFID tag Tg has reached the writing position (the downstream inspecting position) is determined by whether or not a number j of the RFID tag Tg attached by the tag inserter 226 has reached N1 (see step S4113 discussed below). Note that when RFID tags Tg are attached at the predetermined intervals by the tag inserter 226, N1 is the number of RFID tags Tg disposed on the base tape 210 (the second tape 200B) from the attachment position of the RFID tags Tg by the tag inserter 226 until the writing position by the second loop antenna 4272, and is set to, for example, around 10. When the number j of the RFID tag Tg attached by the tag inserter 226 reaches N1, the RFID tag Tg (RFID circuit element To) reaches the writing position (the downstream inspecting position) by the second loop antenna 4272 for the first time. If the flag F1 is 0, the RFID tag Tg is deemed not to have reached the writing position (the downstream inspecting position), the determination is satisfied, and the process moves to step S4200.

In step S4200, the tag checker 4270 sorts RFID tags Tg with acceptable tag sensitivity (=tag sorting process; see the process flow in FIG. 41 described below).

Next the process moves to step S4108, with the tape drive stopped at the predetermined tag insertion location as described above, a control signal is output to the tag inserter 226, and the RFID tag Tg provided with the RFID circuit element To determined to be acceptable (the j-th RFID tag Tg) is attached to the second tape 200B. At this point it is also possible for a display to be performed for an operator to confirm whether or not to insert the RFID tag Tg instead of automatically inserting it if the tag is appropriate as described above, and then insert the RFID tag Tg only if an appropriate instruction is input by the operator.

In the next step, step S4109, 1 is added to the identifier j expressing the number (in order) of the RFID tag attached by the tag inserter 226, and the process moves to step S4300.

In step S4300, the first laser 4229 perforates (marks) an identification hole in the tape (=pitch marking process; see the process flow in FIG. 42 described below). Note that in the pitch marking process, an identification hole is perforated with a different shape (round or square) depending on the content of the flag F0 for determining whether or not the RFID tag Tg positioned near the first laser 4229 is the first RFID tag Tg in the manufacturing process of one base tape roll 215 (i.e., whether or not it is the RFID tag Tg fed out last when using it as the final product).

Thereafter, the process moves to step S4110, and, as in step S4103, a control signal is output to the feeding roller driving circuit 235, and the feed drive of the first tape 200A and second tape 200B is restarted by the driving force of the feeding roller shaft driving motor 220. Note that in this case, too, the tape tension control during driving is performed for adjusting the tension of the tapes 200A, 200B, 209, and 210 during tape feeding, as in step S4103.

Next, in step S4111, a determination is made as to whether the identification variable j expressing the number (in order) of the RFID tag attached by the tag inserter 226 is N0 or more. Note that when RFID tags Tg are attached at the predetermined intervals by the tag inserter 226, N0 is the number of RFID tags Tg disposed on the base tape 210 (the second tape 200B) from the attachment position of the RFID tags Tg by the tag inserter 226 until position at which the identification holes are perforated near the first laser 4229 (and is around 1 or 2). When the number j of the RFID tag Tg attached by the tag inserter 226 reaches N0, the RFID tag Tg reaches the vicinity of the first laser 4229 and the position at which identification holes are perforated corresponding thereto for the first time.

If the identification variable j is less than N0, the RFID tag Tg in the base tape 210 is deemed to have not reached the position near the first laser 4229, the determination is not satisfied, and the process returns to step S4104. On the other hand, if the identifier j expressing the number (in order) of the RFID tag attached by the tag inserter 226 reaches N1 by repeating step S4104 to step S4111, the RFID tag Tg (RFID circuit element To) in the base tape 210 is deemed to have reached the vicinity of the first laser 4229, the determination is satisfied, and the process moves to the next step, step S4112.

In step S4112, the flag F0 indicating whether or not the RFID tag Tg has reached the position near the first laser 4229 is set to 1, indicating that it has reached the position.

In the next step, step S4113, a determination is made as to whether the identification variable j expressing the number (in order) of the RFID tag attached by the tag inserter 226 is N1 or more. If the identification variable j is less than N1, the RFID tag Tg (RFID circuit element To) in the base tape 210 is deemed as not having reached the reading position (downstream inspecting position) by the second loop antenna 4272, the determination is not satisfied, and the process returns to step S4104. On the other hand, if the identification number j expressing the number (in order) of the RFID tag attached by the tag inserter 226 reaches N1 by repeating step S4104 to step S4113, the RFID tag Tg (RFID circuit element To) in the base tape 210 is deemed to have reached the reading position (downstream inspecting position) of the second loop antenna 4272, the determination is satisfied, and the process moves to the next step, step S4114.

In step S4114, the flag F1 indicating whether or not the RFID tag Tg (RFID circuit element To) has reached the reading position (downstream inspecting position) by the second loop antenna 4272 is set to 1, indicating that it has reached the position.

Next, in step S4115, a determination is made as to whether the identification variable j expressing the number (in order) of the RFID tag attached by the tag inserter 226 is N2 or more. N2 is the total number of RFID tags Tg attached to the base tape 210 manufactured from the first tape 200A and the second tape 200B fed out from one reel of the first tape roll 211 and the second tape roll 213 in the tag tape roll manufacturing apparatus 1, and when the identification variable j reaches N2, attachment of tags by the tag inserter 226 is finished. If the identification variable j is less than N2, the determination is not satisfied and the process returns to step S4104. On the other hand, if by repeating step S4104 to step S4115 the identification variable j reaches N2, tag attachment by the tag inserter 226 is deemed to have finished, the determination is satisfied, and the process moves to the next step, step S4116.

In step S4116, the flag F2 indicating whether or not tag attachment by the tag inserter 226 is finished is set to 1, indicating that it has finished, and the process returns to step S4104.

When step S4104 to step S4113 are repeated and the identification variable j expressing the number (in order) of the RFID tag attached by the tag inserter 226 reaches N1, the flag F1 is set to 1 in step S4114 as described above, and the process returns to step S4104. The determination in step S4107 is thereby no longer satisfied, and the process moves to the next step, step S4400.

In step S4400, the final inspection of the tag sensitivity of the RFID tags Tg is performed using the second loop antenna 4272. Tag information is stored to RFID tags Tg determined to be acceptable, while a defect-determination hole is perforated in the corresponding position in the tape for RFID tags Tg determined to be unacceptable (=tag inspection and storing process; see the process flow in FIG. 43 described below). Note that with this tag inspection and storing process, if the tag RFID tag Tg in a reading position (downstream detecting position) of the second loop antenna 4272 is the RFID tag Tg attached first to a base tape roll 215 (i.e., if it is the last RFID tag Tg fed out), it is also possible to add end information in particular to the RFID tag Tg.

In step S4117, a determination is made as to whether or not the flag F2 indicating whether or not tag attachment by the tag inserter 226 is finished is set to 1. If the flag F2 is 0, tag attachment is not finished, and therefore the determination is not satisfied, and the process returns to step S4200. If the flag F2 is 1, tag attachment has finished, and therefore the determination is satisfied, and the process returns to step S4300.

If while step S4104 to step S4107→step S4400 to step S4117→step S4200 to step S4115, etc. is being repeated the number of RFID tags Tg attached in the base tape roll 215 wound onto the reel member 215a reaches the predetermined number, the determination in step S4104 is satisfied, and the process moves to the next step, step S4118.

In step S4118, as in step S4106, another control signal is output to the feeding roller driving circuit 235, and the feed drive of first tape 200A and the second tape 200B from the first tape roll 211 and the second tape roll 213 is stopped by stopping the driving of the feeding roller shaft driving motor 220. Note that at this time, as in the case of step S4106, tension control during stoppage is performed such that the sum of the tensions of the first tape 200A and the second tape 200B on the supply side are approximately equal to the sum of the tensions of the base tape 210 and the separator 209 when the tape drive is stopped.

In the next step, step S4119, a control signal is output to the solenoid driving circuit 237, the solenoid 236 is driven, and the base tape 210 is cut (divided) by the cutter 227. This completes the base tape roll 215 made by winding the base tape 210 of the predetermined length.

FIG. 41 is a flowchart which shows the detailed procedure of the step S4200 of FIG. 40.

In FIG. 41, in step S4201, first the tag checker 4270 measures the tag sensitivity of during reading and writing of the RFID circuit element To provided to the RFID tag Tg attached by the tag inserter 226. The measurement of the tag sensitivity of the RFID circuit element To is done as follows. Specifically, the access power (output power) value with respect to the RFID circuit element To is increased in steps as described below, through the transmission circuit $4032i$ on the tag checker 4270 side, and at the same time the "Scroll ID" signal is transmitted to the RFID circuit element To be read by the first loop antenna 4271, and a reply is prompted. As a result, the tag sensitivity is calculated based on the access power at the time when there is a reply from the RFID circuit element To via the first loop antenna 4271 and the reception circuit $4033i$ on the tag checker 4270 side. The tag sensitivity during reading is calculated in this way.

Next, tag sensitivity during writing is measured. As described above, the access power (output power) value with respect to the RFID circuit element To is increased in steps as described below, through the transmission circuit $4032i$ on the tag checker 4270 side, and at the same time the "Program" signal is transmitted via the first loop antenna 4271, the "Verify" signal for verifying the written content is also transmitted, and a reply is prompted. The tag sensitivity is calculated from the access power used when a reply is received from the RFID circuit element To in response to the "Verify" signal. The tag sensitivity during writing is calculated in this way.

In the next step, step S4202, a determination is made as to whether or not the tag sensitivity calculated in step S4201 is within a predetermined acceptable range. If the tag sensitivity is not within an acceptable range, the determination is not satisfied and the process moves to step S4203. A control signal is output to the tag inserter 226, causing it to prepare to attach the RFID tag Tg following the RFID tag Tg which was provided with the RFID circuit element To which was determined as not being suitable. The process then returns to step S4201 and measures tag sensitivity again. As for the RFID tag Tg which was determined as being not suitable, it may, for example, be ejected out of the tag inserter 226 automatically (or by an operation of an operator), and thus not attached to the second tape 200B. If the tag sensitivity is within a predetermined acceptable range, the determination is satisfied, and the process is terminated.

FIG. 42 is a flowchart which shows in detail the pitch marking process of step S4300 in FIG. 40.

In FIG. 42, first in step S4302, a determination is made at whether or not the first RFID tag Tg attached to the tape has reached the position near the first laser 4229 through feeding of the tape, or in other words, whether or not the flag F0 is 1. During the first operations of the process of manufacturing a base tape roll (for example, when only one RFID tag Tg is attached to the tape), F0 is 0, and therefore the determination is not satisfied, and the process moves to step S4303, where a square (in this example) identification hole is perforated with the first laser 4229. Perforation of this square hole is done by the controller 4230 outputting a control signal to the first laser driving circuit 4281 to perforate a square hole, and the first laser driving circuit 4281, which has received this signal, driving the irradiating portion 4229A of the first laser 4229 to irradiate laser light in a square shape on. The square shape indicates that an RFID tag Tg is the RFID tag Tg fed out last when using a single base tape roll 215 as a product. This process terminates here.

At the same time, if the first RFID tag Tg attached has reached the position near the first laser 4229 through tape feeding, or in other words, if the identification variable j is N0 or greater and F0=1 due to the above step, the determination is satisfied, the process moves to step S4304, and a round identification hole is perforated in the first laser 4229. Perforating round identification holes is done as in step S4303, by the controller 4230 outputting a control signal to the first laser driving circuit 4281 to perforate a round identification hole. This round identification hole has a shape which indicates that the RFID tag Tg is an RFID tag Tg other than that fed out last. This process terminates here.

FIG. 43 is a flowchart which shows in detail the tag inspection and storing process in step S4400 of FIG. 40.

In FIG. 43, in step S4401, first the second loop antenna 4272 measures the tag sensitivity during reading and writing of the RFID circuit element To provided to the RFID tag Tg wound directly before in the base tape roll 251. The measurement of the tag sensitivity of the RFID circuit element To is done by the second loop antenna 4272 using the same method as the measurement done in step S4201 (FIG. 41) of the tag sorting process).

In the next step, step S4402, a determination is made as to whether or not the tag sensitivity measured in step S4401 is within a predetermined acceptable range. If the tag sensitivity is within the acceptable range, the determination is satisfied, and the process moves to step S4403, where tag information such as the tag ID is written to the RFID circuit element To provided to the RFID tag Tg by the second loop antenna 4272. Specifically, the tag information such as the tag ID is written by transmitting the "Program" signal from the second loop antenna 4272, at the appropriate access power value corresponding to the measured tag sensitivity, to the transmission circuit 4032*i* of the second loop antenna 4272. At this point, it is also possible to transmit the "Verify" signal for verifying the content to be written using the same access power value, and prompt a reply, to verify whether or not the writing was successful. This process then terminates here.

ON the other hand, if the tag sensitivity is not within the predetermined acceptable range, the determination is not satisfied, and the process moves to step S4404, where a defect-determination hole is perforated by the second laser 4282. The perforation of the defect-determination hole is done by the controller 4230 outputting a control signal to the second laser driving circuit 4283 to perforate a defect-determination hole, and the second laser driving circuit 4283, having receiving this, driving the irradiating portion 4282A of the second laser 4282 to irradiate laser light (preferably, in a shape distinguishable from the perforation shape of the first laser). This process terminates here.

The defect-determination hole is an identification hole indicating that the tag sensitivity of the RFID tag Tg fed out is not acceptable when using the base tape roll 215 as a product.

Note that while not explicitly discussed above, ordinarily when first initiating the manufacturing process of the base tape roll 215, there exists a margin portion from the position at which an RFID tag Tg is attached by the tag inserter 226 up to the winding position of the base tape 210 by the reel member 215*a* in which no RFID tags Tg are attached (for example, a length equal to around ten attached RFID tags Tg). This margin portion is cut off by being cut by the cutter 227 when the position at which the margin portion ends (a position slightly downstream in the tape feeding direction from the position at which the first RFID tag Tg is attached) reaches the cutter 227. Thereafter, when the base tape 210 from which the margin portion has been cut off is wound onto the reel member 215*a*, the determination in step S4101 is satisfied and the manufacturing of the base tape roll 215 using the procedure beginning in step S4102 is initiated.

Thereafter, until the RFID tag Tg attached by the tag inserter 226 reaches the position near the first laser 4229 through the tape feed, step S4104 to step S4111 is repeated. During this, since the flag F0 remains 0 (i.e., unchanged from being reset in step S4102), a square identification hole indicating the last feed-out is perforated in the tape during the pitch marking process (see FIG. 42 above) in step S4300. When the first RFID tag Tg reaches the position near the first laser 4229, the flag F0 becomes 1 in step S4112, and therefore an ordinary round identification hole is perforated in the pitch marking process of step S4300. Step 4104 to step S4113 is repeated thereafter.

Further, when the first RFID tag Tg reaches the writing position (downstream inspecting position) by the second loop antenna 4272 through the tape feed, the flag F1 becomes 1 in step S4114, and therefore step S4104 to step S4107→step S4400 to step S4117→step S4200 to step S4115 is repeated. As a result, while the RFID tags Tg are being attached by the tag inserter 226, the tag sensitivity of the RFID tag Tg (RFID circuit element To) immediately preceding being taken up by the reel member 215*a* is measured by the second loop antenna 4272, the tag information such as the tag ID is stored in the RFID tag Tg if the tag sensitivity is acceptable, and if the tag sensitivity is not acceptable, the defect-determination hole is perforated in the predetermined position in the tape corresponding to that RFID tag Tg. In this way, the generated baste tape 210 is taken up by the reel member 215*a*.

While repeating S4104 to step S4107→step S4400 to step S4117→step S4200 to step S4115, the base tape 210 of a predetermined length is wound onto the reel member 215*a*, thereby satisfying the determination in step S4104, causing the base tape to be cut in step S4119, and thus completing one reel of the base tape roll 215. Once the winding of the base tape 210 thus cut onto the reel member 215*a* is completed by an operator, the determination in step S4101 is satisfied, and once again S4104 to step S4107→step S4400 to step S4117→step S4200 to step S4115 is repeated, the tag sensitivity of the RFID tags Tg is measured by the loop antenna 4272, and storing of tag information or perforation of defect-determination holes is performed depending on the acceptability of the tag sensitivity, while the RFID tags Tg are attached by the tag inserter 226, and the base tape 210 is wound onto the reel member 215*a*.

By repeating the above, a plurality of base tape rolls 215 is manufactured. If while S4104 to step S4107→step S4400 to step S4117→step S4200 to step S4115 is being repeated, attachment of the RFID tags Tg by the tag inserter 226 is completed, the flag F2 is set to 1 in step S4116, and therefore step S4104 to step S4107→step S4400 to step S4117→step S4300 to step S4116 is repeated. In this way, even after attachment of tags is finished, the base tape 210 of a predetermined length is taken up by the reel member 215*a* while performing measurement of tag sensitivity of the RFID tags Tg by the second loop antenna 4272, and a selection process for selecting either storing tag information of perforating defect-determination holes is made according to a determination of the acceptability of the tag sensitivity. In step S119 the base tape 210 is cut, and the final base tape roll 215 is complete.

Note that, as shown in FIG. 14 of the second embodiment, when measuring the tag sensitivity during reading in step S4201, the output of the "Scroll ID" is increased in steps. When performing measurement of tag sensitivity during reading in step S201, the output of the "Program" signal and the "Verify" signal is increased in steps, as shown in FIG. 15 of the second embodiment.

In the above, the pitch marking process shown in FIG. 42 (step S4300 in FIG. 40) functions as the first step for perforating identification holes with the first laser 4229 while feeding of the tape is stopped. Further, step S4110 in FIG. 40 functions as the second step for restarting the feeding of the tape after perforation of the identification hole. Further, step S4105 and step S4106 in FIG. 40 function as the third step for stopping the feeding of the tape when the photo sensor 4228 detects an identification hole after restarting of the feeding of the tape. Further, step S4108 in FIG. 40 functions as the fourth step for attaching the RFID circuit element To the tape when the feeding of the tape is stopped in step S4105 and step S4106. Further, step S4401 and step S4402 in the tag sorting process shown in FIG. 41 (step S4200 in FIG. 40) and the tag inspecting and storing process shown in FIG. 43 (step S4400 in FIG. 40) function as the fifth step for inspecting characteristics of the RFID circuit element To when the feeding of the tape is stopped in step S4105 and step S4106 in FIG. 40.

As described above, in the present embodiment, the photo sensor 4228 is provided downstream of the first laser 4229 in the feeding direction, and the controller 4230 controls the feeding rollers 219A and 219B according to the detection results of the photo sensor 4228. Specifically, the controller 4230 stops the feeding of the feeding rollers 219A and 219B and performs perforation of an identification hole using the first laser 4229 in the pitch marking process in FIG. 42, restarts feeding of the feeding rollers 219A and 219B in step S4110 in FIG. 40, stops feeding again if the photo sensor 4228 detects an identification hole in step S4105 and step S4106 in FIG. 40, and then attaches RFID tags Tg to the tape by the tag inserter 226 in step S4108 in FIG. 40, thereafter repeating this process.

This involves controlling feeding and stopping based on the actual amount the tape has traveled, and not based on the number of rotations of the feeding rollers 219A and 219B. By doing this, the tape can always be fed and stopped a predetermined fixed dimension (the distance L in the feeding direction from the first laser 4229 to the photo sensor 4228) of the tape, even if, for example, slippage between the feeding rollers 219A and 219B occurs. As a result, it is possible to easily perforate identification holes at constant intervals with ease, without using high-precision control, etc., of the feeding rollers 219A and 219B. It is thereby possible to ensure smooth manufacturing of the base tape 215.

Further, particularly with the present embodiment, it is possible to form identifications holes mechanically in a reliable fashion, by perforating the identification holes with the first laser 4229, making it possible to easily detect the identification holes using an optical method on the photo sensor 4228 side. Note that it is also possible for the first laser 4229 to perform colored marking on the tape surface using printing, ink jets, a stamp, etc., aside from perforating identification holes, and for the photo sensor 4228 to detect these colored markings optically. The same can be said for the second laser 4282.

Further, particularly with the present embodiment, with the pitch marking process of step S4300, when forming a plurality of identification holes in the tape at constant intervals, the RFID tag Tg to be fed out last when using the base tape roll 215 is perforated with an identification hole different in shape from other identification holes (square in this example). As a result, in a case in which a cartridge provided with this base tape roll 215 is envisioned as being used, loaded onto the tag label producing apparatus, it is possible to use the final detection of the base tape roll 215 when feeding out using this tag label producing apparatus.

Further, particularly with the present embodiment, the first laser 4229 perforates substantially round holes for identification holes indicating non-specific sites, and perforates substantially square holes (or hexagonal holes) for identifications holes indicating the specific sites. This makes it possible, for example, to perform detection at ordinary regular intervals using the substantially round holes through the feeding-out operation during use of the tag label producing apparatus, and also to detect the end of the base tape roll 215 through detection of the substantially square identification hole. By have a rectilinear place in a substantially square shape, it is possible to obtain a steep signal during optical detection, which therefore makes achieving relatively high precision more easy. Since such a steep signal cannot be obtained when detecting substantially round identification holes, it is possible to clearly identify the type of identification hole.

Note that in the pitch marking process, the types of shapes of the identification holes perforated in the tape by the first laser 4229 were round and square, but this is not a limitation in the present invention. It is also possible to apply a combination of other shapes which can be recognized by the photo sensor 4228. It is also possible to recognize the type of the identification hole by using different light reception amounts for the sensor light in the light receiving portion 4228B of the photo sensor 4228 using differences in the size of the identifications holes, and not just differences in the shape. In this case, the ability to constitute the light receiving portion 4228B of the photo sensor 4228 by a simple received light amount sensor is an advantage.

Further, particularly with the present embodiment, comprising the tag checker 4270 for inspecting characteristics of the RFID tags Tg and the second loop antenna 4272 makes it possible to inspect the integrity of the RFID tags Tg attached for manufacturing the base tape roll 215. In particular, with the second loop antenna 4272, it is possible to reliably make detections in RFID tags Tg embedded in the tape even in cases where the characteristics change during feeding after embedding (e.g., deterioration, breakage, and so on due to effects of shaking or outside pressure during feeding).

Further, particularly with the present embodiment, the controller 4230 controls the second laser 4282 so as to perforate defect-determination holes in predetermined locations of the tape corresponding to RFID tags Tg with unacceptable tag sensitivity based on the detection results of the tag checker 4270 and the second loop antenna 4272, in the tag sorting process and tag inspection and storing process of steps S4200 and S4400. As a result, defective tags can be recognized by detecting the defect-determination holes using the photo sensor provided to the tag label producing apparatus when, for example, the base tape roll 215 is stored in the cartridge as a finished product, this is loaded onto the tag label producing apparatus, and the tape is fed out. In other words, it is possible to stop feeding at a predetermined position and perform predetermined processes, distinguishing RFID tags Tg whose integrity has been established from RFID tags Tg whose integrity, such as tag sensitivity, has deteriorated.

Further, particularly with the present embodiment, the base tape 210 being fed by the feeding rollers 219A and 219B comprises the tape base layer 200Ab for attachment of the RFID tags Tg, the adhesive layer 200Ac for being bonded to the tape base layer 200Ab, and the separator layer 200Ad for covering the bonded side of the adhesive layer 200Ac, thereby making attachment easy, by the user separating the separator layer 200Ad of the RFID label and exposing the adhesive layer 200Ac when producing the RFID labels by cutting the base tape 210 manufactured with the RFID tags Tg inside.

Further, particularly with the present embodiment, the second loop antenna 4272 for storing tag ID and other tag information to the RFID tags Tg for the plurality of RFID tags Tg provided to the base tape 210, and the tag inspection and storing process of step S4400 is performed for storing this information to the RFID tags Tg via the second loop antenna 4272. As a result, when a cartridge (not shown) provided with the manufactured base tape roll 215 is loaded onto and used with the tag label producing apparatus, it is possible to perform smooth access to the RFID tags Tg through wireless communication by acquiring the tag ID of each RFID tag Tg. Note that it is also possible for the tag information stored to the RFID tags Tg by the second loop antenna 4272 to be information other than the tag ID described above, such as the remaining number of RFID tags Tg when using the base tape roll 216 (in other words, the number of RFID tags Tg whose tag sensitivity was determined acceptable before and to which a tag ID was stored in the process of manufacturing the base tape roll 215). Further, it is also possible to print the remaining number information, etc., using an appropriate printing means, etc., to a corresponding position on the tape surface. In these cases, it is possible to announce the number of remaining and number of used RFID tags Tg to an operator of the apparatus when using the base tape roll 215 with the tag label producing apparatus.

Note that various modifications may be made according to the fourth embodiment without departing from the spirit and technical scope of the invention, in addition to the above-described embodiment. Description will be made below regarding such modifications. Namely, in the fourth embodiment, the tape intermittent feeding amount, or in other words the RFID tag Tg attachment interval was fixed to a constant, by fixing the distance L between the first laser 4229 for perforating the identification holes and the photo sensor 4228 for detecting the identification holes, but this is not a limitation in the present invention. It is also possible to make the arrangement of at least one of the first laser 4229 and the photo sensor 4228 variable along the tape feeding direction, thus making it possible to variably set the RFID tag Tg attachment interval by making it possible to vary the distance L.

FIG. 44 is a conceptual diagram showing an overall general structure of the tag tape roll manufacturing apparatus 1 comprising the tape feeding apparatus of the present modification, and corresponds to FIG. 36 of the above embodiment. Note that to avoid complicating the drawing, the air cylinder 262A has been omitted from the drawing. In FIG. 44, the difference with the structure shown in FIG. 36 is that a laser moving portion 4060 is comprised for moving the first laser 4229 along the tape feeding direction.

The laser moving portion 4060 comprises the gear decelerator 4061 constituted by meshing a plurality of gear teeth internally, a feed screw 4062 for linking to the output shaft of the gear decelerator 4061, a slider 4063 for screwing onto the feed screw 4062, a laser moving motor (driving means) for rotating the feeding screw, and the laser moving circuit 4065 (arrangement adjusting means) for controlling the laser moving motor 4064.

An input shaft of the gear decelerator 4061 links to and rotationally drives the laser moving motor 4064, decelerates the rotation thereof, and thereby rotationally drives the feeding screw 4062 which is linked to the output shaft. The feeding screw 4062 is disposed parallel to the tape feeding direction, and the slider 4063 is slidingly supported parallel to the feeding drive using a separate supporting means which is not shown in the drawings. As the feeding screw 4062 rotates, the slider 4063 can move along a lengthwise direction of the feeding screw 4062 (=parallel to the feeding direction described above) in a direction which corresponds to the rotation direction thereof (forward rotation direction or backward rotation direction).

The first laser 4229 maintains its attitude to be able to perforate the identification holes in the tape while being fixed to the slider 4063, and thereby the first laser 4229 can move along the tape feeding direction in a moving direction and by a moving amount corresponding to the rotation direction and rotation amount of the laser moving motor 4064 controlled by the laser moving circuit 4065. By an operator setting a position corresponding to the tape feeding direction of the first laser 4229 to the controller 4230 via an unshown operation means before performing a manufacturing operation of the tag tape roll manufacturing apparatus 1, it is possible to set and fix the distance L between the first laser 4229 and the photo sensor 4228 to a range within which operation is possible.

With the present modification, it is possible to attach the RFID tags Tg easily at a plurality of intervals with one tag tape roll manufacturing apparatus 1, since it is possible to set the distance L between the first laser 4229 and the photo sensor 4228 variably, as described above. Note that aside from moving the position of the first laser 4229, it is also possible to variably set the distance L by moving the position of the photo sensor 4228, or both. It is also possible to provide control so as to perform the moving setting automatically, based on some kind of external information, and not being limited to the manual setting method described above. It is also possible for an operator not to use any driving means at all, but rather to rotate the feeding screw 4062 manually, or to grip the slider 4063 and move it manually, instead of having the operator perform the following sequence with an operation means: operation→controller 4230→laser moving circuit 4065→laser moving motor 4064.

Further, in the fourth embodiment and in the modification thereof, the tape is stopped after it has been fed a predetermined fixed dimension (the distance L in the feeding direction from the first laser 4229 to the photo sensor 4228) on the tape and the RFID tags Tg are attached (the so-called intermittent feeding method), but this is not a limitation, and further extension is possible. Namely, it is also possible to continuously feed the tape at a constant speed using the feeding rollers 219A and 219B without stopping the feeding, and move a tag attaching means and a first marking means at the matching (substantially synchronized) constant speed (for example, disposing many tag attaching means and first marking means around the outer circumference of a cylindrical or disc-like rotating member and making the rotational velocity of the rotation of the rotating member substantially match the tape feeding speed at the constant speed). In this case, there is no need for stopping, and therefore it is possible to produce the base tape roll 215 at high speed and with high efficiency.

It should be noted that the "Scroll ID" signal, the "Verify" signal, the "Program" signal and the like used in the foregoing description conform to the specifications laid down by EPC global. EPC global is a nonprofit corporation co-established by EAN (European Article Number) International, which is an international distribution code organization, and the Uniform Code Council (UCC), which is an American distribution code organization. Note that any signals compliant with other standards can be employed as long as the signals provide the same functions.

Additionally, other than those previously described, approaches according to the respective embodiments and exemplary modifications may be utilized in combination as appropriate.

Note that various modifications which are not described in particular can be made according to the present invention without departing from the spirit and scope of the invention.

1 Tag tape roll manufacturing apparatus (tape processing apparatus)
2 Tag label producing apparatus
2' Tag label producing apparatus
9 Housing (apparatus housing)
14 Antenna (apparatus antenna, first apparatus antenna)
19 Antenna (apparatus antenna, second apparatus antenna)
19' Antenna (apparatus antenna, second apparatus antenna)
20 Sensor (tag body detecting means)
20' Sensor (tag body detecting means)
22 Signal processing circuit (access information generating means, information transmitting means)
30 Control circuit
32 Transmitting portion (access information generating means, information transmitting means)
33 Receiving portion
91 Cartridge (second cartridge, tag body)
91A Tray member
92 Tape (tag disposing tape; label material, attachment material)
100 Cartridge (first cartridge, tag body)
100A Housing (cartridge housing)
101 Base tape (tag tape)
102 First roll (tag tape roll, tag body)
151 IC circuit part
152 Tag antenna (tag antenna)
200A First tape (tag disposing tape)
200Aa Adhesive layer (first adhesive layer; mounting adhesive layer)
200Ab Tape base layer (first tape base layer)
200Ac Adhesive layer (first release adhesive layer; affixing adhesive layer)
200Ad Separator layer (first release layer; release layer for bonding)
A1 Attaching portion (flat portion)
200B Second tape (tag disposing tape, attachment material)
200Ba Adhesive layer (second adhesive layer; mounting adhesive layer)
200Bb Tape base layer (second tape base layer)
200Bc Adhesive layer (second release adhesive layer)
200Bc' Thermal sensitive layer (thermal sensitive material layer)
200Bd Separator layer (second release layer)
200Bd' Non-adhesive layer (non-adhesive material layer)
200B1 Attaching portion (flat portion)
210 Base tape (tag tape)
211a Reel member (first supplying means, travel processing means)
212 First tape shaft driving motor (first supplying means, travel processing means)
213a Reel member (second supplying means, travel processing means)
214 Second tape shaft driving motor (second supplying means, travel processing means)
215 Base tape roll (tag tape roll, tag body)
215a Reel member (winding means)
216 Base tape shaft driving motor (winding means)
219A, B Feeding roller (tape feeding means; travel processing means)
220 Feeding roller shaft driving motor (tape feeding means; travel processing means)
226 Tag inserter (tag attaching means, smooth processing means)
228 Photo sensor (mark detecting means)
271 Laser marker (mark forming means)
275 Neutralizing brushes (first static electricity eliminating means, second static electricity forming means)
341 Antenna switching circuit (antenna switching means)
2270 Tag checker (inspecting means)
2271 Antenna (writing means)
2274 High-frequency circuit (writing means)
2275 Signal processing circuit (writing means)
4064 Laser moving motor (driving means)
4065 Laser moving circuit (driving means)
4228 Photo sensor (detecting means, smooth processing means)
4229 First laser (first marking means, smooth processing means; perforating means, laser processing means)
4230 Controller (feed controlling means)
4270 Tag checker (inspecting means)
4271 First loop antenna
4272 Second loop antenna (information applying means)
428 Second laser (second marking means; perforating means, laser processing means)
TA RFID circuit element (inspection results storing RFID circuit element; information medium, RFID circuit element for initial tag storage)
Tg RFID tag
To RFID circuit element (RFID circuit element for tag label, inspection results storing RFID circuit element; first RFID circuit element, second RFID circuit element, information medium)

The invention claimed is:

1. A tag label producing apparatus, comprising:
an apparatus housing;
a tag assembly loading portion provided for said apparatus housing and is capable of loading a tag assembly, the tag assembly suppliably storing continuously in a predetermined order a plurality of RFID tag circuit elements and being assigned a predetermined smooth processing factor for when forming tag labels, the smooth processing factor corresponding to each of said plurality of RFID tag circuit elements, the RFID tag circuit elements having an IC circuit part that stores information and a tag antenna connected to said IC circuit part;

an apparatus antenna that performs transmission and reception of information using wireless communication with said IC circuit parts provided to said RFID tag circuit elements;

an access information generating device that generates access information for said IC circuit parts of said RFID tag circuit elements;

an information transmitting device that accesses said IC circuit parts by transmitting said access information generated by said access information generating device to said tag antenna provided for said RFID tag circuit elements in a non-contact manner via said apparatus antenna; and a smooth processing portion that performs predetermined smooth processing when forming tag labels based on said smooth processing factors, wherein said tag assembly loading portion is capable of loading said tag assembly in which information associated with the tag characteristic values of a second RFID tag circuit element supplied with a turn later than a first RFID tag circuit element is stored as said smooth processing factor in said IC circuit part of said first RFID tag circuit element supplied with a turn former than said second RFID tag circuit element; and said smooth processing portion comprises:

a first reading portion that reads information associated with the tag characteristic values of said second RFID tag circuit element as said smooth processing factor stored in said IC circuit part of said first RFID tag circuit element;

a storing device that stores information associated with the tag characteristic values of said second RFID tag circuit element read by said first reading portion; and a transmission controlling portion that controls a transmission mode to said second RFID tag circuit element from said information transmitting device so as to match said information associated with said tag characteristic values stored in said storing device.

2. The tag label producing apparatus according to claim 1, further comprising:

tag assembly detecting device that detects whether or not said tag assembly is loaded onto said tag assembly loading portion; and second reading portion that reads from said IC circuit part of an RFID circuit element for tag storing for the first time provided to said tag assembly information associated with said the tag characteristic values of said RFID circuit elements supplied first from among said plurality of RFID circuit elements contained in said tag assembly when said tag assembly detecting device detects that said tag assembly has been loaded onto said tag assembly loading portion.

3. The tag label producing apparatus according to claim 2, further comprising tag assembly removal operation detecting portion that detects whether or not an operation has been performed for removing said tag assembly from said tag assembly loading portion; wherein said information transmitting device transmits said access information to said IC circuit part of said RFID circuit element for tag storing for the first time and writes information associated with said tag characteristic values stored in said storing, when said tag assembly removal operation detecting portion detects that an operation to remove said tag assembly has been performed.

4. The tag label producing apparatus according to claim 3, further comprising a cartridge identity determining portion that determines whether or not information associated with said tag characteristic values stored in said storing device is identical information associated with said tag characteristic values read from said RFID circuit element for tag storing for the first time by said second reading portion, when said tag assembly detecting device detects that a tag assembly has been loaded onto said tag assembly loading portion.

5. The tag label producing apparatus according to claim 2, further comprising power on operation detecting portion that detects that power has been turned on; wherein said second reading portion reads from said IC circuit part of said RFID circuit element for tag storing for the first time information associated with said characteristic values of said RFID circuit element supplied first when said power on detecting portion detects that power has been turned on.

6. The tag label producing apparatus ( ) according to claim 5, further comprising a power shut-off operation detecting portion that detects that a power shut-off operation has been performed; wherein said information transmitting device transmits said access information to said IC circuit part of said RFID circuit element for tag storing for the first time and writes information associated with said tag characteristic values stored in said storing device when said power shut-off operation detecting portion detects that a power shut-off operation has been performed.

7. The tag label producing apparatus according to claim 2, wherein:

said apparatus antenna comprises a first apparatus antenna that performs transmission and reception of information through wireless communication with said IC circuit part of said RFID circuit elements; and a second apparatus antenna that performs transmission and reception of information through wireless communication with said IC circuit part of said RFID circuit element for tag storing for the first time; and said tag label producing apparatus further comprises an antenna switching device that switches an antenna for transmitting said access information generated by said access information generating device to said first apparatus antenna or said second apparatus antenna.

8. A tag assembly, suppliably storing continuously in a predetermined order a plurality of RFID tag circuit elements provided with an IC circuit part that stores information and a tag antenna that performs transmission and reception of information; wherein a predetermined smooth processing factor for when forming tag label is assigned corresponding to each of said plurality of RFID circuit elements, and information associated with the tag characteristic values of a second RFID tag circuit element supplied with a turn later than a first RFID tag circuit element is stored as said smooth processing factor in said IC circuit part of said first RFID tag circuit element supplied with a turn former than said second RFID tag circuit element, among said plurality of RFID tag circuit elements.

9. The tag assembly according to claim 8, wherein:

said tag assembly is constituted as a tag tape roll comprising a tag tape to which a plurality of said RFID circuit elements is disposed continuously in a tape lengthwise direction, and a reel member that takes up said tag tape around an outer circumference thereof.

10. The tag assembly according to claim 8, wherein:

said tag assembly is constituted as a first cartridge comprising a tag tape to which a plurality of said RFID circuit elements is disposed continuously in a tape lengthwise direction, a reel member that takes up said tag tape around an outer circumference thereof, and a cartridge housing that contains said tag tape and said reel member.

11. The tag assembly according to claim 9, wherein:
said RFID circuit elements are arranged in a plurality of rows in a tape width direction;
a plurality of RFID circuit element rows are arranged such that tape lengthwise direction positions of said plurality of RFID circuit elements of each of said plurality of RFID circuit element rows, arranged in a tape lengthwise direction do not overlap; and
information associated with a tape width direction position of said tag antenna of said second RFID circuit element is stored in said IC circuit part of said first RFID circuit element.

12. The tag assembly according claim 8, wherein:
said tag assembly is constituted as a substantially tray-like second cartridge comprising a plurality of rectangular sheet type label material to which is provided said plurality of RFID circuit elements, and a tray member that stores a plurality of said rectangular sheet type label material stacked in a flat stack.

13. The tag assembly according to claim 8, wherein:
information associated with sensitivity of said second RFID circuit element is stored in said IC circuit part of said first RFID circuit element as information associated with the tag characteristic values of said second RFID circuit element.

14. The tag assembly according to claim 13, further comprising an information medium that mediates information associated with sensitivity of said RFID circuit element supplied first among said plurality of RFID circuit elements stored in said tag assembly.

15. The tag assembly according to claim 14, wherein:
said information medium is an RFID circuit element for tag storing for the first time provided to said tag assembly; and
said IC circuit part of said RFID circuit element for tag storing for the first time stores information associated with sensitivity of said first supplied RFID circuit element.

16. The tag assembly according to claim 13, wherein:
information associated with sensitivity of said RFID circuit element supplied first among said plurality of RFID circuit elements stored in said tag assembly is stored in said IC circuit part of said RFID circuit element supplied first.

17. The tag assembly according to claim 8, wherein:
information associated with sensitivity of said RFID circuit element is information associated with sensitivity when a writing of information.

18. The tag assembly according to claim 8, wherein:
information associated with a remaining number of suppliable said RFID circuit elements among said plurality of RFID circuit elements stored in said tag assembly is stored in said IC circuit part of said first RFID circuit element.

19. The tag assembly according to claim 8, wherein:
information associated with a preamble number output when initiating communication with said second RFID circuit element is stored in said IC circuit part of said first RFID circuit element.

20. The tag assembly according to claim 8, wherein:
at least one part of information associated with tag identification information of said second RFID circuit element is stored in said IC circuit part of said first RFID circuit element.

21. The tag assembly according to claim 8, wherein:
said IC circuit part of said first RFID circuit element stores information associated with the tag characteristic values of said second RFID circuit element, or information associated with said remaining number, or tag identification information associated with said first RFID circuit element, said identification information having at least one part of tag identification information of said second RFID circuit element.

22. The tag assembly according to claim 8, wherein:
information indicating that an RFID circuit element is the last tag is stored in said IC circuit part of said RFID circuit element supplied last of said plurality of RFID circuit elements stored in said tag assembly.

23. The tag assembly according to claim 22, wherein:
said information indicating a last tag is stored in said IC circuit part of said RFID circuit element supplied last instead of information associated with said tag characteristic values.

24. A tag label producing apparatus, comprising:
a feeding device that feeds a tape that a plurality of RFID tag circuit elements are arranged in a predetermined order, each of the RFID tag circuit elements having an IC circuit part and an tag antenna respectively, the IC circuit part of the RFID tag circuit element storing tag ID thereof and sensitivity information of a following another RFID tag circuit element fed by the feeding device with a turn later than the RFID tag circuit element;
an apparatus antenna that communicates with each of said plurality of RFID tag circuit elements in turn, the RFID tag circuit elements fed by said feeding device;
a reading device that read sensitivity information of a specific second tag circuit element fed with a turn later than a specific first RFID tag circuit element by said feeding device, from said IC circuit part of said first RFID tag circuit element by wireless communication via said apparatus antenna;
an output control device that controls a communication output from said apparatus antenna so that said communication output is increased or decreased on the basis of the sensitivity information of said second RFID tag circuit element being read by the reading device;
an information writing device that writes a desired information in said IC circuit part of said second RFID circuit element by using a communication output set suitable for said second RFID circuit element by said output control device; and
a printing device that form a print corresponding to said desired information to said tape fed by said feeding device, wherein
the tag label producing apparatus produces RFID labels with print by using said tape having said second RFID tag circuit element that information is written to said IC circuit part by said information writing device and printing by the printing device is performed.

* * * * *